US010488742B2

United States Patent
O'Neill et al.

(10) Patent No.: US 10,488,742 B2
(45) Date of Patent: Nov. 26, 2019

(54) MULTI-LENS OPTICAL ATTACHMENT FOR MOBILE DEVICES

(71) Applicant: Portero Holdings, LLC, Lake Forest, CA (US)

(72) Inventors: Patrick D. O'Neill, Huntington Beach, CA (US); Chong Pak, Lakewood, CA (US); Joshua Cantor, Huntington Beach, CA (US); Jason Patrick, Long Beach, CA (US); Daniel Arato, Los Angeles, CA (US); Ryan Nguyen, Fountain Valley, CA (US); Robert O'Neill, Huntington Beach, CA (US)

(73) Assignee: PORTERO HOLDINGS, LLC, Lake Forest, CA (US)

( * ) Notice: Subject to any disclaimer, the term of this patent is extended or adjusted under 35 U.S.C. 154(b) by 144 days.

(21) Appl. No.: 15/256,439

(22) Filed: Sep. 2, 2016

(65) Prior Publication Data

US 2016/0370690 A1   Dec. 22, 2016

Related U.S. Application Data

(63) Continuation of application No. 14/743,593, filed on Jun. 18, 2015, now Pat. No. 9,454,066.

(Continued)

(51) Int. Cl.
*G03B 17/56*  (2006.01)
*G02B 13/00*  (2006.01)
(Continued)

(52) U.S. Cl.
CPC .......... *G03B 17/565* (2013.01); *G02B 7/021* (2013.01); *G02B 7/14* (2013.01); *G02B 13/001* (2013.01);
(Continued)

(58) Field of Classification Search
CPC ...... H04N 5/2252; G03B 17/02; G03B 17/56; G03B 17/561; G03B 17/565; G03B 17/568
See application file for complete search history.

(56) References Cited

U.S. PATENT DOCUMENTS

| 971,798 A | 10/1910 | Somdal |
|---|---|---|
| D48,816 S | 4/1916 | De Ville |

(Continued)

FOREIGN PATENT DOCUMENTS

| CN | 1797169 A | 7/2006 |
|---|---|---|
| CN | 201173987 Y | 12/2008 |

(Continued)

OTHER PUBLICATIONS

Machine English Translation KR-101149925-B1 (Published May 2012) (Year: 2012).*

(Continued)

*Primary Examiner* — Nelson D. Hernández Hernández
(74) *Attorney, Agent, or Firm* — Dorsey & Whitney LLP

(57) ABSTRACT

A multi-lens system can be configured to be selectively attachable to a mobile electronic device having a user-facing onboard camera lens and an outward-facing onboard camera lens. The multi-lens system can attach to the mobile electronic device in at least a first position and a second position. The first lens component in the first position is configured to be in optical alignment with the user-facing onboard camera lens and simultaneously the second lens component is configured to be in optical alignment with the outward-facing onboard camera lens. The first lens component in the second position is configured to be in optical alignment with the outward-facing onboard camera lens and simultaneously the second lens component is configured to be in optical alignment with the user-facing onboard camera lens. A portable attachment accessory can be configured to be (Continued)

selectively attachable to a lens system that is configured to receive a portion of a mobile electronic device.

20 Claims, 45 Drawing Sheets

Related U.S. Application Data

(60) Provisional application No. 62/140,798, filed on Mar. 31, 2015, provisional application No. 62/115,094, filed on Feb. 11, 2015, provisional application No. 62/059,719, filed on Oct. 3, 2014, provisional application No. 62/032,472, filed on Aug. 1, 2014, provisional application No. 62/014,573, filed on Jun. 19, 2014.

(51) Int. Cl.
    G02B 7/02       (2006.01)
    H04N 5/225      (2006.01)
    G02B 15/10      (2006.01)
    G02B 7/14       (2006.01)

(52) U.S. Cl.
    CPC ........... *G02B 15/10* (2013.01); *G03B 17/566* (2013.01); *G03B 17/568* (2013.01); *H04N 5/2254* (2013.01)

(56) References Cited

U.S. PATENT DOCUMENTS

| | | |
|---|---|---|
| D138,816 S | 9/1944 | Glasser |
| D141,692 S | 6/1945 | Nemeth |
| 2,428,719 A | 10/1947 | Nemeth |
| D148,816 S | 2/1948 | Pemstein |
| D181,908 S | 1/1958 | Hertzler |
| D183,253 S | 7/1958 | Gebele |
| 3,090,282 A | 5/1963 | Angenieux |
| 3,133,140 A | 5/1964 | Winchell |
| 3,138,060 A | 6/1964 | Eggert et al. |
| 3,454,323 A | 7/1969 | Dierks et al. |
| 3,620,149 A | 11/1971 | Ogihara |
| 3,680,461 A | 8/1972 | Amesbury et al. |
| 3,796,489 A | 3/1974 | Sone et al. |
| 3,817,601 A | 6/1974 | Colaiace et al. |
| 3,828,991 A | 8/1974 | Moore |
| D234,007 S | 12/1974 | Ritter |
| D248,160 S | 6/1978 | Feinbloom et al. |
| 4,264,167 A | 4/1981 | Plummer |
| 4,305,386 A | 12/1981 | Tawara |
| D264,048 S | 4/1982 | Magner |
| D274,336 S | 6/1984 | Huckenbeck |
| D274,691 S | 7/1984 | Wallace |
| D275,766 S | 10/1984 | Suzuki |
| D295,871 S | 5/1988 | Charles |
| 4,760,510 A | 7/1988 | Lahti |
| 4,864,333 A | 9/1989 | Barber |
| 4,893,143 A | 1/1990 | Sheng-Huei |
| 5,050,963 A | 9/1991 | Murakami |
| 5,054,886 A | 10/1991 | Ozaki et al. |
| 5,311,358 A | 5/1994 | Pederson et al. |
| 5,416,544 A | 5/1995 | Stapleton |
| 5,455,711 A | 10/1995 | Palmer |
| 5,461,444 A | 10/1995 | Okura et al. |
| D374,878 S | 10/1996 | Palmer |
| D381,347 S | 7/1997 | Miyahara |
| D387,787 S | 12/1997 | Palmer |
| 5,781,351 A | 7/1998 | Murakami et al. |
| 5,831,778 A | 11/1998 | Chueh |
| 6,115,197 A | 9/2000 | Funahashi |
| 6,545,825 B2 | 4/2003 | Shoji et al. |
| 6,752,516 B1 | 6/2004 | Beadle |
| 6,889,006 B2 | 5/2005 | Kobayashi |
| 6,924,950 B2 | 8/2005 | Gventer et al. |
| 6,967,790 B2 | 11/2005 | Wei |
| D544,512 S | 6/2007 | Hunag |
| D546,863 S | 7/2007 | Ito et al. |
| D560,702 S | 1/2008 | Tokiwa et al. |
| D574,837 S | 8/2008 | Hooks, Jr. |
| 7,600,932 B2 | 10/2009 | Senba et al. |
| 7,604,423 B2 | 10/2009 | Nagata et al. |
| 7,636,518 B2 | 12/2009 | Tanaka et al. |
| 7,639,353 B2 | 12/2009 | Rooke |
| D617,360 S | 6/2010 | Endo et al. |
| 7,782,375 B2 | 8/2010 | Chambers et al. |
| D626,950 S | 11/2010 | Roman |
| 7,830,628 B2 | 11/2010 | Schaefer |
| 7,967,513 B2 | 6/2011 | Zhang |
| 8,000,589 B2 | 8/2011 | Chan |
| 8,040,621 B2 | 10/2011 | Chang et al. |
| D649,970 S | 12/2011 | Lyford et al. |
| D650,821 S | 12/2011 | Verhey |
| 8,073,324 B2 | 12/2011 | Tsai |
| 8,208,210 B2 | 6/2012 | An et al. |
| D669,587 S | 10/2012 | Mayer |
| 8,279,544 B1 | 10/2012 | O'Neill |
| D678,379 S | 3/2013 | O'Neill et al. |
| D686,265 S | 7/2013 | O'Neill et al. |
| 8,508,868 B2 | 8/2013 | Weber et al. |
| D692,472 S | 10/2013 | Samuels et al. |
| 8,573,810 B2 | 11/2013 | Mahaffey et al. |
| 8,593,745 B2 | 11/2013 | O'Neill |
| D695,295 S | 12/2013 | Chumanov et al. |
| D695,332 S | 12/2013 | O'Neill et al. |
| D697,957 S | 1/2014 | Glasse et al. |
| D697,958 S | 1/2014 | O'Neill et al. |
| 8,638,369 B2 | 1/2014 | Tsai |
| 8,639,106 B1 | 1/2014 | Gleason et al. |
| D699,275 S | 2/2014 | Samuels et al. |
| D700,228 S | 2/2014 | O'Neill et al. |
| 8,687,299 B1 | 4/2014 | Sandford et al. |
| 8,760,569 B2 | 6/2014 | Yang |
| D708,652 S | 7/2014 | Hyers |
| D708,653 S | 7/2014 | Hyers |
| 8,891,187 B2 | 11/2014 | O'Neill |
| D723,601 S | 3/2015 | O'Neill et al. |
| D726,796 S | 4/2015 | O'Neill et al. |
| D727,385 S | 4/2015 | O'Neill et al. |
| D727,868 S | 4/2015 | O'Neill et al. |
| 9,007,522 B1 | 4/2015 | O'Neill |
| D730,967 S | 6/2015 | O'Neill et al. |
| D730,968 S | 6/2015 | O'Neill et al. |
| D730,969 S | 6/2015 | O'Neill et al. |
| D740,878 S | 10/2015 | O'Neill et al. |
| 9,188,764 B2 | 11/2015 | O'Neill et al. |
| 9,195,023 B2 | 11/2015 | O'Neill et al. |
| 9,294,660 B2 | 3/2016 | O'Neill et al. |
| 9,454,066 B2* | 9/2016 | O'Neill ............... G03B 17/565 |
| 2004/0041911 A1 | 3/2004 | Odagiri et al. |
| 2004/0218081 A1 | 11/2004 | Lohr et al. |
| 2005/0088612 A1 | 4/2005 | Smith et al. |
| 2005/0099526 A1 | 5/2005 | Wu et al. |
| 2007/0049340 A1 | 3/2007 | Wang et al. |
| 2007/0053682 A1 | 3/2007 | Chang |
| 2007/0196090 A1 | 8/2007 | Kubo |
| 2007/0275763 A1 | 11/2007 | Sawadski et al. |
| 2007/0280677 A1 | 12/2007 | Drake et al. |
| 2008/0037011 A1 | 2/2008 | Rooke |
| 2008/0174891 A1 | 7/2008 | Kudoh |
| 2009/0109558 A1* | 4/2009 | Schaefer .................. G02B 7/02 359/827 |
| 2009/0169198 A1 | 7/2009 | Chang |
| 2009/0181729 A1 | 7/2009 | Griffin, Jr. et al. |
| 2010/0048243 A1 | 2/2010 | Fourquin et al. |
| 2010/0208369 A1 | 8/2010 | Shin |
| 2010/0328420 A1 | 12/2010 | Roman |
| 2011/0019294 A1 | 1/2011 | Strong |
| 2011/0043683 A1 | 2/2011 | Beach et al. |
| 2011/0110654 A1 | 5/2011 | Maki |
| 2012/0157160 A1 | 6/2012 | Ozcan et al. |
| 2012/0236425 A1* | 9/2012 | O'Neill .................. G02B 7/14 359/827 |
| 2013/0028591 A1 | 1/2013 | Hicks |

(56) References Cited

U.S. PATENT DOCUMENTS

| | | |
|---|---|---|
| 2013/0094846 A1 | 4/2013 | Apter |
| 2013/0107109 A1* | 5/2013 | Yang .................... G06F 1/1632 348/373 |
| 2013/0148954 A1 | 6/2013 | Uehara et al. |
| 2013/0206614 A1 | 8/2013 | O'Neill et al. |
| 2014/0078594 A1 | 3/2014 | Springer |
| 2014/0153916 A1* | 6/2014 | Kintner ................ G03B 17/561 396/419 |
| 2014/0176690 A1 | 6/2014 | Hamel |
| 2014/0227026 A1 | 8/2014 | O'Neill et al. |
| 2014/0274208 A1 | 9/2014 | Baschnagel |
| 2014/0320987 A1 | 10/2014 | O'Neill et al. |
| 2015/0002950 A1 | 1/2015 | O'Neill et al. |
| 2015/0042877 A1 | 2/2015 | O'Neill et al. |
| 2015/0116851 A1 | 4/2015 | O'Neill et al. |
| 2015/0172522 A1 | 6/2015 | O'Neill et al. |
| 2015/0222315 A1 | 8/2015 | O'Neill et al. |
| 2015/0293430 A1 | 10/2015 | O'Neill et al. |

FOREIGN PATENT DOCUMENTS

| | | | |
|---|---|---|---|
| CN | 301914880 | 5/2012 | |
| EM | 002558874-0001 | 10/2014 | |
| EM | 002586339-0002 | 11/2014 | |
| EM | 002671781-0002 | 3/2015 | |
| JP | 10-115858 | 5/1998 | |
| JP | H11-119335 | 4/1999 | |
| JP | 2000-311427 | 11/2000 | |
| JP | 2002-027292 | 1/2002 | |
| JP | 2003-295307 | 10/2003 | |
| JP | 2004-191897 | 7/2004 | |
| JP | 2006-251150 | 9/2006 | |
| JP | 2007-079362 | 3/2007 | |
| JP | 2007-206137 | 8/2007 | |
| JP | 2007-219433 | 8/2007 | |
| KR | 10-0842373 | 7/2008 | |
| KR | 101149925 B1 * | 5/2012 | ............ G03B 17/14 |
| WO | WO 2006/002674 | 1/2006 | |
| WO | WO 2012/082738 | 6/2012 | |
| WO | WO 2012/128936 | 9/2012 | |
| WO | WO 2013/081264 | 6/2013 | |
| WO | WO 2014/043266 | 3/2014 | |
| WO | WO 2015/048143 | 4/2015 | |
| WO | WO 2015/157244 | 10/2015 | |
| WO | WO 2015/195879 | 12/2015 | |

OTHER PUBLICATIONS

Design U.S. Appl. No. 29/482,575 and prosecution history, filed Feb. 19, 2014, O'Neill et al.
Design U.S. Appl. No. 29/487,839 and prosecution history, filed Apr. 11, 2014, O'Neill et al.
Design U.S. Appl. No. 29/492,726 and prosecution history, filed Jun. 2, 2014, O'Neill et al.
Design U.S. Appl. No. 29/492,734 and prosecution history, filed Jun. 2, 2014, O'Neill et al.
Design U.S. Appl. No. 29/494,382 and prosecution history, filed Jun. 19, 2014, O'Neill et al.
Design U.S. Appl. No. 29/498,470 and prosecution history, filed Aug. 4, 2014, O'Neill et al.
Design U.S. Appl. No. 29/504,213 and prosecution history, filed Oct. 2, 2014, O'Neill et al.
U.S. Appl. No. 14/973,608 and prosecution history, filed Dec. 17, 2015, O'Neill.
"4 In One Samsung Lens—S3/S4/Note2/Note3," printed Nov. 9, 2014 in 7 pages, http://www.camera-licious.com/4-in-one-Samsung-Phone-Camera-Lens-Wide-Angle-Macro-Fisheye-Lens.
amazon.com, "Bosch PS91-1A 12-Volt Max Lithium-Ion Inspection Camera Kit with 36-inch and 48-inch Imager, (1) Battery and Case," printed Mar. 12, 2014 in 6 pages, http://www.amazon.com/Bosch-PS91-1A-Lithium-Ion-Inspection-36-Inch/dp/B004W7J2DI date first available Apr. 12, 2011.
amazon.com, "Fish Eye lens + Wide Angle Lens + Macro Lens 3-in-1 Kit for iPod iPhone 4g," [Customer Reviews included] printed Feb. 3, 2012 in 10 pages.
amazon.com, "Universal Smart Phone Camera Lens Kit . . . ," http://www.amazon.com/Universal-Camera-including-Telephoto-Microfiber/dp/B00AV3ZUQA/ref=sr_1_5?ie=UTF8&qid=1416511486&sr=8-5&keywords=universal+smart+phone+camera+lens+kit+including+one+12x+telephoto+manual+focus+lens, [Customer Review Dated Jan. 27, 2013] printed Nov. 9, 2014 in 7 pages.
B & H Photo Video, "Olloclip #Selfie 3-in-1 Photo Lens for iPhone 5/5s (Black, Blue, Green Pendants)" http://www.bhphotovideo.com/c/product/1091967-REG/olloclip_oc_eu_iph5_sbk_1_selfie_3_in_1_lens_for.html as printed Dec. 1, 2015 in 2 pages.
EPHOTOzine, "Olloclip 3-In-One iPhone Photo Lens Review", http://www.ephotozine.com/article/olloclip-3-in-one-iphone-photo-lens-review-18816, Mar. 23, 2012 in 7 pages.
FOCAL, "Auxilliary Lens Set for Kodak Disc Camera", circa 1980s (photgraph).
kickstarter.com, "Glif—iPhone 4 Tripod Mount & Stand", http://www.kickstarter.com/projects/danprovost/glif-iphone-4-tripod-mount-and-stand, Oct. 3, 2013 [Selected screenshots from video].
"Olloclip for Android?," printed Nov. 9, 2014 in 3 pages, http://forum.xda-developers.com/showthread.php?t=1721172s [Specifically Customer Comment Dated Jul. 22, 2013].
"Phoneboat" http://web.archive.org/web/20130415040755/http://www.phoneboat.com/buy.html as captured Apr. 15, 2013 in 1 page.
Photography Blog, "Olloclip Contest Winners", http://www.photographyblog.com/news/win_an_olloclip/, Apr. 30, 2013, pp. 2.
thinkbiologic.com, "Bike Mount for iPhone 4—Biologic Bicycle Accessories and Bike Gear," printed Mar. 12, 2014 in 2 pages, http://web.archive.org/web/20130117201439/http:/www.thinkbiologic.com/products/bike-mount-iphone-4.
Strietelmeier, Julie, "Use Your 37mm DSLR Lenses with your Samsung Galaxy S4," Jun. 9, 2013, http://the-gadgeteer.com/2013/06/09/use-your-37mm-dslr-lenses-with-your-samsung-galaxy-s4/.
Uncrate, "Olloclip", http://web.archive.org/web/20130120204350/http://uncrate.com/stuff/olloclip/ as captured Jan. 20, 2013 in 2 pages.
youtube.com, "iPhone Colon Exam by Norm Augustinus," printed Mar. 12, 2014 in 1 page, www.youtube.com/watch?v=S3pE8h8R-cE as uploaded Jul. 17, 2008.

* cited by examiner

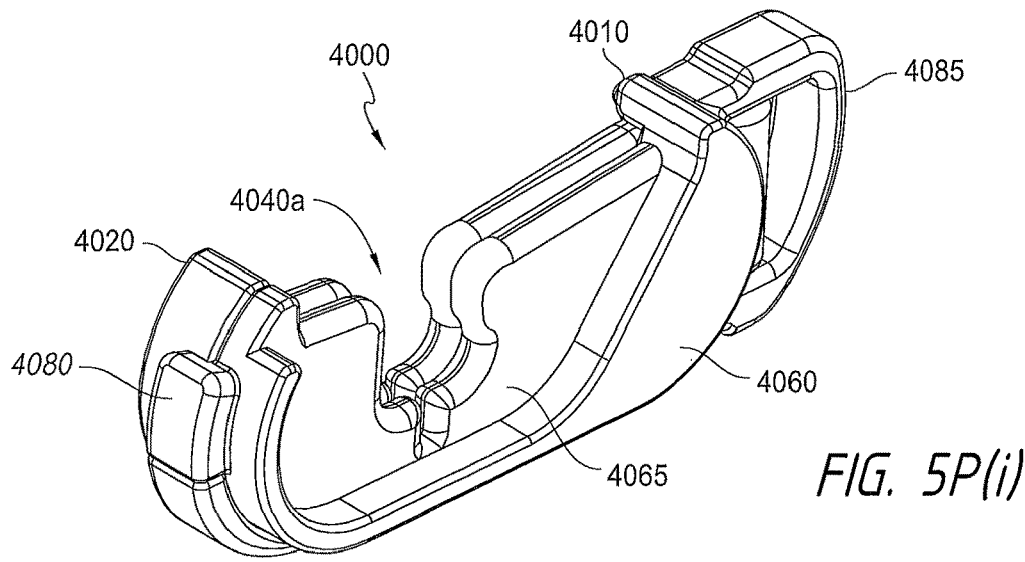
*FIG. 5P(i)*
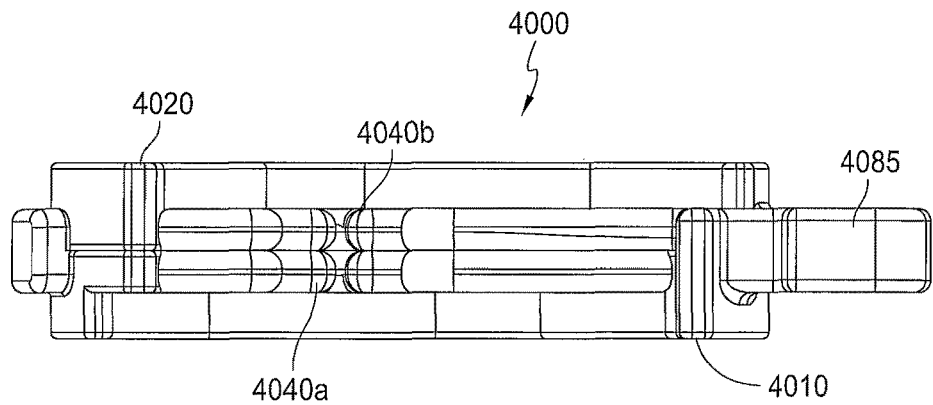
*FIG. 5P(ii)*
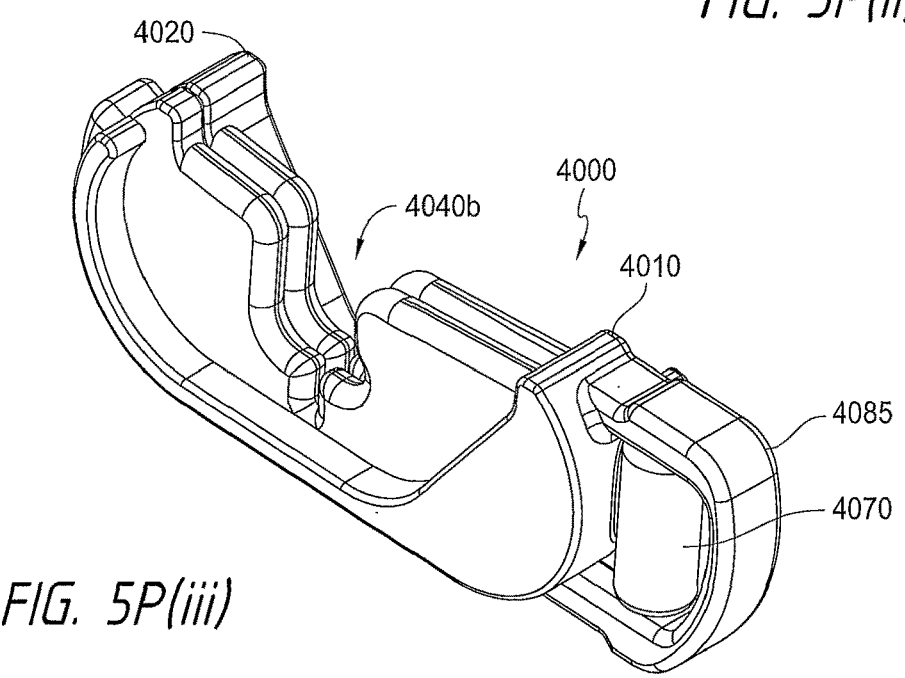
*FIG. 5P(iii)*

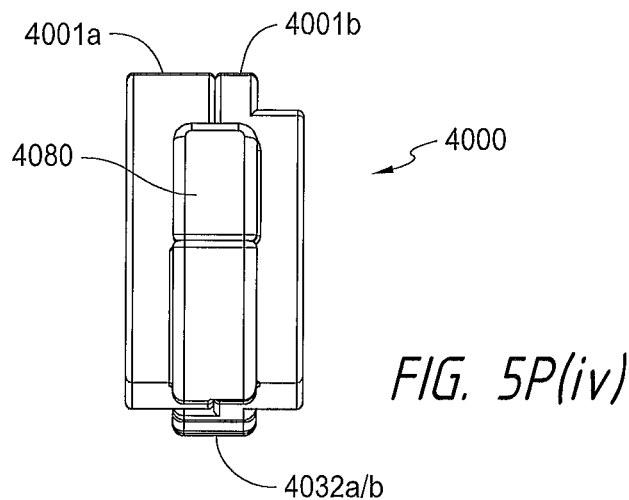
FIG. 5P(iv)
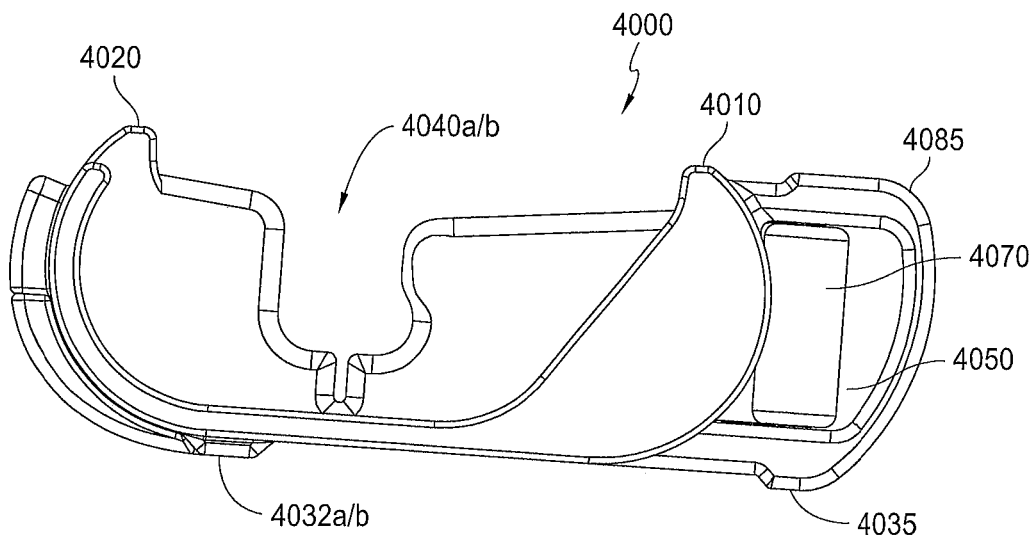
FIG. 5P(v)
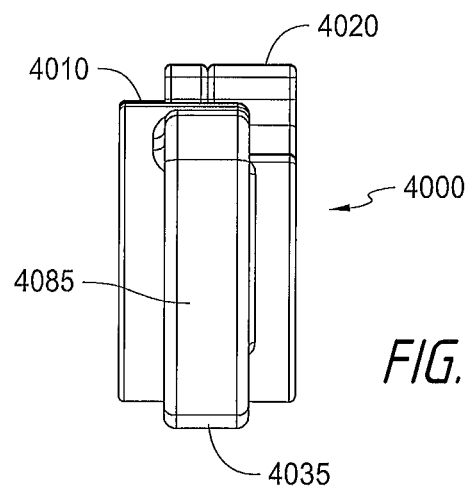
FIG. 5P(vi)

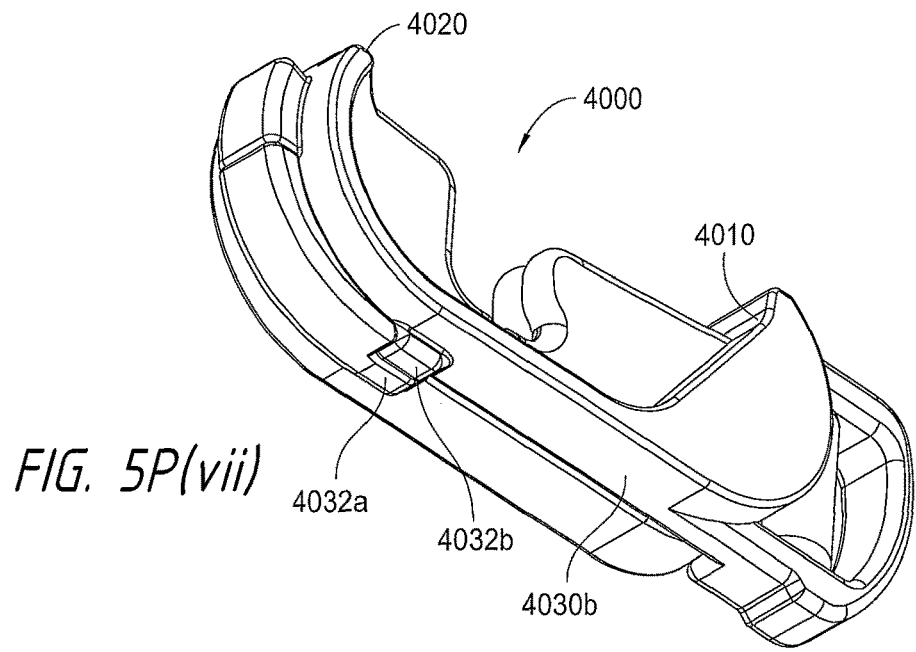
FIG. 5P(vii)
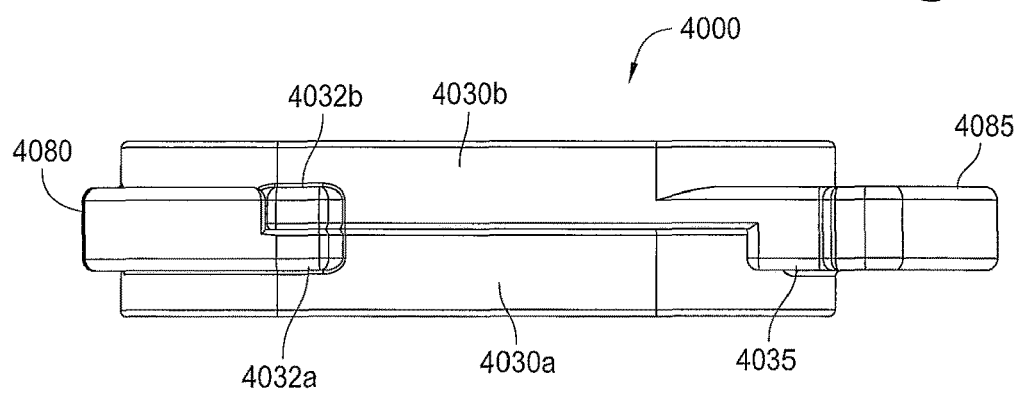
FIG. 5P(viii)
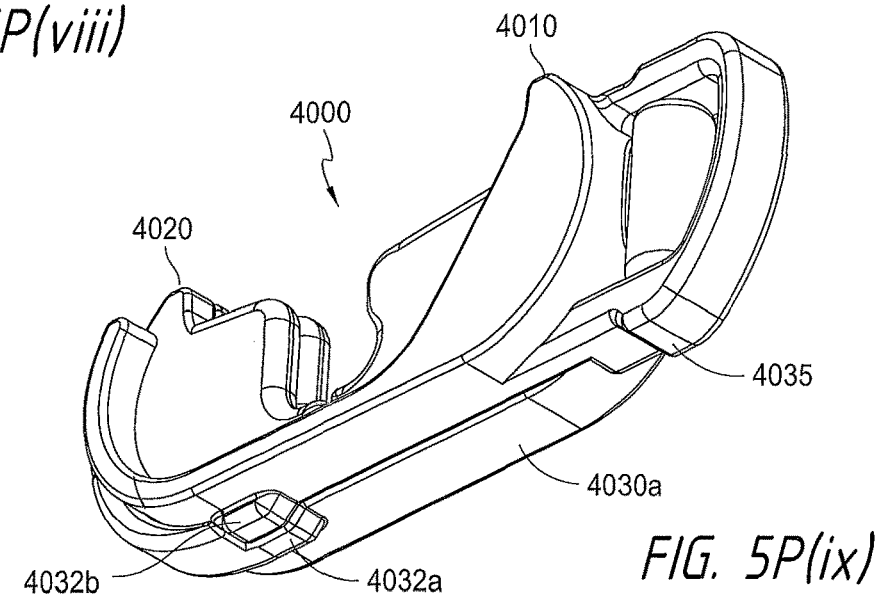
FIG. 5P(ix)

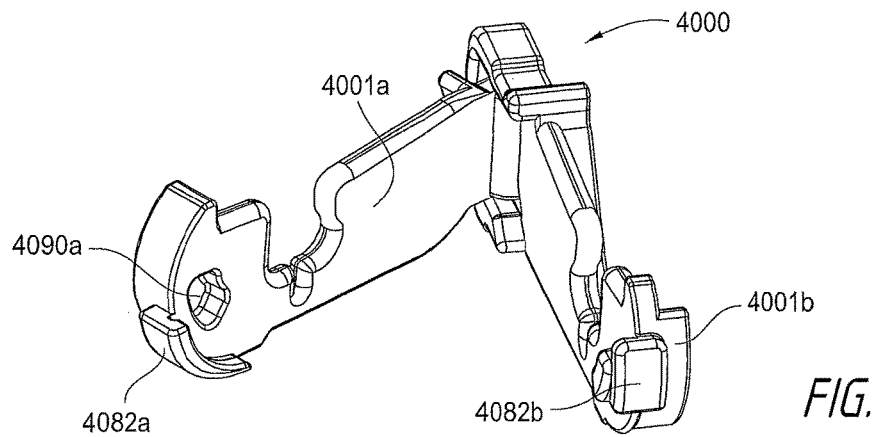
FIG. 5Q(i)
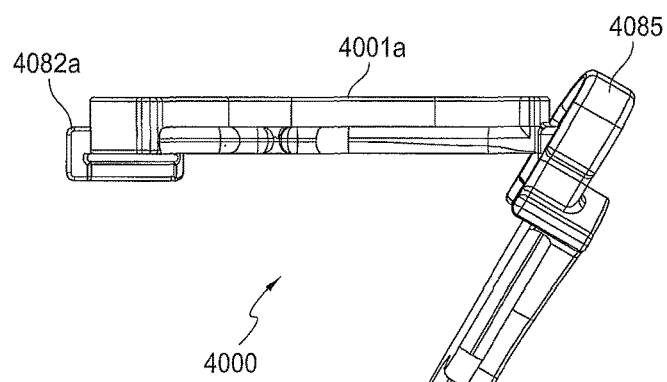
FIG. 5Q(ii)
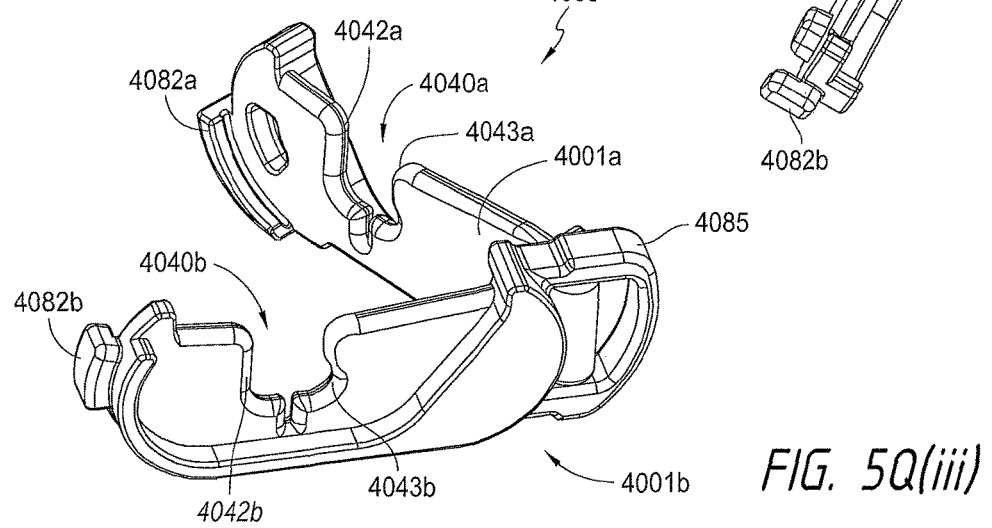
FIG. 5Q(iii)

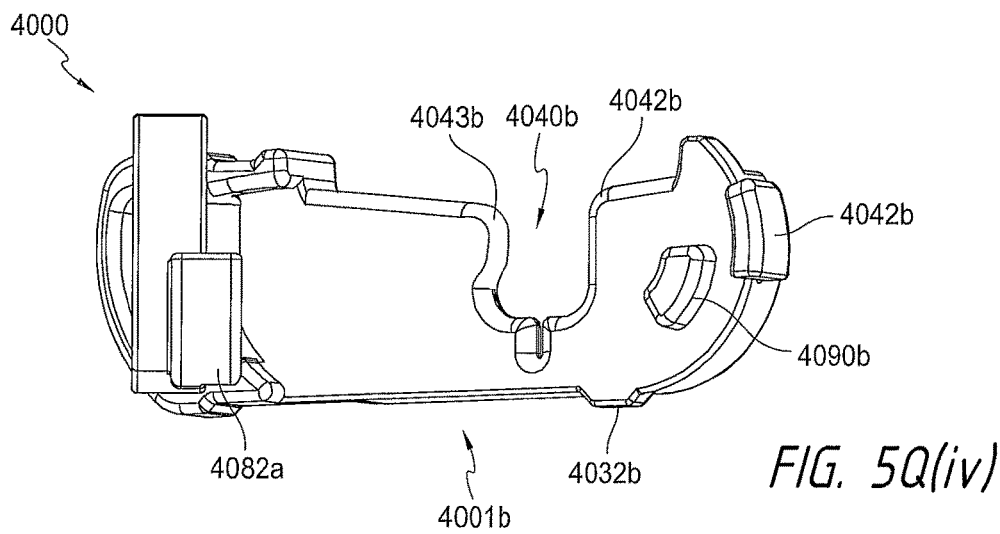
FIG. 5Q(iv)
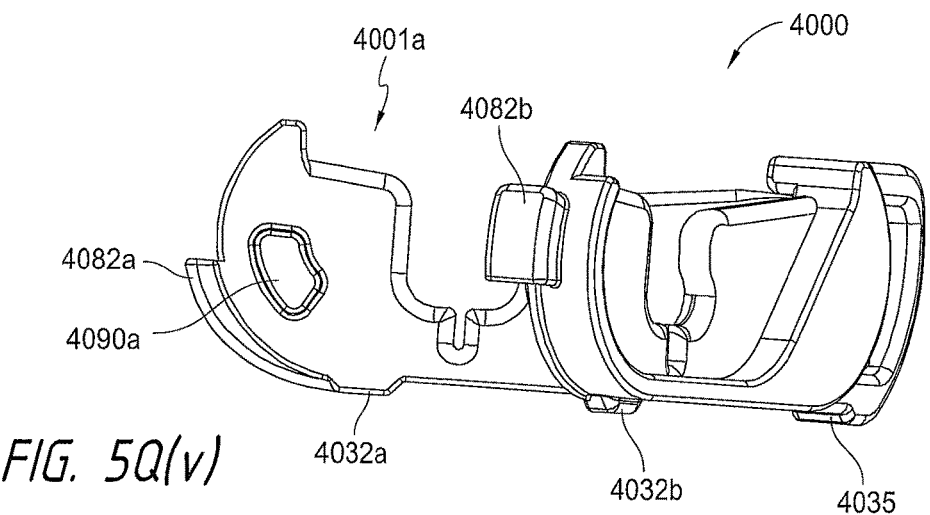
FIG. 5Q(v)
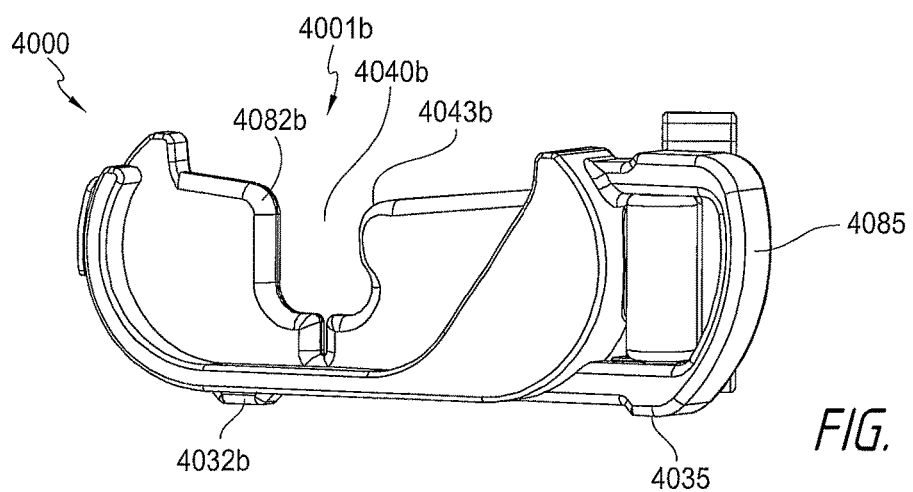
FIG. 5Q(vi)

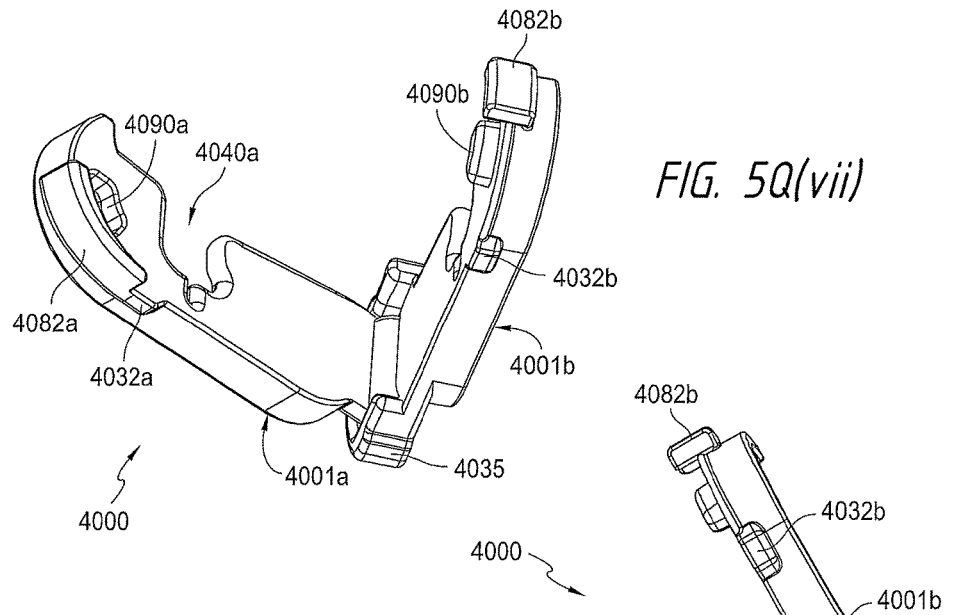
FIG. 5Q(vii)
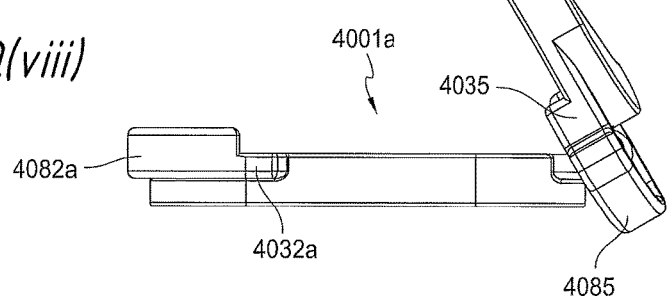
FIG. 5Q(viii)
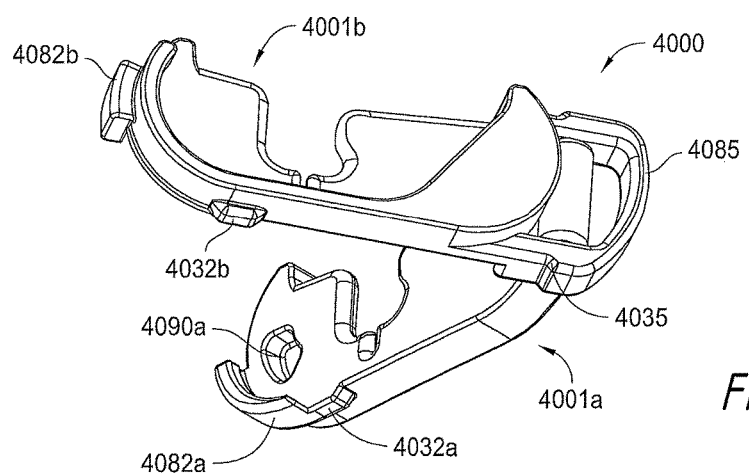
FIG. 5Q(ix)

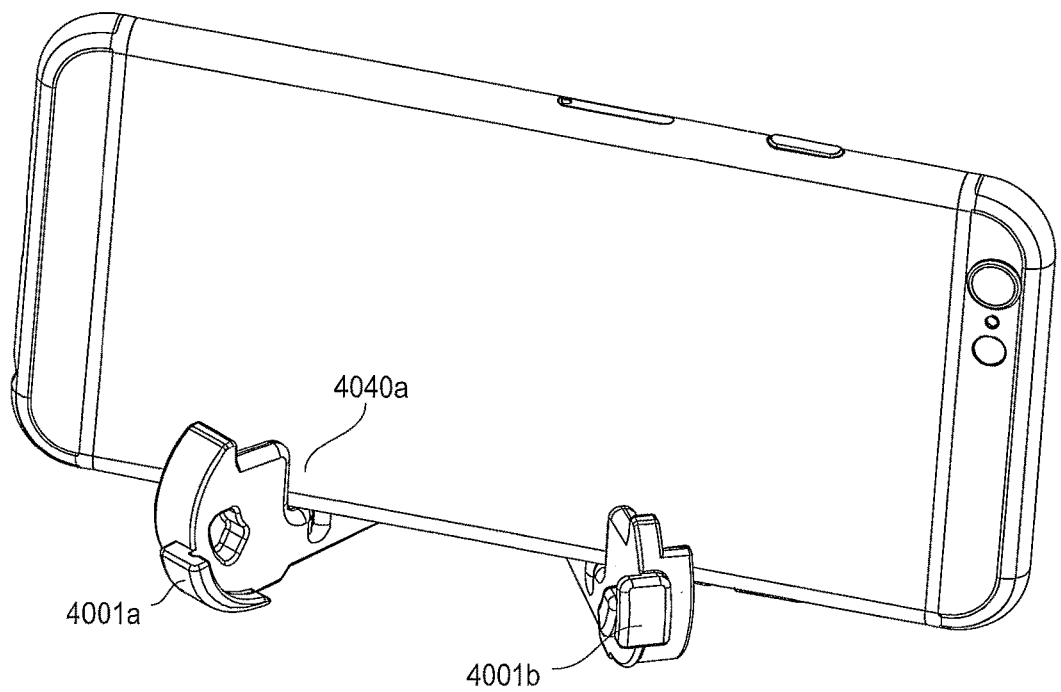
FIG. 5S(i)
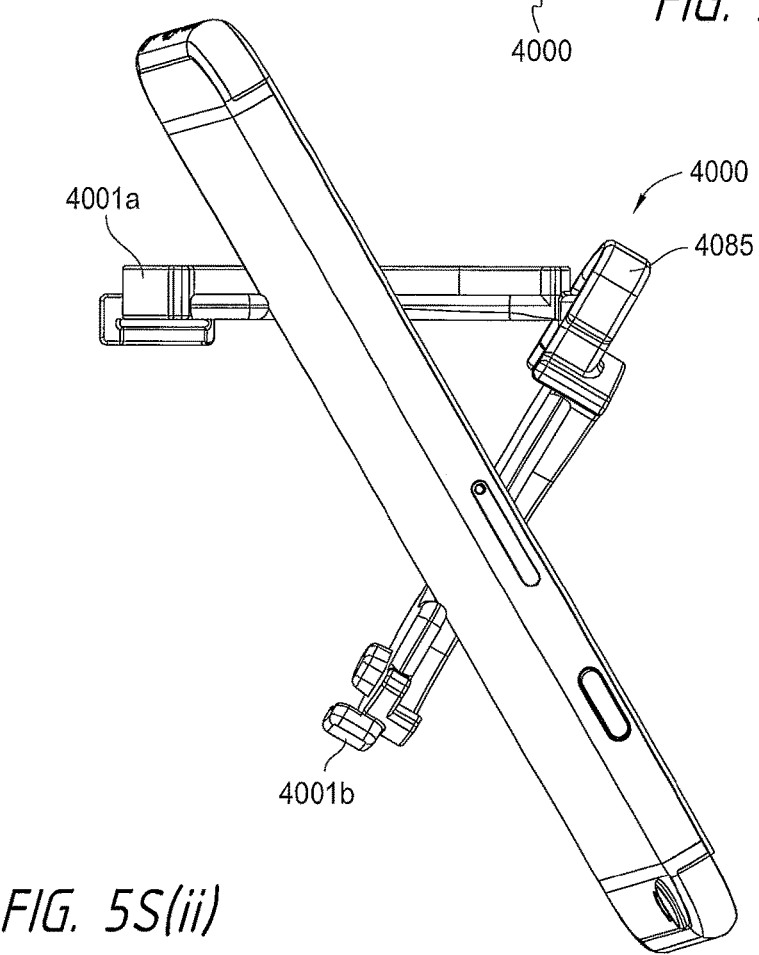
FIG. 5S(ii)

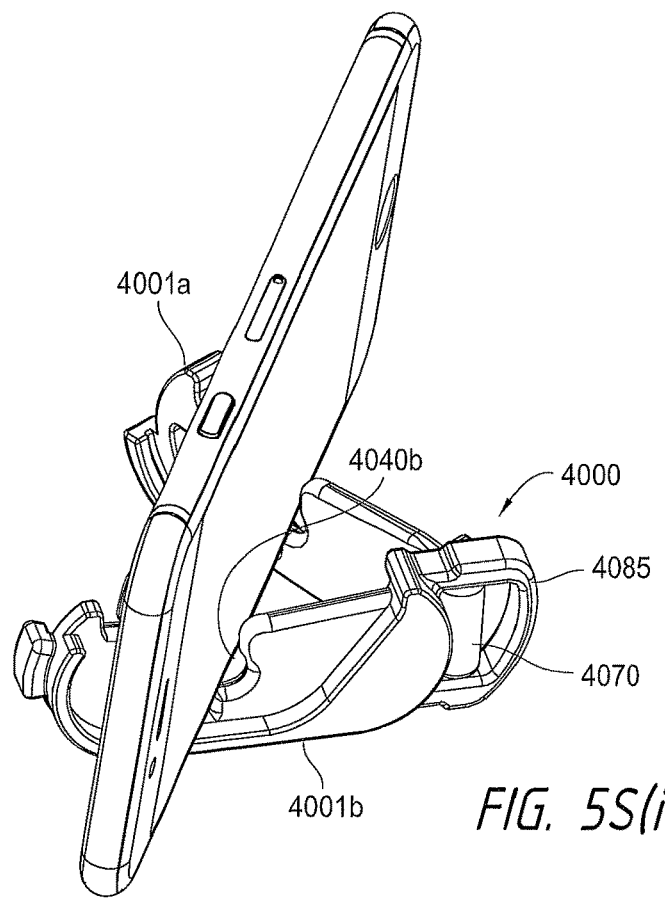
FIG. 5S(iii)
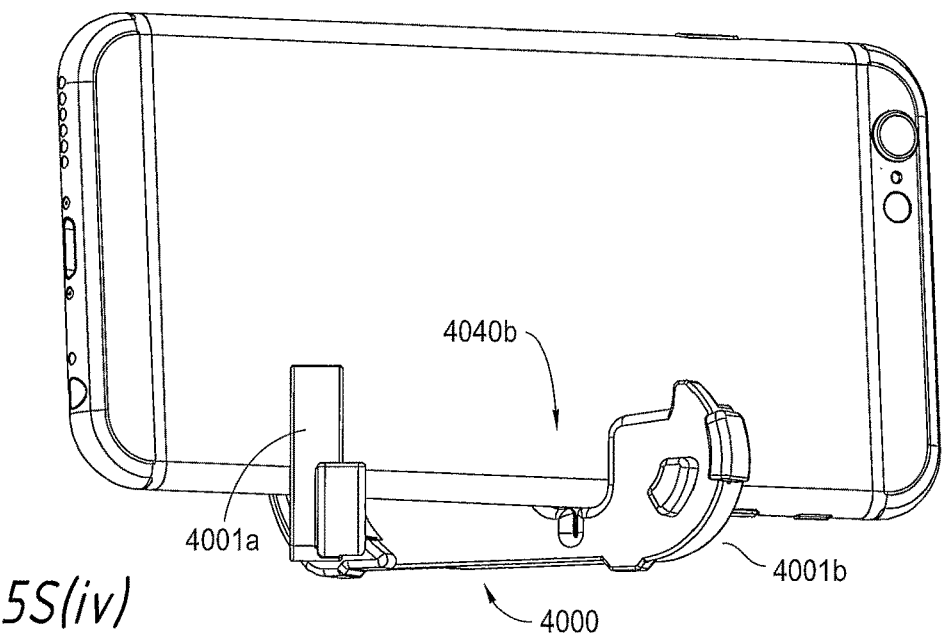
FIG. 5S(iv)

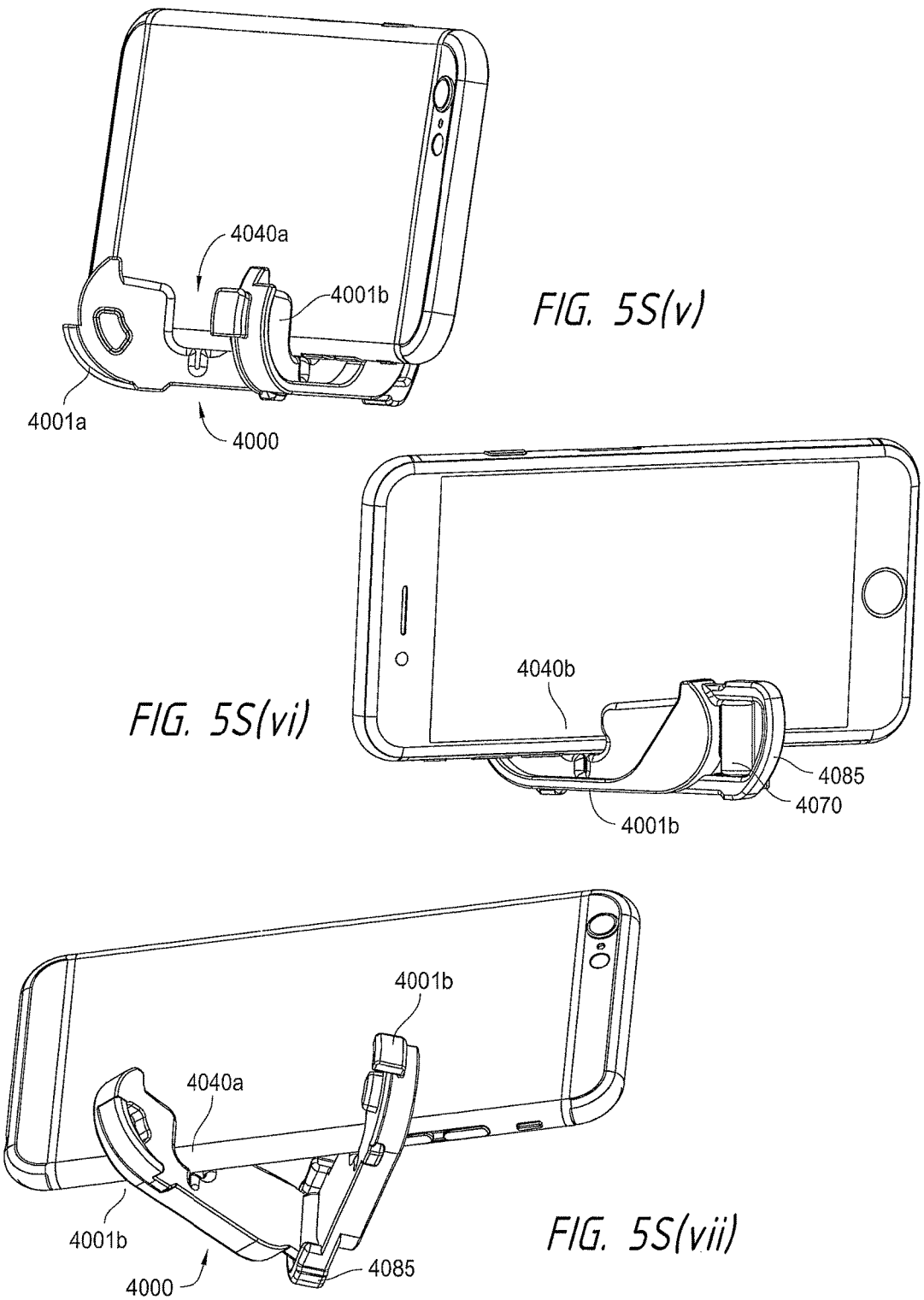

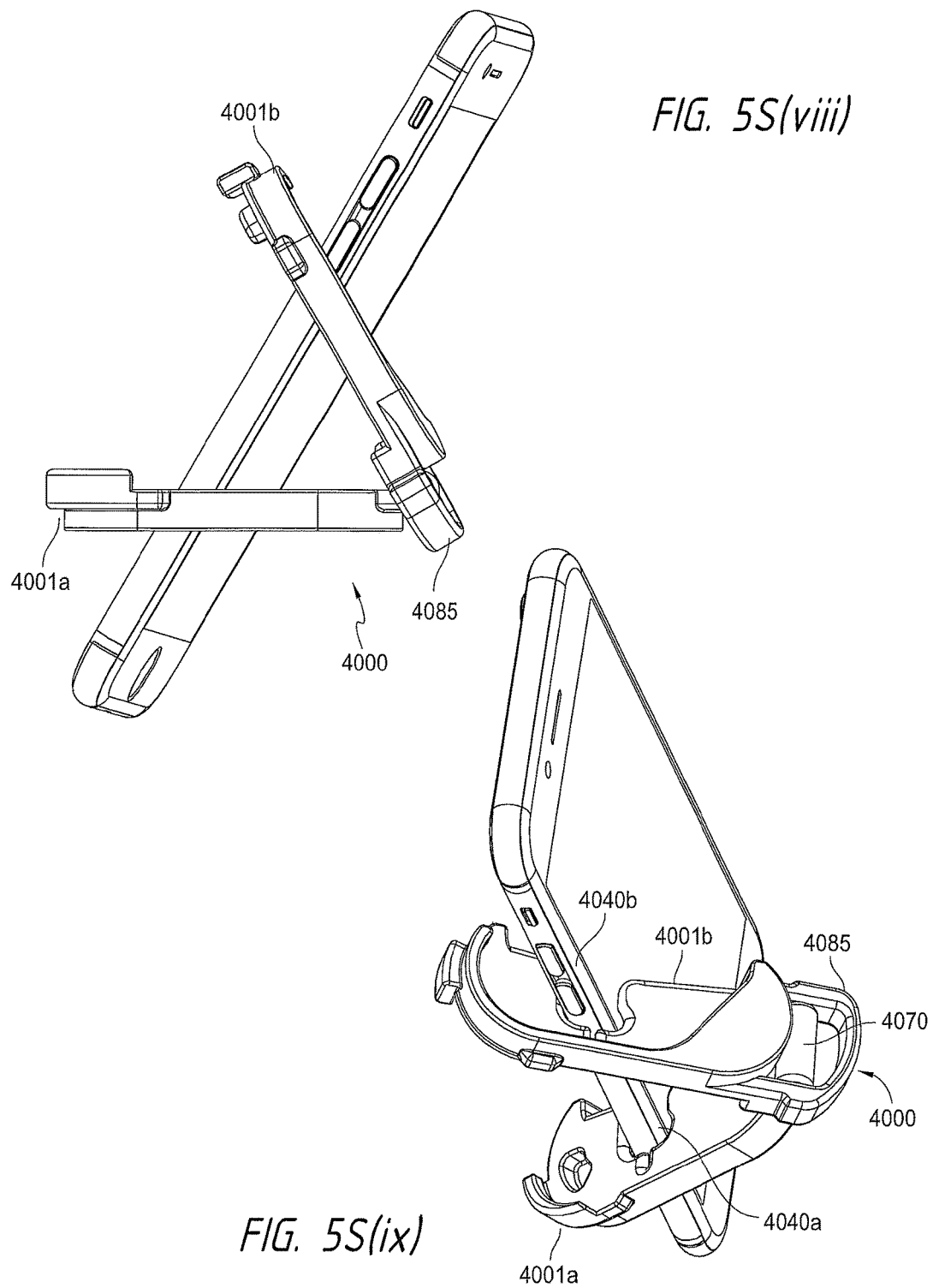

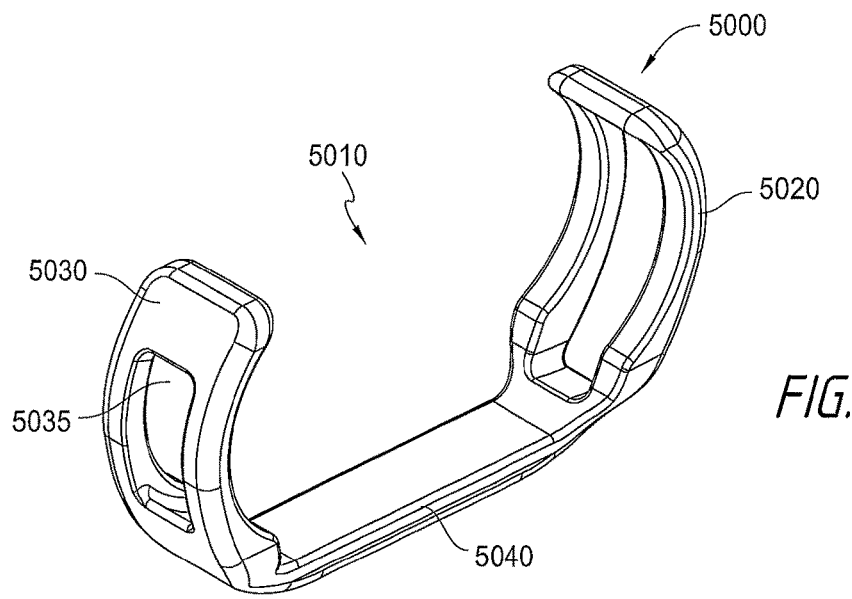
FIG. 5T(i)
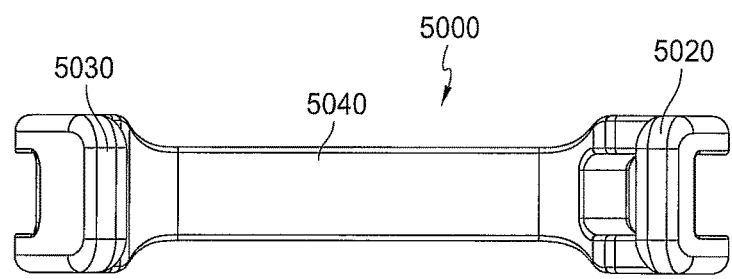
FIG. 5T(ii)
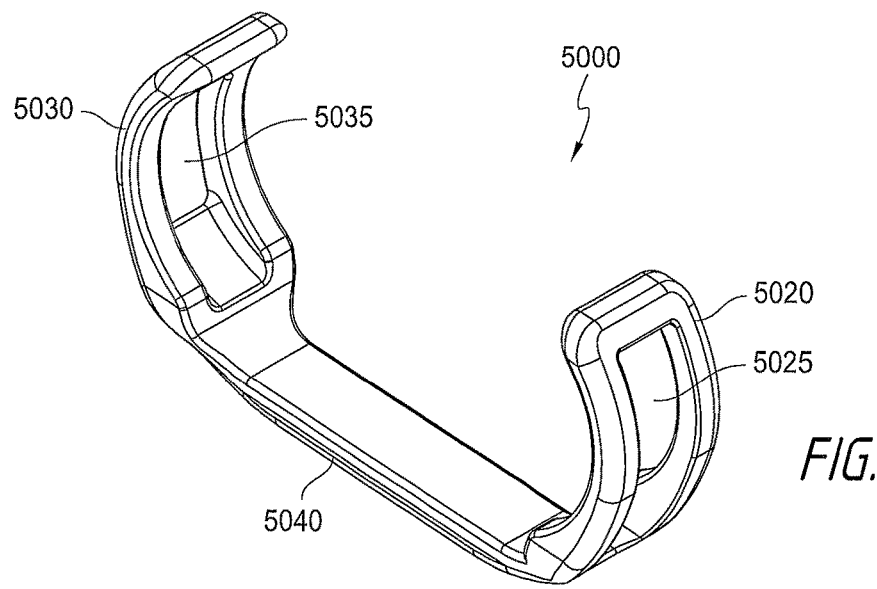
FIG. 5T(iii)

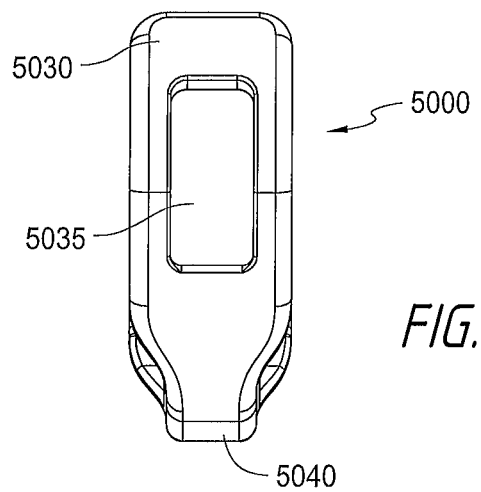
FIG. 5T(iv)
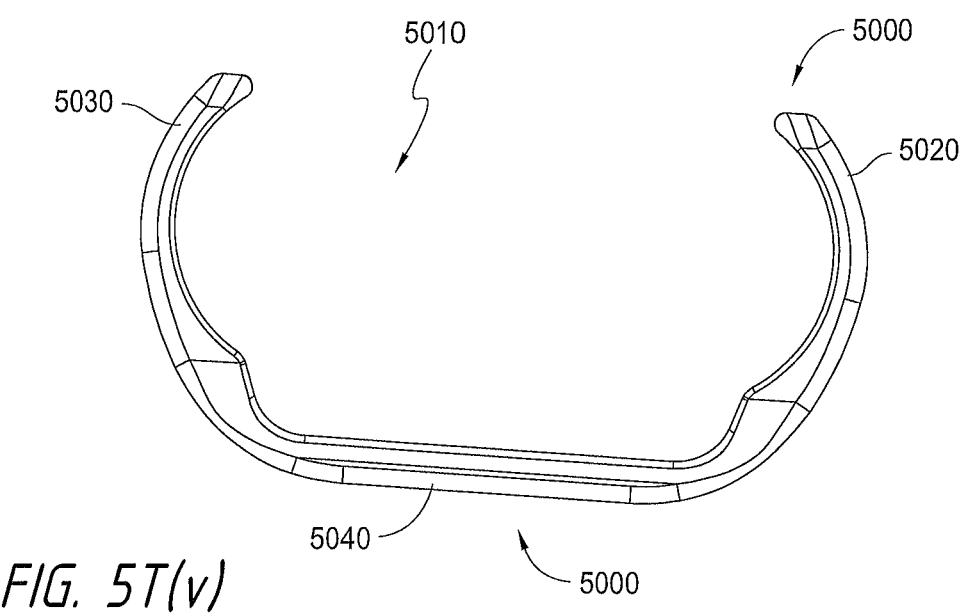
FIG. 5T(v)
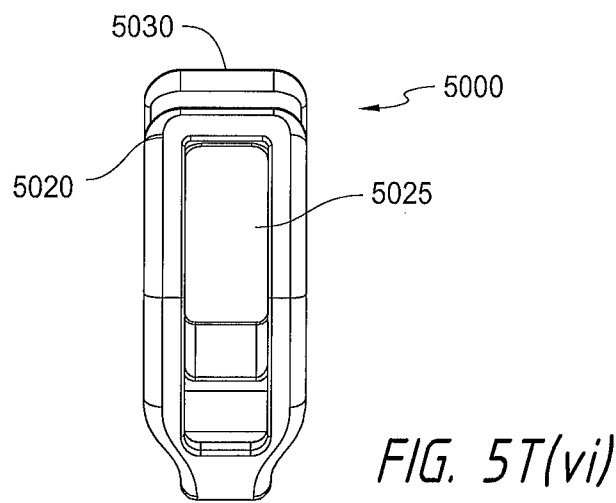
FIG. 5T(vi)

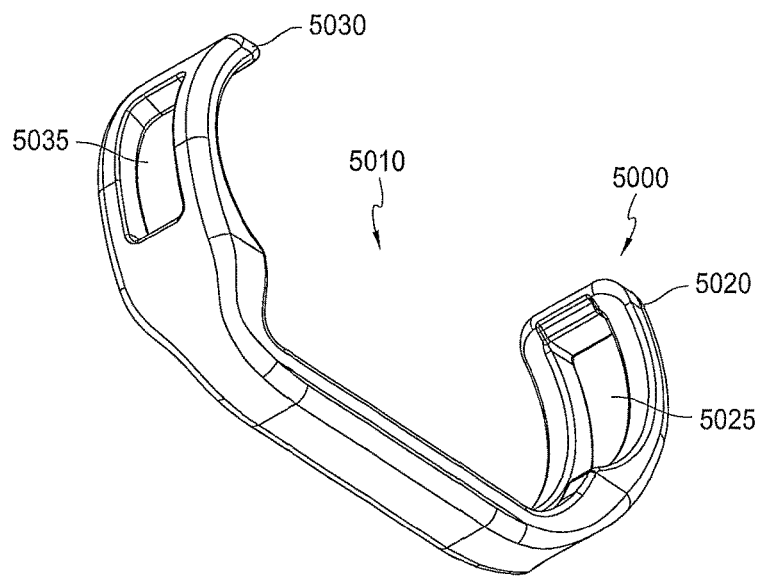
FIG. 5T(vii)
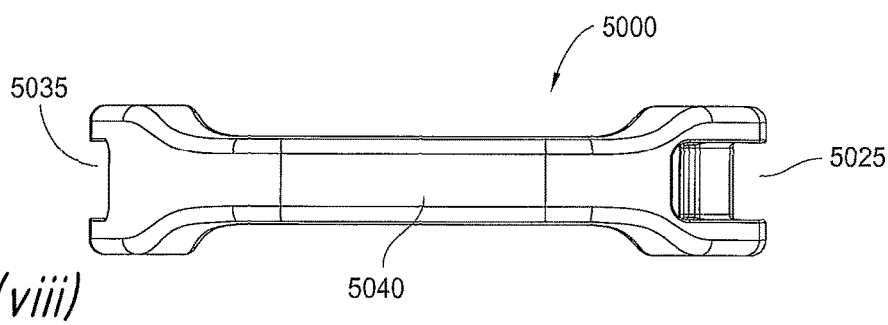
FIG. 5T(viii)
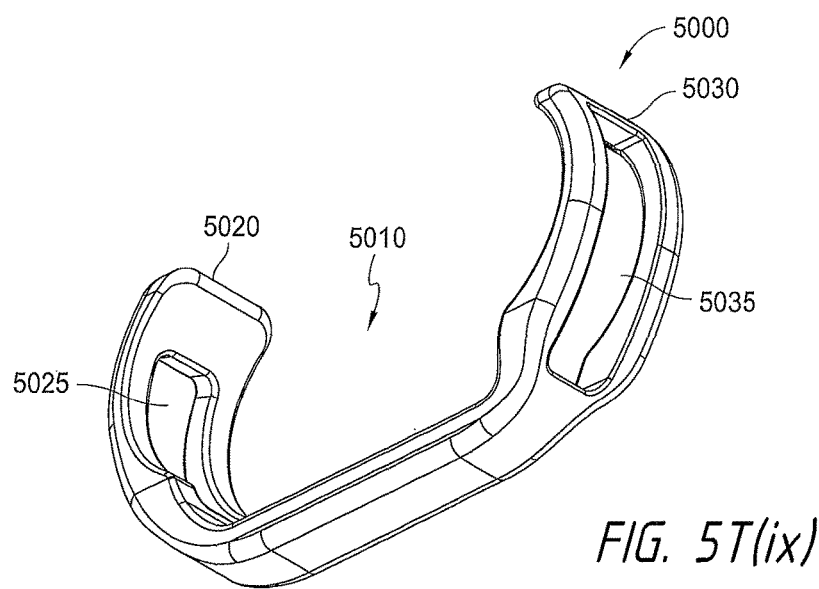
FIG. 5T(ix)

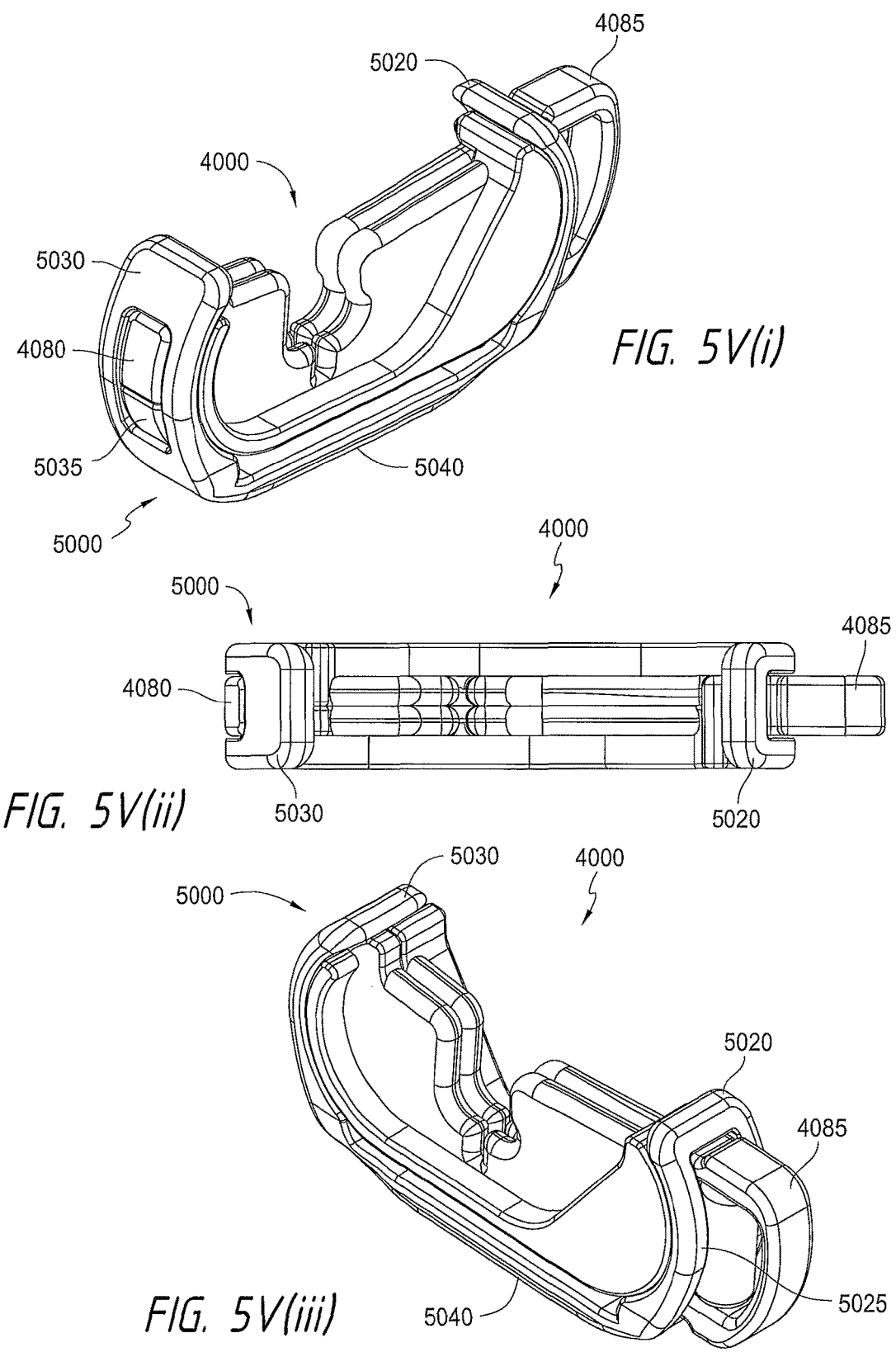

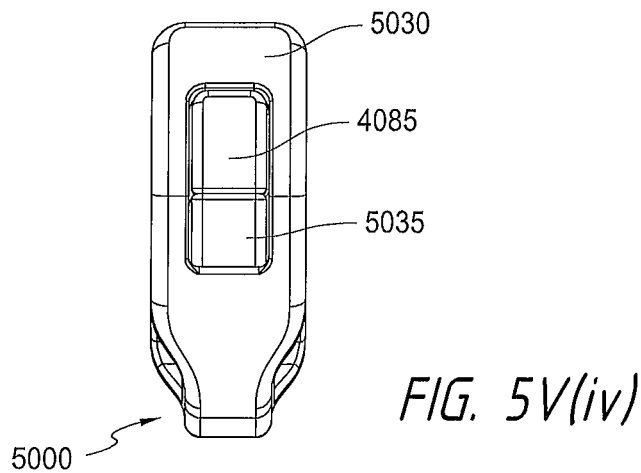
FIG. 5V(iv)
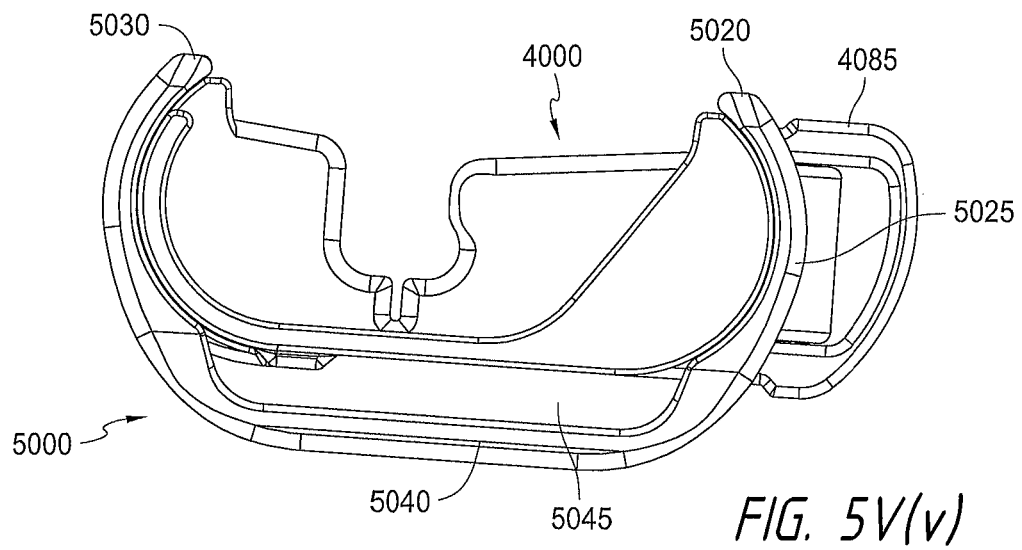
FIG. 5V(v)
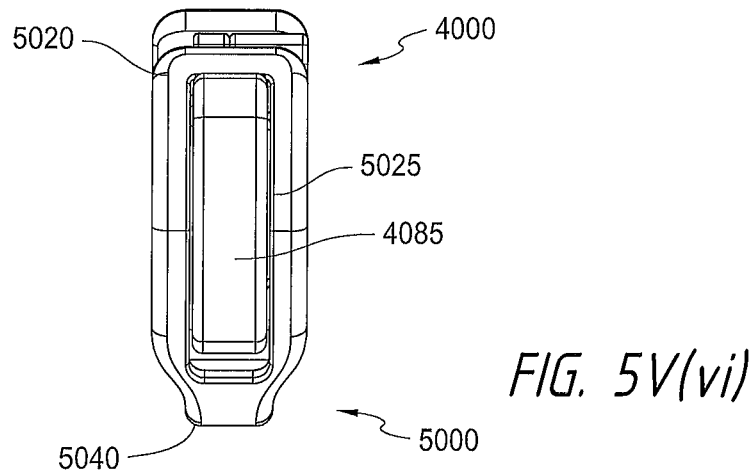
FIG. 5V(vi)

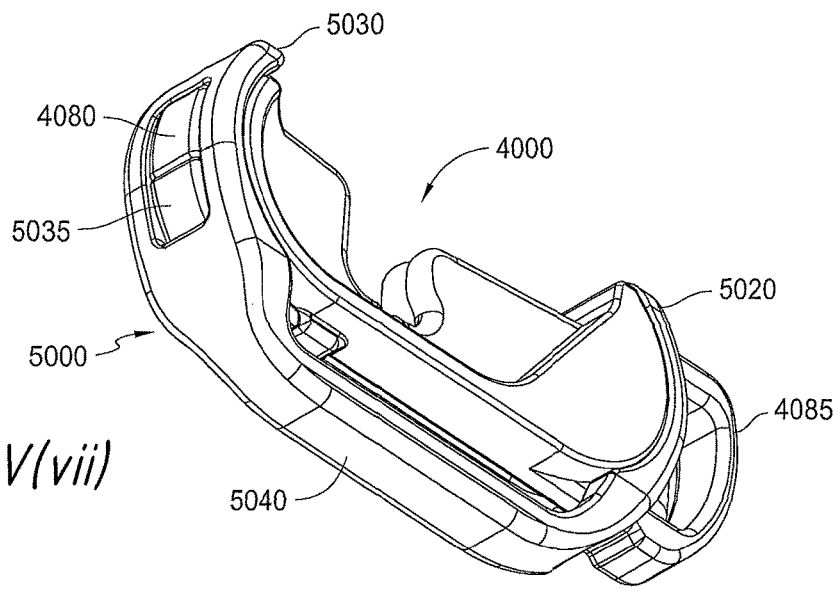
FIG. 5V(vii)
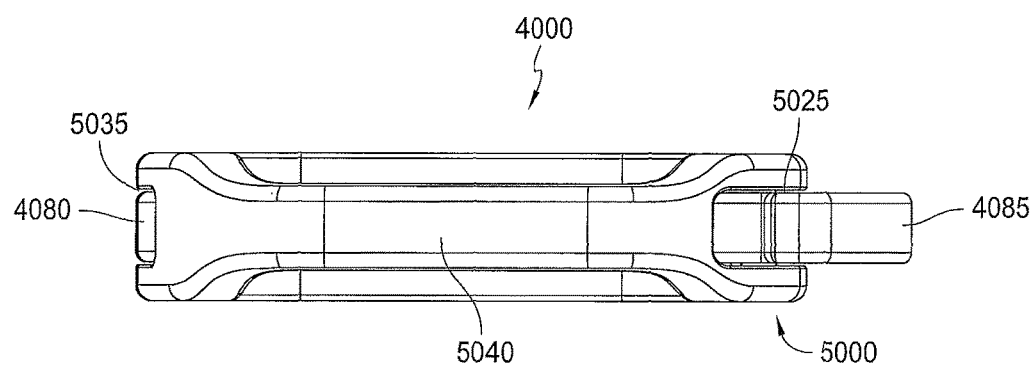
FIG. 5V(viii)
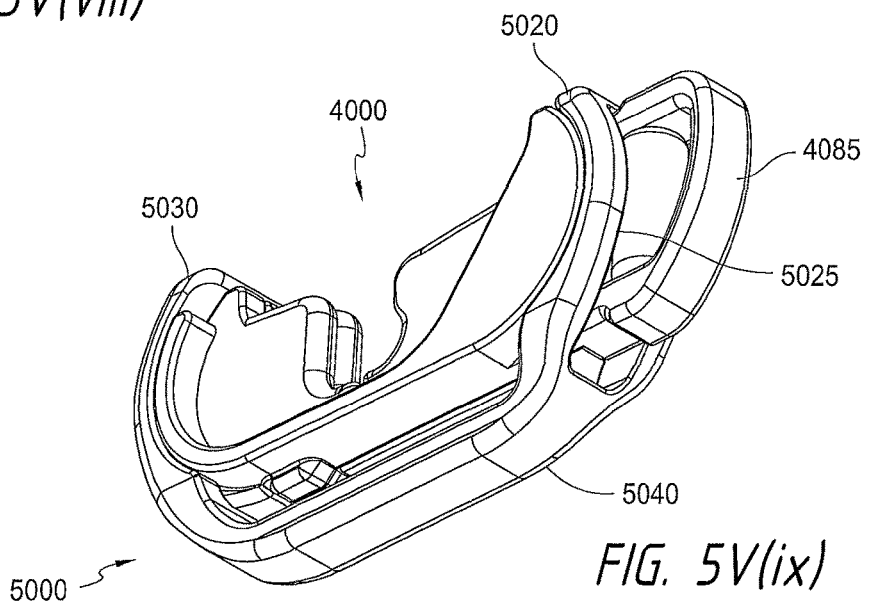
FIG. 5V(ix)

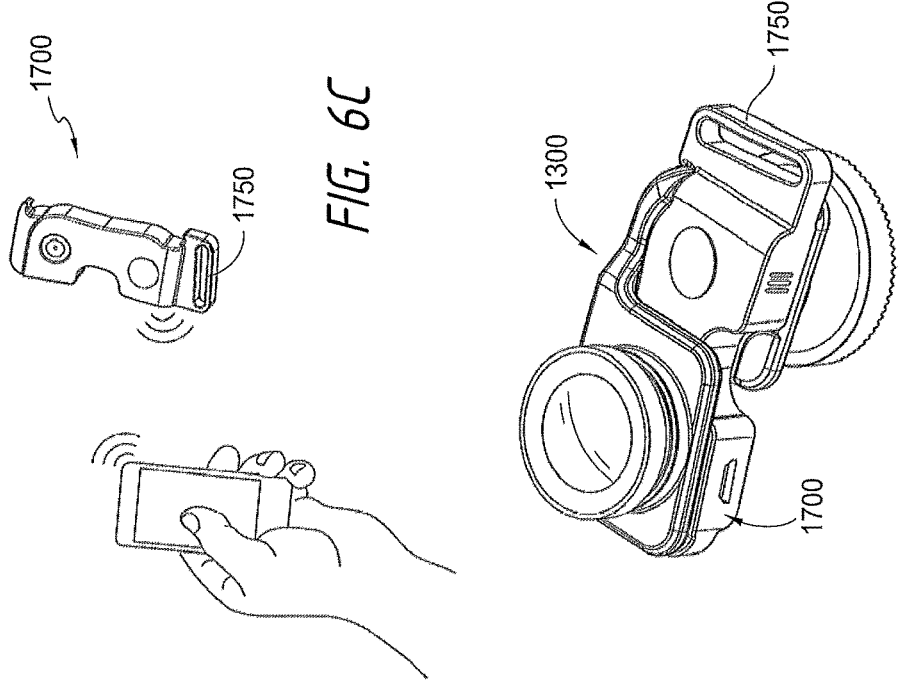
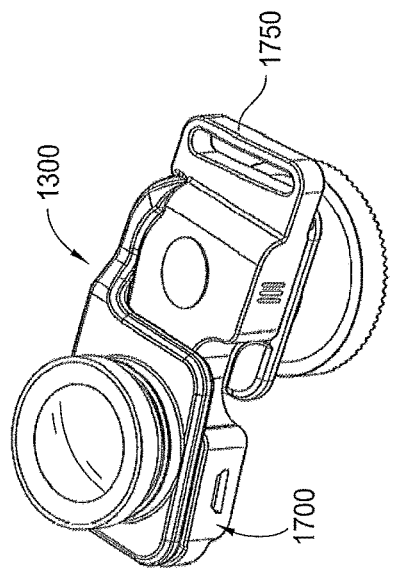
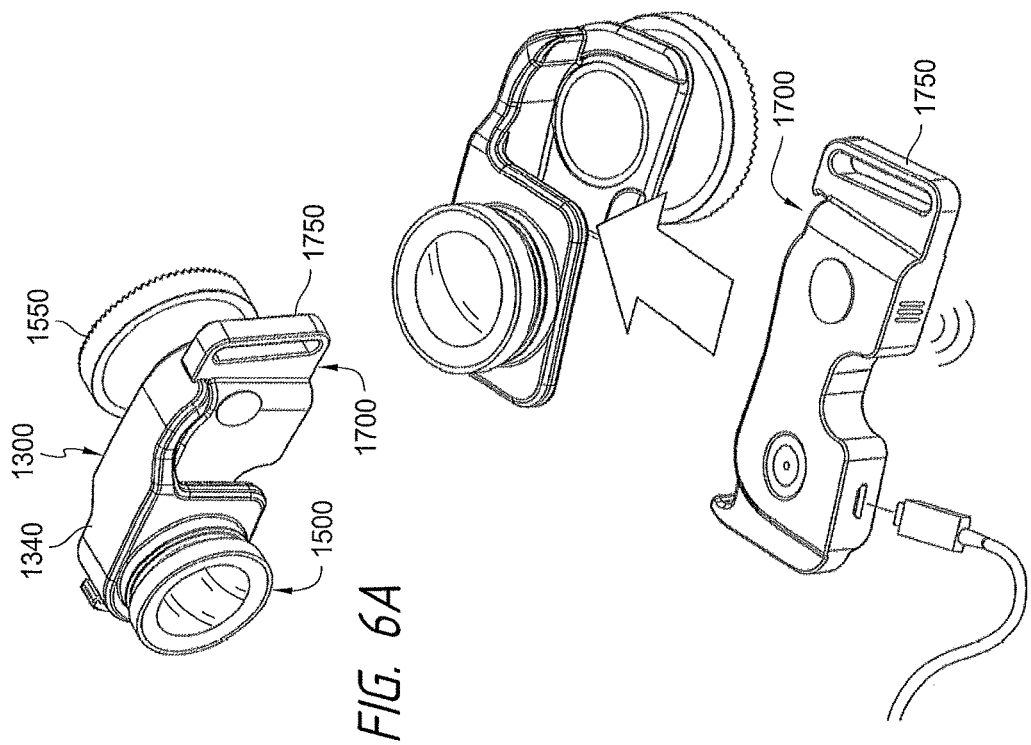
FIG. 6A
FIG. 6B
FIG. 6C
FIG. 6D

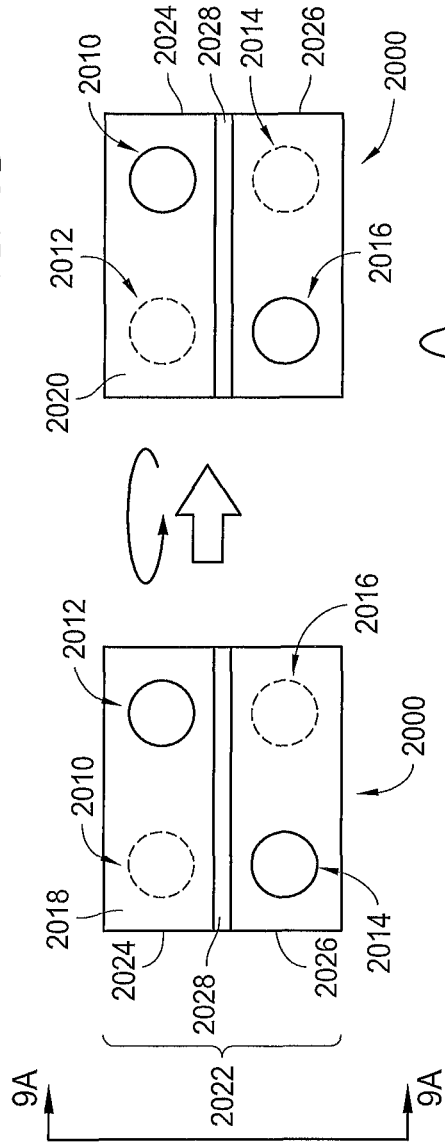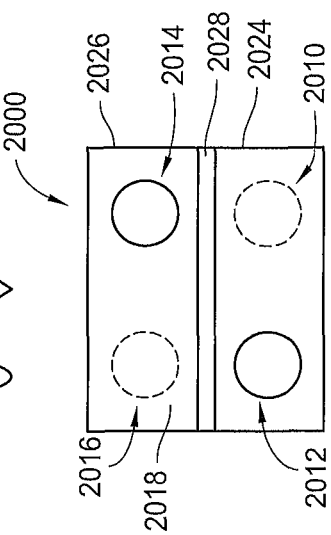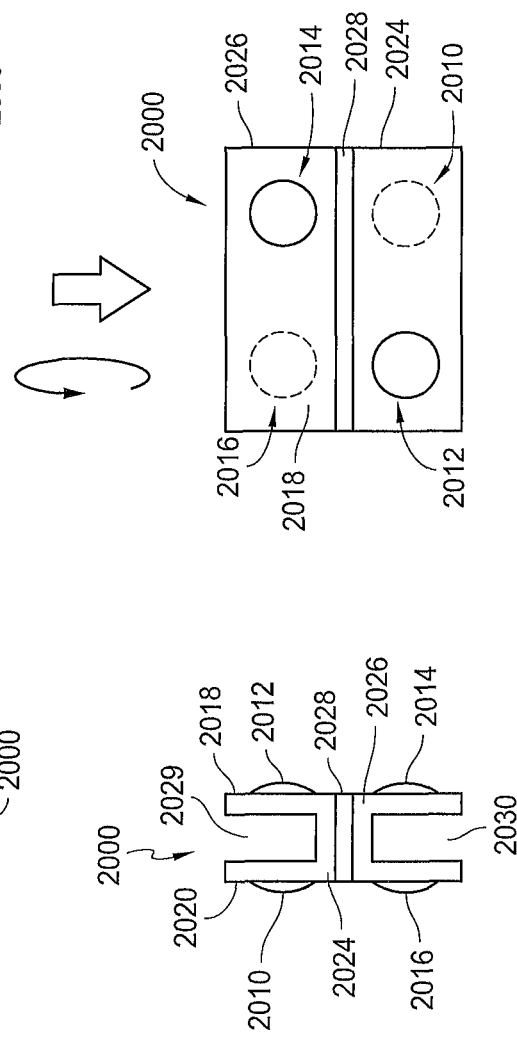

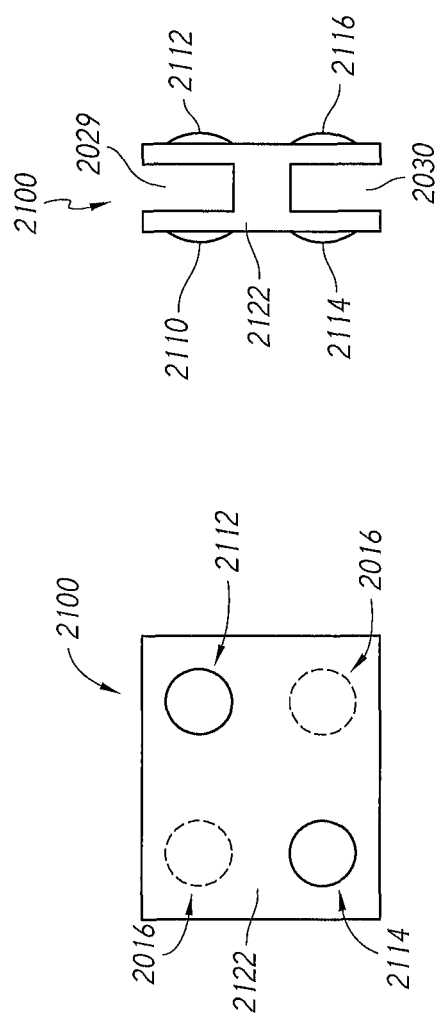

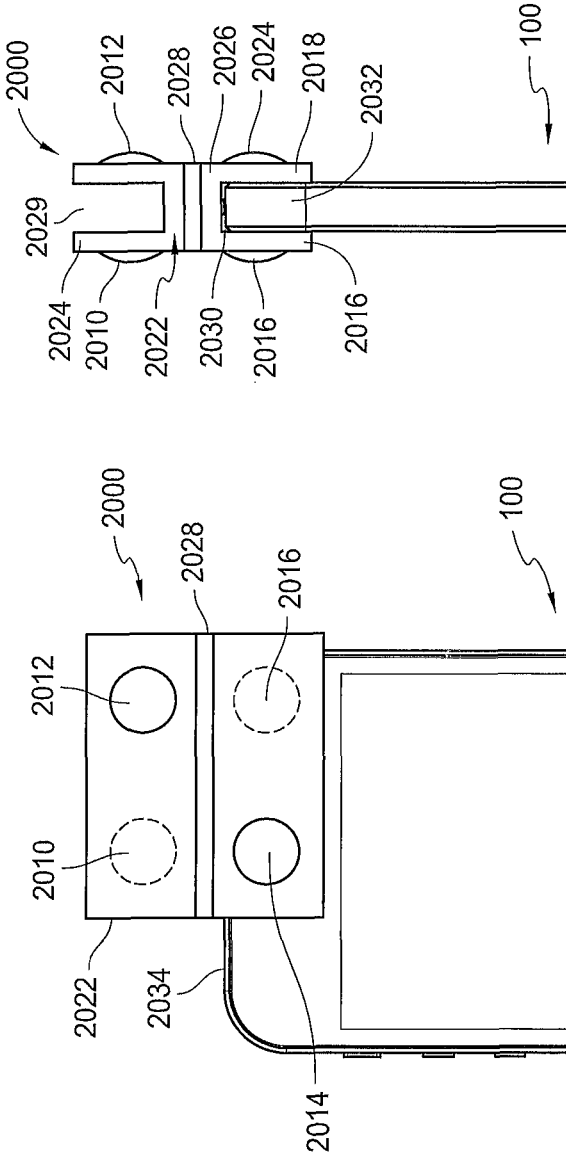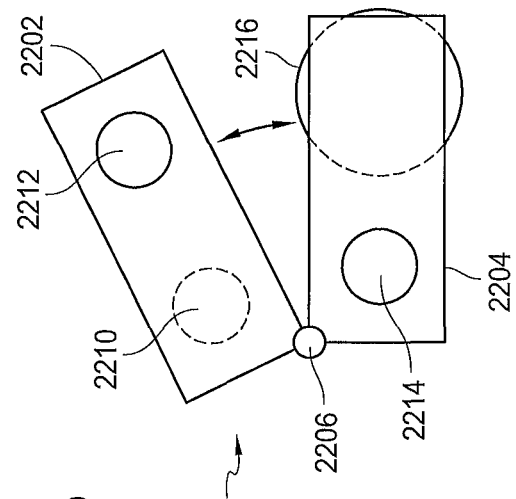
FIG. 12
FIG. 11
FIG. 10

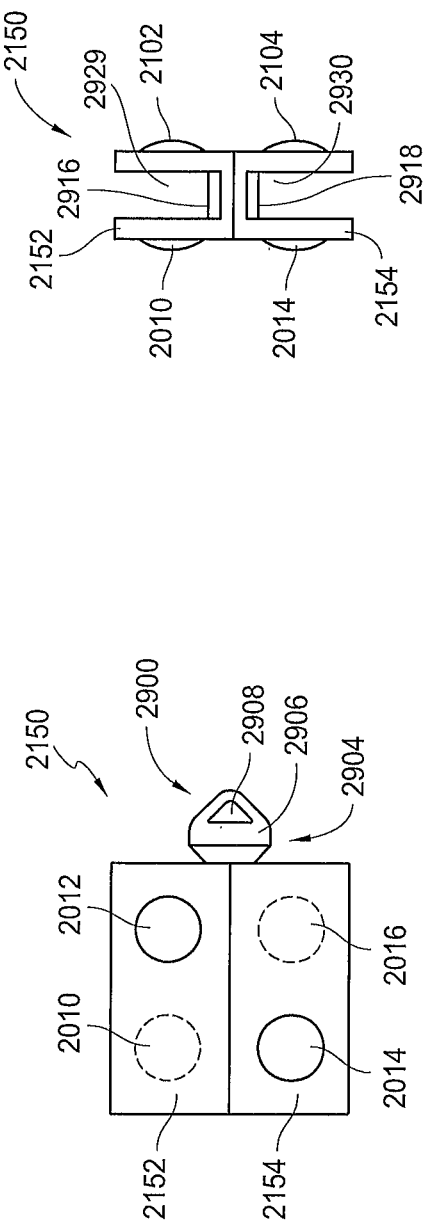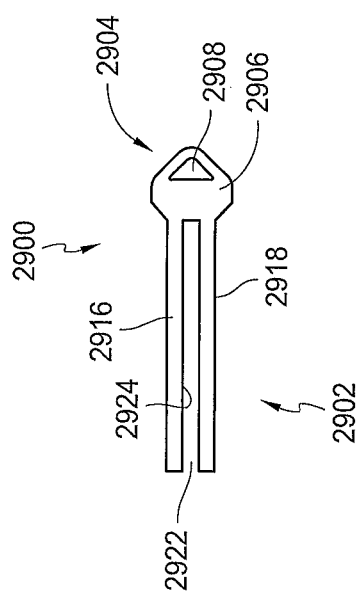

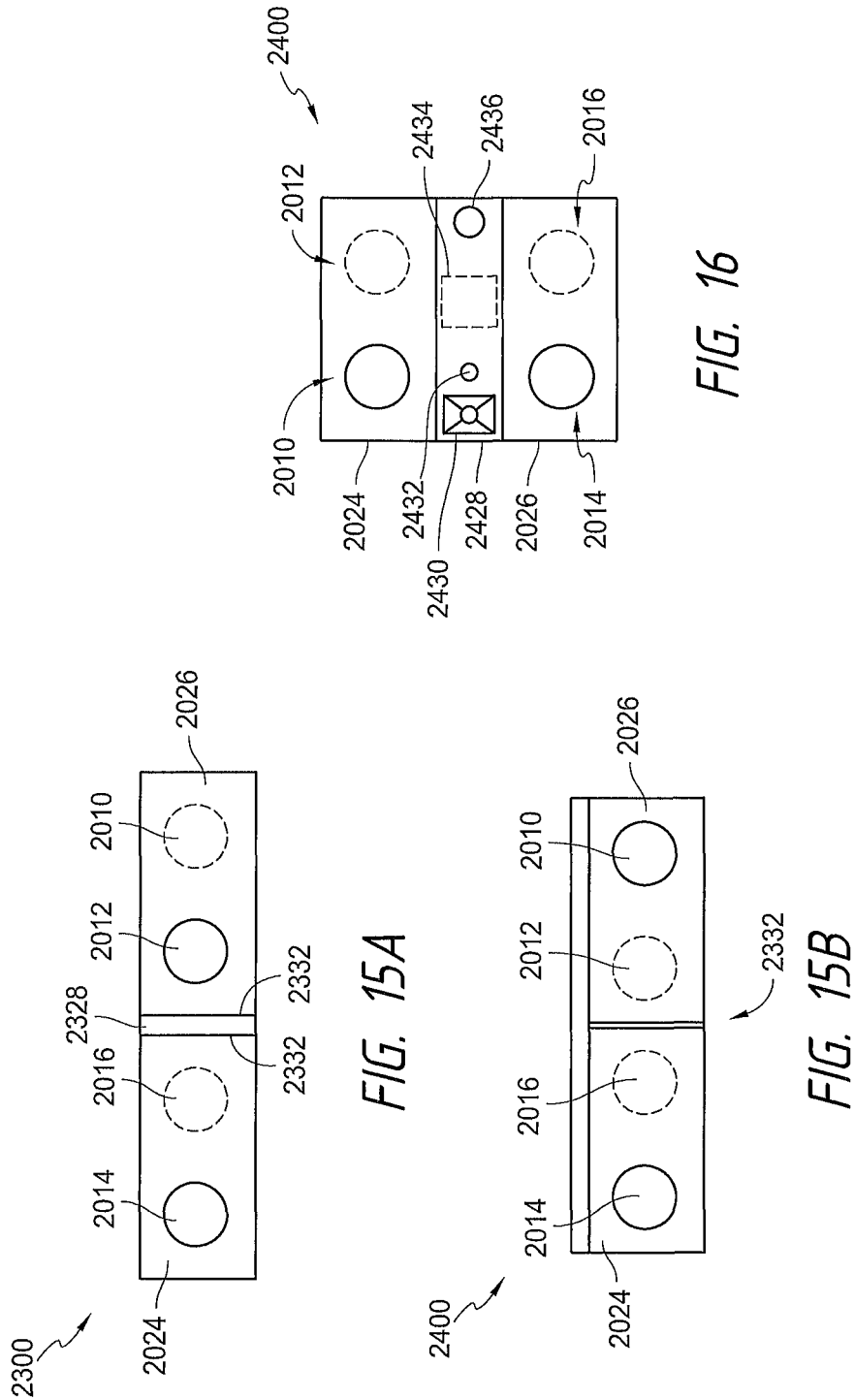

MULTI-LENS OPTICAL ATTACHMENT FOR MOBILE DEVICES

RELATED APPLICATIONS

This application is a continuation of U.S. patent application Ser. No. 14/743,593, filed on Jun. 18, 2015, which claims the benefit of: U.S. Provisional Patent Application No. 62/014,573, filed on Jun. 19, 2014; U.S. Provisional Patent Application No. 62/032,472, filed on Aug. 1, 2014; U.S. Provisional Patent Application No. 62/059,719, filed on Oct. 3, 2014; U.S. Provisional Patent Application No. 62/115,094, filed on Feb. 11, 2015; and U.S. Provisional Patent Application No. 62/140,798, filed on Mar. 31, 2015, all of which are incorporated herein by reference in their entireties for all that they disclose.

BACKGROUND

Field

This invention relates generally to accessories for mobile devices (e.g., mobile telephones, mobile texting devices, personal media players, tablet devices, laptop computers, desktop computers, gaming devices, and/or devices capable of linking electronically to another device or to a network such as the Internet, etc.), and specifically to removable optical components for mobile devices.

Related Art

In recent years, many advances in computer networking and processing technology have made it possible for mobile devices to comprise cameras that permit users to capture images. In many cases, these images can be stored, processed, and transmitted. However, there are many design constraints on onboard cameras in mobile devices that can limit the weight, size, expense, shape, adjustability, flexibility, versatility, feature choices, and overall quality of the lensing systems of such cameras. Consequently, many cameras and mobile devices are inadequate for a wide variety of photographic needs and may produce lower quality photographic images, fewer image options, incompatibilities in attachment structures, weight, optics, size, transportation, storage, ergonomics, and/or portability.

SUMMARY

In some embodiments, a multi-lens system can be configured to be selectively attachable to a mobile electronic device having a user-facing onboard camera lens and an outward-facing onboard camera lens. The multi-lens system can comprise a lens mounting portion, a first lens component mounted to or configured to be mounted to the lens mounting portion, and a second lens component mounted to or configured to be mounted to the lens mounting portion. The multi-lens system can be configured to be selectively attachable to the mobile electronic device in at least a first position and a second position, wherein in the first position the first lens component is configured to be in optical alignment with the user-facing onboard camera lens and simultaneously the second lens component is configured to be in optical alignment with the outward-facing onboard camera lens, and wherein in the second position the first lens component is configured to be in optical alignment with the outward-facing onboard camera lens and simultaneously the second lens component is configured to be in optical alignment with the user-facing onboard camera lens.

In some embodiments, a portable attachment accessory can be configured to be selectively attachable to a lens system that is configured to receive a portion of a mobile electronic device. The portable accessory insert can comprise a first mating portion and a second mating portion, each of the first and second mating portions being configured to couple the portable accessory insert to the lens system, wherein the first mating portion is configured to be coupled with a first alignment portion of the lens system and the second mating portion is configured to be coupled with a second alignment portion of the multi-lens. The portable accessory insert can further comprise a first body portion comprising a support surface, a second body portion attached to the first body portion, and a gap comprising first and second sides, wherein the distance between the first and second sides generally corresponds to a thickness of a portion of the mobile electronic device. The gap can be configured to receive the mobile device between at least the first and second sides, and the support surface can be configured to support the portable accessory insert and the mobile device in a generally upright position.

BRIEF DESCRIPTION OF THE DRAWINGS

Certain embodiments of the inventions will now be discussed in detail with reference to the following figures. These figures are provided for illustrative purposes only and the inventions are not limited to the subject matter illustrated in the figures. For example, the labels and descriptions in text in the drawings are examples only and should not be understood to limit the usage, materials, function, applicability, or any other aspect of the inventions disclosed herein. Rather, such labels and descriptions should be viewed as disclosing some examples of embodiments of a broader genus of structures and features that may or may not comprise specific attributes set forth in text in the drawings.

FIGS. 5P(i)-5P(ix) illustrate multiple views of an embodiment of a portable accessory insert for an optical component system in a closed configuration.

FIGS. 5Q(i)-5Q(ix) illustrate multiple views of another embodiment of the portable accessory insert of FIG. 5P(i)-5P(ix) in an open configuration.

FIGS. 5S(i)-5S(ix) illustrate multiple views of the portable accessory insert of FIG. 5P used with a mobile device.

FIGS. 5T(i)-5T(ix) illustrate multiple views of an attachable accessory.

FIGS. 5V(i)-5V(ix) illustrate multiple views of the attachable accessory of FIGS. 5T(i)-5T(ix) used with the portable accessory insert of FIGS. 5P(i)-5P(ix).

FIGS. 6A-6D illustrate a portable accessory insert used with an electronically enabled optical component system.

FIGS. 8A-8C are front views of an optical component.

FIG. 8D is a front view of another embodiment of an optical component

FIG. 9A is a side view of the optical component of FIGS. 8A-8C, as viewed along line 9A-9A of FIG. 8A.

FIG. 9B is a side view of the optical component of FIG. 8D.

FIG. 10 is a front view of the optical component of FIGS. 8A-8C mounted on a mobile device.

FIG. 11 is a side view of the optical component of FIGS. 8A-8C mounted on a mobile device.

FIG. 12 is a front view of another embodiment of an optical component.

FIG. 14A is a front view of an optical component with an accessory attachment or insert.

FIG. 14B is a side view of the optical component with the accessory attachment or insert of FIG. 14A, as viewed along line 14B-14B of FIG. 14A.

FIG. 14C is a front view of the accessory attachment or insert of FIG. 14A, separated from the optical component.

FIGS. 15A-15B are front views of other embodiments of optical components.

FIG. 16 is a front view of another embodiment of an optical component.

DETAILED DESCRIPTION

Figure 1A:
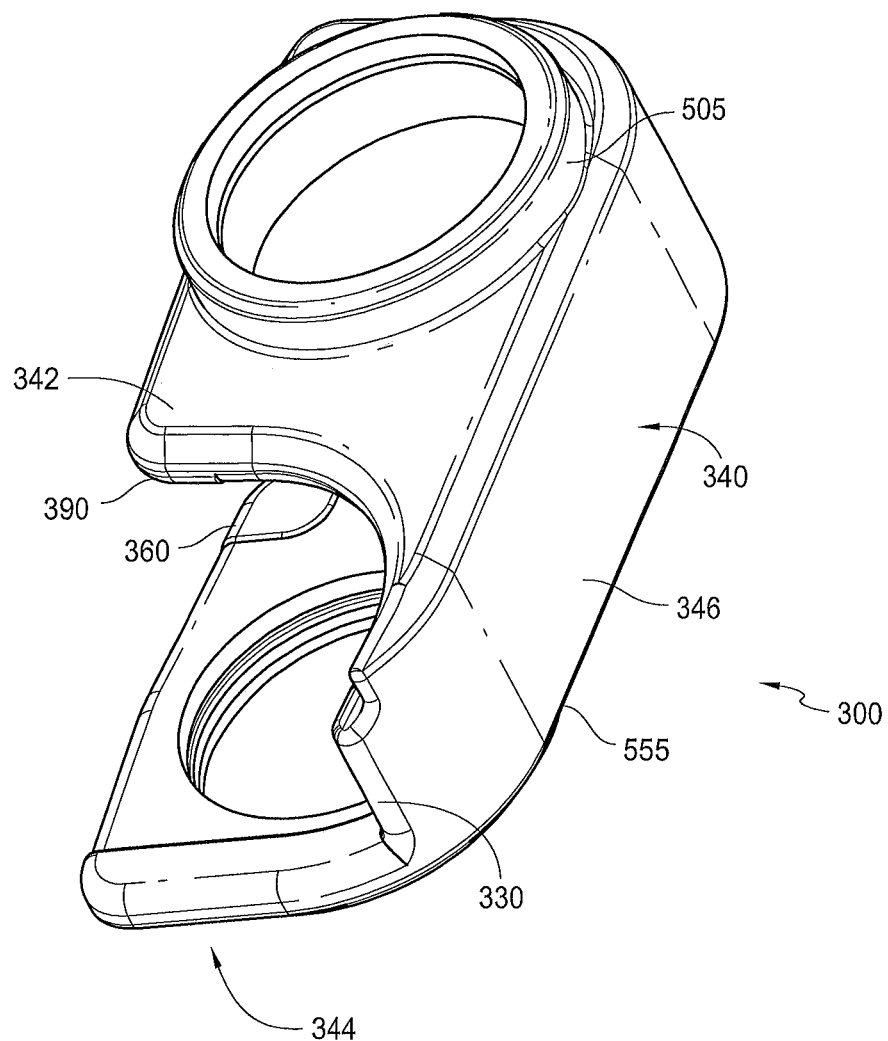
FIG. 1A is an isometric view of an embodiment of a reversible multi-lens system used on a mobile device.
Figure 1B:
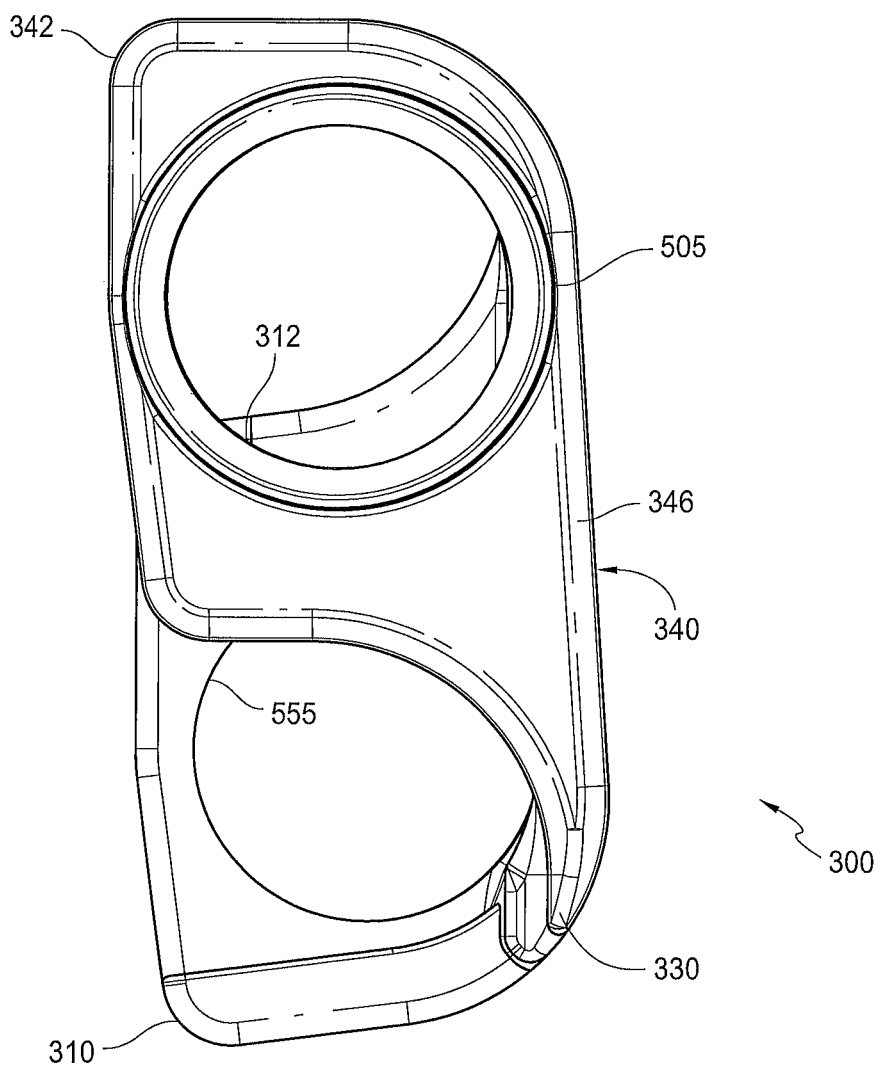
FIG. 1B is a front view of the reversible multi-lens system.

The following detailed description is now directed to certain specific examples of embodiments of the disclosure. In this description, reference is made to the drawings wherein like parts are designated with like numerals throughout the description and the drawings. The inventions are not limited to examples expressly limited or described in this specification. Various examples of auxiliary lensing systems are illustrated in the drawings and/or described in the text of this specification. Any structure, material, function, method, or step illustrated or described in connection with any embodiment in the specification can be used instead of or in combination with any other structure, material, function, method, or step illustrated or described in connection with any other embodiment in the specification. No features, steps, structures, or methods disclosed in the specification are essential or indispensable.

The term "lens" in this specification is used in its ordinary sense, and includes powered lenses (e.g., lenses that focus, magnify, enlarge, or otherwise alter the direction of light passing through the lens), plano lenses (e.g., lenses that are generally planar, lenses that do not taper in thickness, and/or lenses that are not powered), simple lenses, compound lenses, generally spherical lenses, generally toroidal lenses, generally cylindrical lenses, etc. Any imaging device described or illustrated in this specification can include a retainer attached to one or more lenses or optical regions with one or more different features, including but not limited to a constant or variable magnifying lens, a wide-angle lens, a fish-eye lens, a telescopic lens, a macro lens, a constant or variable polarizing lens, an anti-reflection lens, a contrast-enhancing lens, a light-attenuating lens, a colored lens, or any combination of the foregoing, etc.

The terms "mobile electronic devices" and "mobile devices" in this specification are used in their ordinary sense, and include mobile telephones, mobile texting devices, media players, electronic tablet devices, laptop computers, desktop computers, gaming devices, wearable electronic devices (e.g., "smart watches" or "smart eyewear"), and/or mobile electronic communication devices capable of linking electronically to another device or to a network such as the Internet, etc. Some mobile electronic devices include one or more onboard cameras that can be used for various imaging purposes, such as photography and video recording. In addition, some mobile electronic devices include one or more illumination components, such as one or more lights, and/or flashes, etc., that can be used for photography, videography, and/or other purposes (e.g., as a flash light).

Some aspects of this disclosure relate to removably attachable optical systems that provide auxiliary lenses or other optical elements for use with mobile devices. In some embodiments, the optical systems are reversible and/or can include multiple (e.g., two or more) onboard camera lenses. Many mobile devices have a rear or user-facing onboard camera lens as well as a forward or outward-facing onboard camera lens. The user-facing onboard camera lens of a mobile device is typically located on the same face as a display screen. The display screen can provide a substantially real-time preview of an image that can be captured or is currently being captured using the user-facing camera. Therefore, the user-facing camera can be used to create a so-called "selfie" image such as a video or photograph of the user (and others with the user) and/or the scenery behind the user, without rotating the mobile device and while simultaneously viewing such image. In some embodiments, the optical system can be configured to be especially useful in creating "crowd selfies" (images of multiple persons) or "scenery selfies" (images with one or more persons and a wide background or foreground scene) because the optical system can include an auxiliary lens that is configured to provide an optical feature that is especially advantageous in such settings, such as a wide-angle or fish-eye lens that allows more people and/or more scenery to be included in an image. The forward or outward-facing camera is typically located on a face of the mobile device opposite the face with the display screen. The display screen can provide a substantially real-time preview of any image that can be captured or is currently being captured using the outward-facing camera. Therefore the outward-facing camera can be used to take images of people, objects, and scenes in front of the user (e.g., the mobile device is located between the user and the scene to be photographed).

Some auxiliary lensing systems can be removably attached to, or used with, mobile electronic devices to selectively enhance or otherwise change an image created from light that is transmitted through an onboard camera lens of the mobile electronic devices. For example, U.S. Pat. No. 8,279,544, titled "Selectively Attachable and Removable Lenses for Mobile Devices," which issued on Oct. 2, 2012, the contents of which are hereby incorporated by reference and included in the attached Appendix A, discloses various mounting structures and features for removably attachable auxiliary lensing systems. Such removably attachable auxiliary lensing systems may be secured to a mobile electronic device by a clip that contacts generally opposing sides of the electronic device. The lens components may comprise one or more lenses (e.g. one side may have a fisheye lens, while the generally opposing side may have of wide-angle, micro, telephoto, or some other photographic lens). Some auxiliary lensing systems provide an auxiliary lensing system for only the user-facing camera or the outward-facing camera, but not both cameras simultaneously. Some auxiliary lensing systems provide an auxiliary lens for each of the user- and outward-facing cameras, but the lens systems cannot easily be reversed such that the lens used with the outward-facing camera can be used with the user-facing camera and vice-versa.

The reversible multi-lens systems illustrated and described in some embodiments herein can provide interchangeable, reversible auxiliary lenses for both the user- and outward-facing cameras of mobile devices. The reversible multi-lens systems may include a clip portion that secures the multi-lens system to mobile devices such that multiple auxiliary lenses are automatically and simultaneously positioned in optical alignment with multiple onboard camera lenses of the mobile devices. In this way, the multi-lens systems can provide optical enhancement to each of the corresponding onboard camera lenses, thereby allowing users to switch between the user- and outward-facing cameras and still obtain the optical enhancements provided by the multi-lens systems without the need for manual alignment, manipulation, or configuration. Moreover, a user may remove, reverse, and reattach the reversible multi-lens system to the mobile device, thereby swapping the auxiliary lens from the user-facing onboard camera lens to the outward-facing onboard camera lens and vice-versa, without requiring the user to remove and replace one or more individual lenses from a retainer portion of the lens system. For example, a reversible multi-lens system may provide a plurality of auxiliary lenses with different optical enhancements or effects, such as a fisheye lens and a telephoto lens. By removing, reversing, and reattaching the retainer portion of the reversible multi-lens system to the mobile electronic device, the user can switch between using each of the provided lenses with each of the onboard cameras at the user's discretion in a simple and quick motion.

Although examples and embodiments of the present disclosure will be described with respect to a reversible multi-lens system that includes two or more lenses (and is therefore referred to as a "dual-lens system" or a "dual-lens component"), the examples are illustrative only and are not intended to be limiting. In some embodiments, the reversible multi-lens system may include only one lens or more than two lenses (e.g., three, four, or more), or the mobile device may include only one onboard camera or more than two onboard camera lenses (e.g., three, four, or more), etc. Various aspects of the disclosure will now be described with regard to certain examples and embodiments, which are intended to illustrate but not limit the disclosure.

Lens System

FIGS. 1A-1E illustrate several different views of an example dual-lens system. The dual-lens system 300 can comprise a retainer portion or body portion or clip 340 and lens mounting portions 505, 555. The body portion 340 can comprise a first sidewall 342, a second sidewall 344, and an upper wall 346 that extends between the first and second sidewalls 342, 344. The upper wall 346 can comprise a mobile device switch hollow 370 and one or more main alignment components, such as a first upper wall alignment protrusion 330 and a second upper wall alignment protrusion 320. The first sidewall 342 can comprise one or more sidewall alignment components, such as a first sidewall alignment protrusion 314 and a second sidewall alignment protrusion 316. The second sidewall 344 can comprise one or more additional sidewall alignment components, such as a third sidewall alignment protrusion 310 and a fourth sidewall alignment protrusion 312. As described in greater detail below, the alignment components of the upper wall and/or sidewalls can be used to facilitate automatic and repeatable alignment of the lenses mounted to the dual-lens system 300 with onboard camera lenses of the mobile device in two or more distinct positions.

In some embodiments, as illustrated, one or both lateral regions of the body portion 340 can be open such that there is no lateral wall on one or both sides, which can facilitate attachment reversibility of the body portion 340 on a mobile electronic device, especially when the optical centerlines of the onboard cameras of the mobile electronic device to which the body portion 340 is configured to attach are not generally co-axial. In some embodiments, as illustrated, the body portion 340 when attached is configured to contact the front surface, the back surface, one or more corners, and/or a top portion of a mobile electronic device only, and does not contact one or more of the lateral sides of the mobile electronic device and/or does not contact the bottom of the mobile electronic device. In some embodiments, as illustrated, the body portion 340 is configured not to extend across the entire top portion of the mobile electronic when attached to a mobile electronic device; rather, the body portion 340 is configured to extend less than the entire distance across the top portion of the mobile electronic device when attached to a mobile electronic device. In some embodiments, as illustrated, the body portion 340 is configured to attach to a mobile electronic device by way of a friction fit, in a single on and off sliding motion, without requiring permanent mounts or dynamic mounts, such as screws, pinching clips, hinges, cams, and/or clamps, etc.

The first sidewall 342 and the second sidewall 344 can be positioned generally parallel to each other, and may have a similar thickness. The upper wall 346 can be generally orthogonal to the first and second sidewalls 344, and can extend between or connect the first sidewall 342 and the second sidewall 344. The first sidewall 342, second sidewall 344, and upper wall 346 can be portions of a single, unitary structure that forms the retainer or clip or main body portion 340 of the dual-lens system 300. In some embodiments, the first sidewall 342, second sidewall 344, and/or upper wall 346 can be separate, discrete components, such as discrete components that that are glued, sonically welded, or otherwise temporarily or permanently attached to each other to form the retainer or clip or main body portion 340 of the dual-lens system 300. In some embodiments, as illustrated, the first and second sidewalls 342, 344 can be laterally offset or misaligned, partially or entirely, from each other.

The first sidewall 342 and the second sidewall 344 can be spaced apart to form a channel. The width of the channel (e.g., the distance between the respective sidewalls) can be configured to be generally complementary to the thickness of a portion of the mobile device 100 on which the dual-lens system 300 is configured to attach. In some embodiments, the natural width of the channel can be approximately the same size or slightly smaller than the thickness of a corner or edge of a mobile device (such as the mobile device 100 illustrated in FIGS. 7A and 7B). In some embodiments, one or both of the sidewalls 342, 344 and/or the upper wall 346 can include an accessory attachment component, such as a loop that can be used to attach a lanyard or a key ring.

Figure 3A:
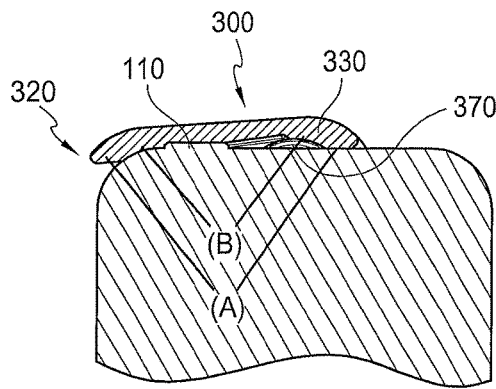
FIGS. 3A, 3B, and 3C are section views of the reversible multi-lens system on a mobile device.
Figure 3B:
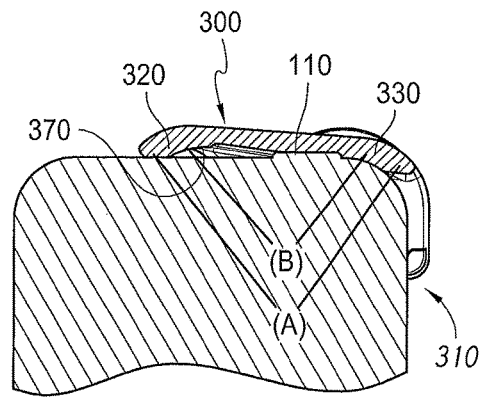
Figure 3C:
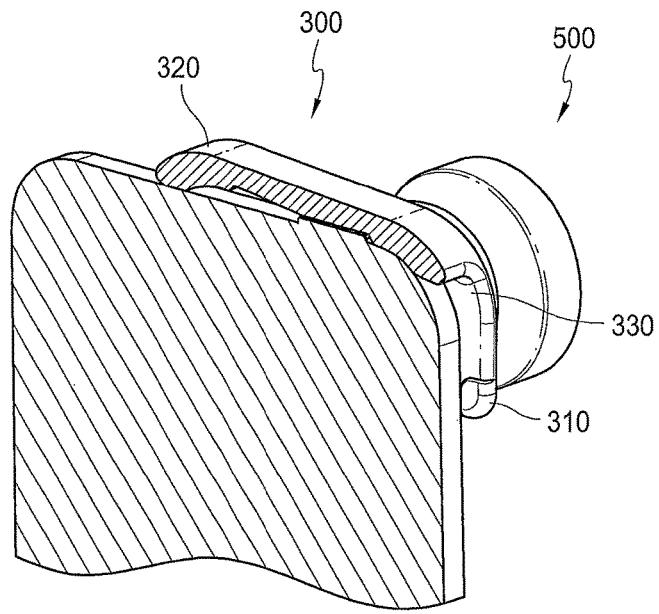
Figure 7A:
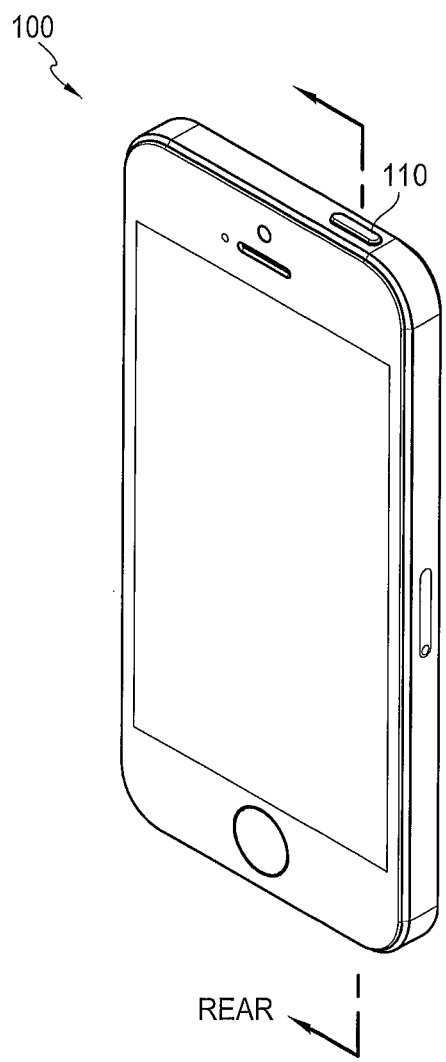
FIG. 7A illustrates a rear view of a mobile device.

The mobile device switch hollow 370 can have a generally rectangular box shape, similar or larger than the volumetric size of the mobile device input button 110 shown in FIG. 7A (e.g., a power or volume button). The mobile device switch hollow 370 can be on the inner surface of the upper wall 346, as shown in FIG. 1E. As shown in FIGS. 3A-3C, the position of the mobile device switch hollow 370 can be generally aligned with and generally conform to the position and size of the mobile device input button 110. The position, shape, and size of the mobile device switch hollow 370 can be configured to prevent unintentional activation of the mobile input button 110 as the dual-lens system 300 is being attached and remains attached to the mobile device 100. In some embodiments, the mobile device switch hollow 370 can be a recess on the upper wall 346. In some embodiments, all or part of the upper wall 346 is flexible, such that a user may press the top surface to actuate the mobile device input button 110. In some embodiments, the upper wall can have a protrusion on the top surface, positioned above the mobile device switch hollow 370, that allows a user to actuate the mobile device input button.

The body portion 340 may include alignment components, such as upper wall and/or sidewall alignment protrusions, that facilitate automatic alignment of optical elements coupled to the body 340 with onboard camera lenses of a mobile device. When the dual-lens system 300 is attached to a mobile device, each alignment component (or some combination of alignment components) can serve to inhibit the movement of the dual-lens system 300 in one or more directions with respect to the onboard camera lenses of the mobile device. For example, one or more alignment components may inhibit or prevent movement in a generally lateral direction (e.g., from one side toward another side of the mobile device) once the lateral location of the body portion 340 reaches a desired location with respect to the onboard camera lenses of the mobile device. In addition or alternatively, one or more alignment components may inhibit or prevent movement in a generally longitudinal direction (e.g., from top-to-bottom or vice versa) once the longitudinal location of the body portion 340 reaches a desired location with respect to the onboard camera lenses of the mobile device. In this way, any lenses or other optical elements coupled to the body portion 340 may be automatically positioned in coaxial optical alignment with corresponding onboard camera lenses of the mobile device when the dual-lens system 300 is completely attached to the mobile device, without requiring manual user adjustment to ensure proper coaxial optical alignment. In some embodiments, the alignment components can be shaped, sized, located, and/or oriented so as to permit reversible attachment to a mobile electronic device, wherein a plurality of alignment components are configured to facilitate attachment between the body portion 340 and a mobile electronic device in each of a plurality of different orientations or attachment modes of the body portion 340 on the mobile electronic device.

As shown in FIGS. 1A-1E, the first upper wall alignment protrusion 330 and the second upper wall alignment protrusion 320 can be at or near the outer periphery of the upper wall 346, such as at or near the edges of the upper wall 346 that are generally orthogonal to the first and second sidewalls 342, 344. In some embodiments, the first and second upper wall alignment protrusions 330, 320 may not be connected to the first and second sidewalls 342, 344 (e.g., there may be a groove or gap between an upper wall alignment protrusion and the first and/or second sidewalls). The first and second upper wall alignment protrusions 330, 320 can extend downward from the upper wall 346 and may be generally parallel to each other. In some embodiments, the first and second upper wall alignment protrusions 330, 320 can have a thickness of about 0.5 to about 1.5 mm. The first and second upper wall alignment protrusions 330, 320 may have curved tips or outer edges. In some embodiments, as illustrated in FIGS. 1A-1E, the first and second upper wall alignment protrusions 330, 320 can comprise two legs of the upper wall 346 generally in a shape of a curvilinear arch In some embodiments, the upper wall 346 does not include alignment protrusions and can facilitate or otherwise ensure proper alignment with respect to the onboard camera lenses of the mobile device through its shape, material, or other features.

Figure 1C:
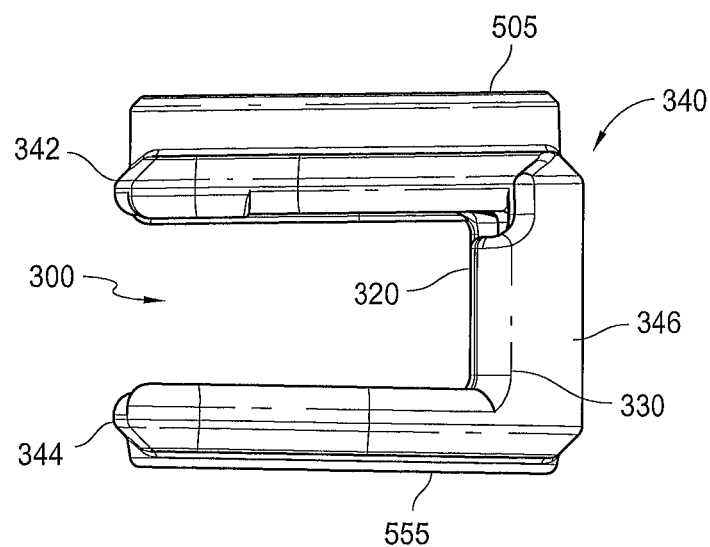
FIG. 1C is a side view of the reversible multi-lens system.
Figure 1D:
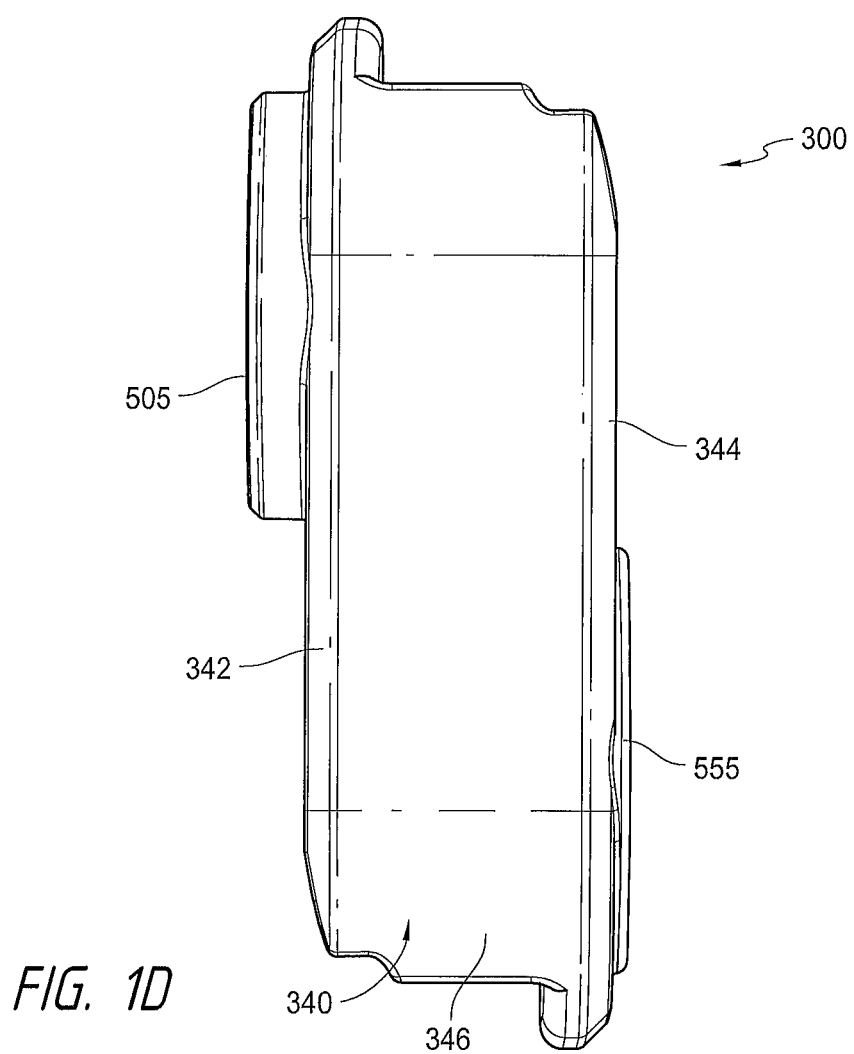
FIG. 1D is a top view of the reversible multi-lens system.
Figure 1E:
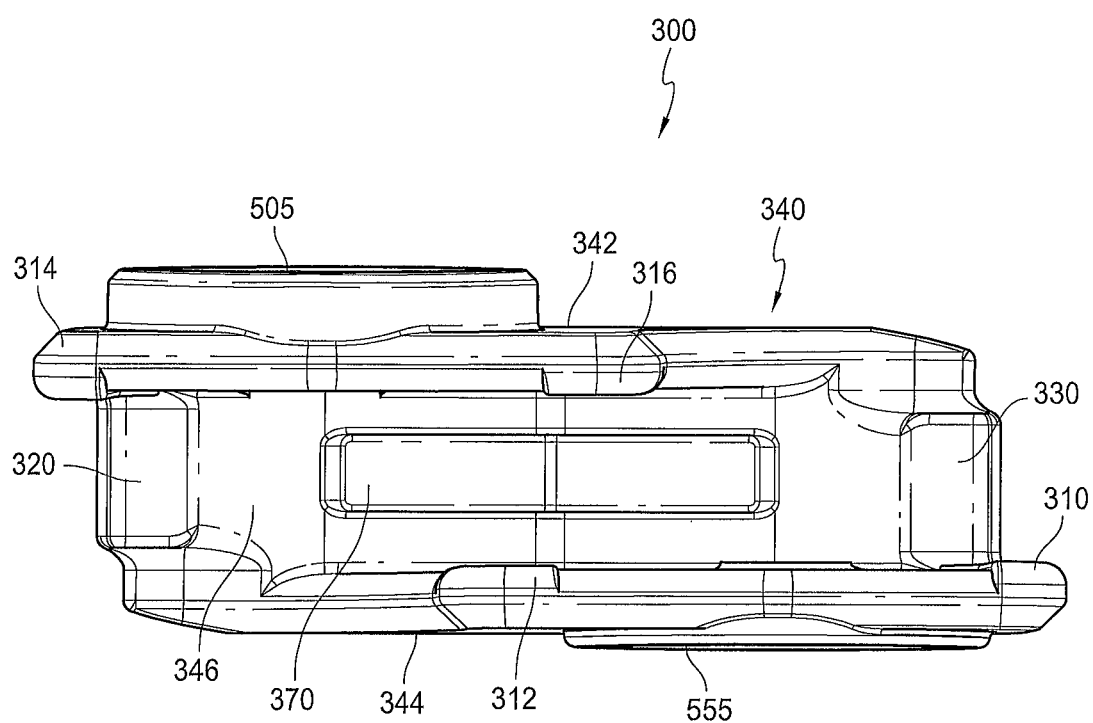
FIG. 1E is a bottom view of the reversible multi-lens system.
Figure 7B:
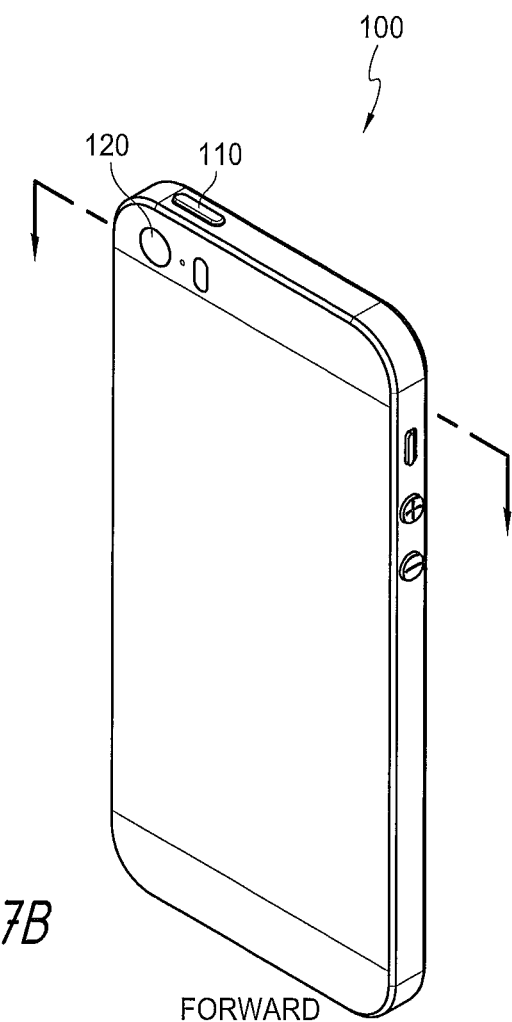
FIG. 7B is a forward view of a mobile device.

The first lens mounting portion 505 can be a recess on the first sidewall 342, for example, a circular recess in the center as shown in FIGS. 1A-1E. The second lens mounting portion 555 can be a recess in the second sidewall 344 as shown in FIGS. 1C-1E. The central axes of the first lens mounting portion 505 and the second lens mounting portion 555 are spaced apart from each other, such that the center of the recess of the first lens mounting portion 505 and the center of the recess of the second lens mounting portion 555 are not coaxial. Such configuration can allow using the first and second lens components 500, 550 with the rear facing onboard camera 130 and the forward facing onboard camera 120 simultaneously even though the rear-facing onboard camera 130 is not co-axial with the forward-facing onboard camera 120 (e.g., as shown in FIGS. 7A and 7B).

In some embodiments, the first lens mounting portion 505 and the second lens mounting portion 555 can protrude or extend from the body portion 340 by different amounts. For example, the first lens mounting portion 505 can protrude about 5 mm to about 3.5 mm, while the second lens mounting portion 555 can protrude about 2 mm to about 2 mm. The difference in the length of protrusion can be used to attach different lensing components, such as a fisheye lens on the first lens mounting portion 505, and a lens filter on the second lens mounting portion 555.

All or part of the dual-lens system 300 can be made of the material (e.g., a polymer or a silicone) that is sufficiently flexible to permit a degree of bending and stretching, so that the channel of the dual-lens system 300 can be temporarily widened while sliding the dual-lens system onto the mobile device, but that is sufficiently stiff, rigid, and/or resilient to urge one or more of the sidewalls to return to its original position and thereby exert a gripping force against a portion of the mobile device 100. The material of the dual-lens system 300, especially the region on the inner side of the sidewalls within the channel, can also be tacky or somewhat slide resistant to enhance the gripping of the dual-lens system 300 to the mobile device.

In some embodiments, one or both of the one or more sidewalls 342, 344 can have multiple (e.g., two or more) lens mounting portions. For example, the first sidewall 342 can include a single, first lens mounting portion 505, and the second sidewall 344 can include both a second lens mounting portion 555 and a third lens mounting portion (not shown). The second and the third lens mounting portions can be arranged in a row or in a column. Such configuration can be used, for example, on a mobile device having two or more onboard camera lenses on one surface of the mobile device (e.g., mobile devices configured to capture three-dimensional images). In some embodiments, the one or more sidewalls 342, 344 can be connected to the upper wall 346 with a movable joint, such as a hinge, which can allow the sidewall to be lifted away from the camera while the dual-lens system 300 remains attached to the mobile device. Such configuration can allow a user to take photographic images with the onboard camera lens without the lens covering the onboard camera lens, by selectively moving either the first sidewall 342 or the second sidewall 344 away from the mobile device 100. Such configuration can also be used to allow user access to other features on the mobile device, such as headphone jack, cell phone notification flashlights, speakers, etc. For example, a user can lift the sidewall pushing portion from the mobile device when answering a phone call, so that the user is not obstructed from hearing from the speaker on the mobile phone by the lensing component and/or the lateral surface of the dual-lens system 300.

In some embodiments, the shape, size, and dimensions of the sidewalls can expose mobile device features on the surface of the mobile device while the dual-lens system 300 is attached to the mobile device. Such features can include, for example, onboard flash, heart rate monitor, infrared sensor, speaker, mount, notification light, etc. Features on the surface of the mobile device can be exposed through a recess or a cutout from the sidewalls. In some embodiments, the first and the second lens mounting portions 505, 555 can be used to attach other modular mobile device accessories, such as auxiliary speakers, lens flash, lens mount, filters, cold shoe, etc.

Figure 2:
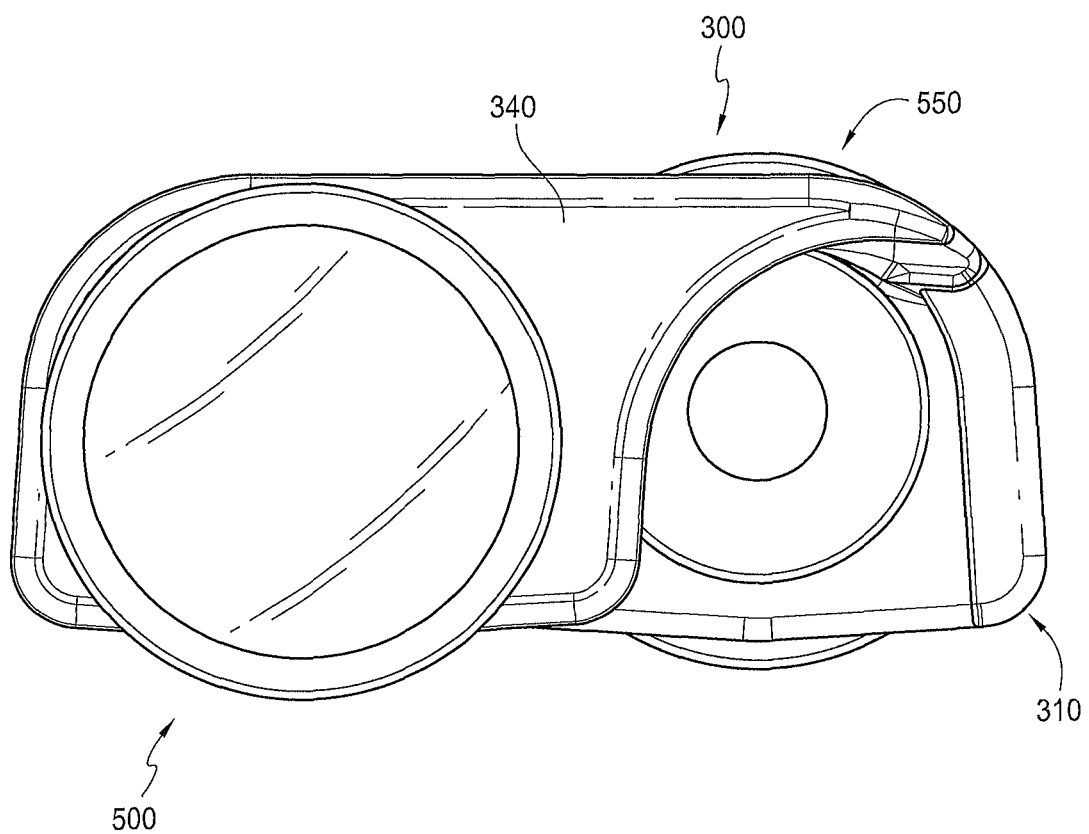
FIG. 2 illustrates an embodiment of the reversible multi-lens system with lens components.

Referring to FIG. 2, a dual-lens system used with lensing components is shown. The dual-lens system 300 can be used with a first lens component 500 and a second lens component 550. The first and second lens components 500, 550 can be attached to the first and second lens mounting portions 505, 555. The first and second lens components 500, 550 can be respectively simultaneously aligned with and in optical communication with a plurality of corresponding onboard camera lenses of the mobile device (e.g., the first lens component 500 can be aligned with and in optical communication with a forward facing onboard camera lens 120 and the second lens component 550 can be aligned with and in optical communication with a rear facing onboard camera lens 130), without requiring removing or adjusting the dual-lens system 300 from the mobile device 100. For example, a user may take "dual" photographs or videos with the mobile device with the dual-lens system and lens components attached, with both the forward facing onboard camera lens 120 and the rear facing onboard camera lens 130. In such "dual" configurations, a user may take videos of photographs of the user and/or the scenery behind the user with the rear facing onboard camera, which can be simultaneously embedded in the videos or photographs being captured by the forward facing camera. A user can use lensing components selectively, for example, by attaching only one of either the first lensing component or the second lensing component. Such configuration can be used to allow the user to access other features such as speaker, flash, a second front facing onboard camera, heart rate monitor, etc.

FIGS. 3A-3C illustrates lateral section views of the dual-lens system 300 attached to a mobile device. The dual-lens system 300 can be attached to a mobile device in two or more positions. For example, in one position, the second upper wall alignment protrusion 320 can contact a corner of the mobile device, while the first upper wall alignment protrusion 330 can contact the top middle portion of the mobile device. The dual-lens system 300 can be pivoted, flipped or rotated, and then reinserted onto the mobile device in a second position, in which the second upper wall alignment protrusion 320 can contact the top middle portion of the mobile device while the first upper wall alignment protrusion 330 can contact the corner of the mobile device. Different positions or configurations in attaching the dual-lens system 300 are possible. For example, the dual-lens system 300 can be attached onto another corner of the mobile device, into a third or a fourth position, without being flipped or rotated around. Such a configuration can be used, for example, in attaching, aligning, and using different modular accessories with the mobile device with several different features of the mobile device. For example, the first lens mounting portion 505 that was previously positioned generally in the top middle section of the mobile device can be subsequently positioned in the corner of the same surface of the mobile device, above a flash. While in this configuration, a user may attach a modular flash filter to the mounting portion of the dual-lens system 300 positioned above the flash.

In some embodiments, as shown in FIGS. 3A-3C, the upper wall alignment protrusions 320, 330 may have each have multiple (e.g., two or more) discrete registration points. The discrete registration points may contact an edge surface of the mobile device 100 when in a first position to provide the alignment features described above. The discrete registration points may not contact an edge surface or otherwise may not provide alignment when in a second position. For example, the upper wall alignment protrusions 320, 330 may each have two registration points, labeled (A) and (B) in FIGS. 3A-3C. One registration point (e.g., registration point (A)) may be on the outer surface of the upper wall alignment protrusion with respect to the rest of the body portion 340, and the other registration point (e.g., registration point (B)) may be on the inner surface of the upper wall alignment protrusion. When an upper wall alignment protrusion 320 or 330 is in the first position, away from a corner of the mobile device, registration point (A) may be the primary or sole provider of alignment for the alignment protrusion. When an upper wall alignment protrusion 320 or 330 is in the second position, on or near the corner of the mobile device, registration point (B) may be primary or sole provider of alignment for the alignment protrusion. In this configuration, the dual-lens system 300 may be properly aligned via the combination of registration point (A) on one upper wall alignment protrusion 320 or 330 contacting an edge surface of the mobile device away from the corner, and registration point (B) of the other alignment protrusion 320 or 330 contacting the corner or an edge surface near the corner of the mobile device. A user can reverse the dual-lens system 300 to swap the orientations of the lens components 500 and 550. When reversed, the upper wall alignment protrusion that was on or near the corner may be repositioned away from the corner, and registration point (A) can provide alignment. The other upper wall alignment protrusion, which was previously positioned away from the corner, may now be positioned on or near the corner, and registration point (B) can provide alignment.

The first and third sidewall alignment protrusions 310, 314 can be protruding pads that have a surface area that is substantially smaller than the surface are of the sidewall or other portion on which it is disposed. In some embodiments, a protruding pad is shaped like a quarter of a curved rectangle on the corner of the sidewall portion, such as the protrusion shown in FIGS. 3A-3C. In some embodiments, the first and third sidewall alignment protrusions 310, 314 can protrude along the length of an edge of a sidewall portion, as shown in FIGS. 1A-1E. Various different lengths, shapes, and dimensions of the first and third sidewall alignment protrusions 310, 314 are possible. For example, the first and third sidewall alignment protrusions 310, 314 can be protruding pads in the middle section of the edge of the sidewall portion, or a latch extending over an orthogonal side surface of the mobile device.

The first and second upper wall alignment protrusions 330, 320 can align the dual-lens system 300 to by contacting one or more edge surfaces of the mobile device, such as a top edge and a corner generally formed by the convergence of two generally orthogonal edges of the mobile device 100. The first and third sidewall alignment protrusions 310, 314 can be used to exert a gripping force on the mobile device from opposing generally parallel generally planar faces of the mobile device as shown in FIGS. 3A-3C. In some embodiments, the user may slide the dual-lens system 300 onto a corner of the mobile device until the corner of the mobile device meets the inner surface of the upper wall 346. The one or more sidewall protrusions and one or more upper wall protrusions are positioned to place the dual-lens system 300 onto its pre-set position once the dual-lens system 300 is attached to the mobile device. In some embodiments, when the dual-lens system 300 is in its pre-set position, the first and second lens mounting portions 505, 555 are aligned with the forward and the rear facing onboard camera lenses 120, 130.

When the user slides the dual-lens system 300 to its pre-set position, sidewall alignment protrusions on the first and the second sidewalls 342, 344 can register and clip onto a side edge of the mobile device. The mobile device switch hollow 370 can allow the dual-lens system 300 to be placed onto the mobile device at its pre-set position without pressing and/or actuating a mobile device switch 110. In some embodiments, once the dual-lens system 300 is placed at its pre-set position on the mobile device, the dual-lens system 300 exerts gripping force on the mobile device mainly from the first and second sidewalls 342, 344, such as via the sidewall alignment protrusions. The gripping force can come from the dual-lens system's structure, protrusions, or other factors such as change in pressure, friction between two surfaces, etc. The gripping force can allow the dual-lens system to be attached at its pre-set location without any manual adjustment.

Figure 4A:
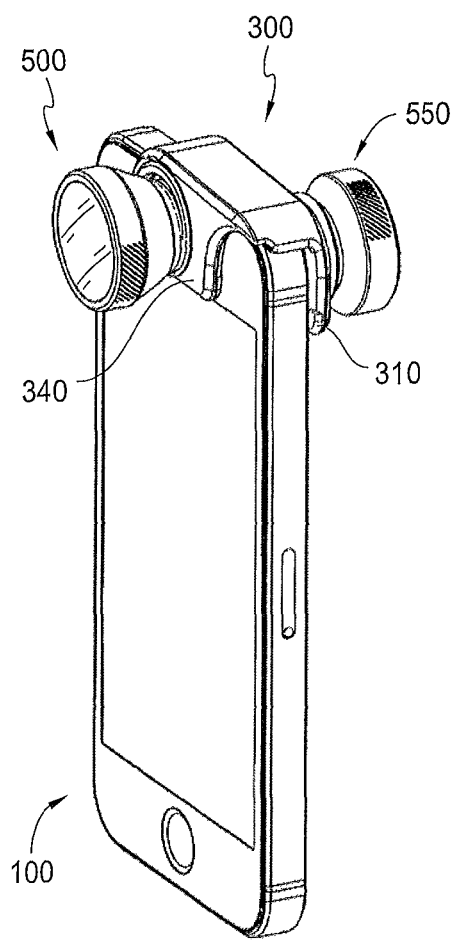
FIGS. 4A and 4B are views of a reversible multi-lens system with lens components on a mobile device.
Figure 4B:
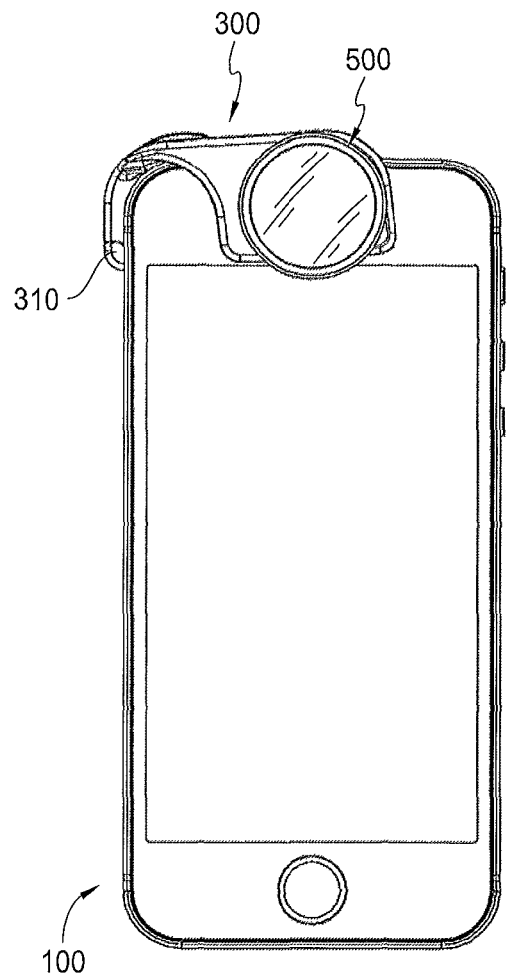

Referring to FIGS. 4A and 4B, a dual-lens system attached to a mobile device is shown. The first lens component 500 can be placed over the rear facing onboard camera lens 130 of the mobile device, while the second lens component 550 can be placed over the forward facing onboard camera lens 120 of the mobile device. In some embodiments, either the first or the second sidewall 344 protrusions can contact the peripheral surface of the mobile device and remain visible from the outside, once the dual-lens system 300 is attached to the mobile device at its pre-set position.

In some embodiments, the dual-lens system 300 can be used with mobile devices of different sizes and/or with different onboard camera locations. A user may use one dual-lens system 300, with two or more mobile devices made by different manufacturers, which can be different in size and have different onboard camera locations on the mobile device. For example, one dual-lens system 300 can be used on a second mobile device, which has a rear facing camera 130 on the corner of the mobile device. In such configurations, the second lens component 550 that was previously used in alignment with the rear facing camera 130 located on the middle of the first mobile device can subsequently be aligned with the forward facing onboard camera 120 on a corner of the second mobile device. Similarly, the first lens component 500 that was previously used in alignment with the forward facing camera 120 on the corner of the first mobile device can subsequently be used in alignment with the rear facing onboard camera 130 on the middle of the second mobile device.

Portable Accessory Insert

FIGS. 5A-5E illustrate several different views of a sample embodiment of a portable accessory insert that can be used with multi-lens systems such as the dual-lens system described above in reference to FIGS. 1-4. In some embodiments, the portable accessory attachment or insert 1700 can be comprised of first and second main body mating portions 1710, 1720, first and second sidewall 1760, 1765 mating portions, and an accessory attachment region, such as a loop 1750. The portable accessory insert 1700 can be shaped and sized to generally conform to the shape and size of the inner surface of the dual-lens system 300. The thickness of the portable accessory insert 1700 can generally correspond to the thickness of the channel of the dual-lens system 300. The first and the second main body mating portions 1710, 1720 can mate to the first and second upper wall alignment protrusions 330, 320 or otherwise facilitate coupling of the portable accessory insert 1700 to the dual-lens system 300. In some embodiments, as shown in FIG. 6, the first and the second main body mating portions 1710, 1720 can be formed as a clip or an overhang, each having a hook-like shape with the tips of the hooks pointing towards the middle of the portable accessory insert 1700. In some embodiments, the first and the second main body mating portions 1710, 1720 can be a cut-in or a recess that mates to the first and second upper wall alignment protrusions 330, 320.

The shape and size of the first and second sidewall mating portions 1760, 1765 can generally correspond to the shape and size of the sidewall alignment protrusions 312, 316 on the dual lens clip 300. For example, in some embodiments, the first and second sidewall mating portions 1760, 1765 can be shaped in a generally rectangular manner, which generally corresponds to the shape of the sidewall alignment protrusions 312, 316 as shown in FIG. 2.

The loop 1750 can be located generally on the outermost edge of the portable accessory insert as shown in FIG. 5A-5E. The shape and size of the loop can be configured to insert a key ring, lanyard, bracelet, ring, hooError! Reference source not found.k, etc. through the loop.

FIGS. 5F-5J illustrate several different views of another sample embodiment of a portable accessory insert that can be used with multi-lens systems such as the dual-lens system described above in reference to FIGS. 1-4. In some embodiments, the portable accessory attachment or insert 1800 can be comprised of a first and second main body mating portions 1810, 1820, first and second body portions 1860, 1865, recess regions 1870, 1875, and an accessory attachment region, such as a loop 1850. The first body portion 1860 may include bottom surface 1830. The second body portion 1865 can include a gap 1840 having first and second gap walls 1845a, 1845b. As described in greater detail below, the gap 1840, via first and second gap walls 1845a, 1845b can be configured to facilitate secure and repeatable mobile device standing by insertion of a mobile device, such as the mobile device described below in reference to FIG. 7. The gap 1840 can be used to hold a mobile device upright for improved user experience, such as for example, more stable photo taking experience or viewing the mobile devices screen.

The portable accessory insert 1800 can be shaped and sized to generally conform to the shape and size of the inner surface of the dual-lens system 300. The thickness of the portable accessory insert 1800 can generally correspond to the thickness of the channel of the dual-lens system 300. For example, first body portion 1860 can have a thickness that generally corresponds to the thickness of the channel of the dual-lens system 300. The second body portion 1860 can be thinner than first body portion 1865, as shown in FIGS. 5F-5L. In some embodiments, the second body portion 1865 can be generally equal to that of first body portion 1860 and the channel of dual-lens system 300.

In an illustrative embodiment, the portable accessory insert 1800 can be configured to attach or mate with the dual-lens system 300. In some embodiments, the first and the second main body mating portions 1810, 1820 can mate to the first and second upper wall alignment protrusions 330, 320 or otherwise facilitate coupling of the portable accessory insert 1800 to the dual-lens system 300. In some embodiments, as shown in FIG. 6, the first and the second main body mating portions 1810, 1820 can be formed as a clip or an overhang, each having a hook-like shape with the tips of the hooks pointing towards the middle of the portable accessory insert 1800. In some embodiments, the first and the second main body mating portions 1810, 1820 can be a cut-in or a recess that mates to the first and second upper wall alignment protrusions 330, 320.

In some embodiments, the shape and size of the first and second body portions 1860, 1865 can generally correspond to the shape and size of the sidewall alignment protrusions 310, 312, 314 and/or 316 on the dual-lens system 300. For example, in some embodiments, the first and second body portions 1860, 1865 can be shaped to have variable thickness which generally corresponds to the shape of the sidewall alignment protrusions 310, 312, 314, and/or 316 as shown in FIG. 2. In some other embodiments, the shape of the first and second body protrusions can correspond to either lens mounting portions 505, 555 as shown in FIG. 1. For example, lens mounting portions 505, 555 may be configured as a recess with a shape configured to align with either first body portion 1860 or second body portion 1865.

In some embodiments, the portable accessory insert 1800 includes one or more recess regions 1870, 1875. The one or more recess regions 1870, 1875 can have a thickness different than either first or second body portions 1860, 1865. The shape and size of recess regions 1870, 1875 may correspond to an alignment protrusion 310, 312, 314, and/or 316 of the dual-lens system 300. The one or more recess regions 1870, 1875 may have a shape that corresponds to a shape of one or more features on the dual-lens system 300, thereby creating another attachment and/or mating method between the portable accessory insert 1800 and dual-lens system 300. In some embodiments, the shape of one or more of the recess regions 1870, 1875 can correspond to the shape of either or both of the lens mounting portions 505, 555 as shown in FIG. 1. For example, lens mounting portions 505, 555 may be configured as a recess with a shape configured to align and/or snap into recess regions 1870, 1875. In some embodiments, recess regions 1870, 1875 are configured as cut-out regions or voids, where material is completely removed or completely absent from recess regions 1870, 1875. In this way, it is possible to diminish the weight and material of the portable accessory insert 1800.

The loop 1850 can be located generally on the outermost edge of the portable accessory insert as shown in FIG. 5F-5J. The shape and size of the loop can be configured to insert a key ring, lanyard, bracelet, ring, hook, etc. through the loop to enable convenient carrying or attachment to a person or to a person's close articles, such as a purse, keychain, or a backpack, etc.

The first body portion 1860 and second body portion 1865 can be portions of a single, unitary structure that forms the portable accessory insert 1800. For example, first and second body portions may be molded from the same material during manufacturing. In some embodiments, the first body portion 1860 and second body portion 1865 can be separate, discrete components, such as discrete components that that are glued, sonically welded, or otherwise temporarily or permanently attached to each other to form the portable accessory insert 1800.

All or part of the portable accessory insert 1800 can be made of a material (e.g., a polymer or a silicone) that is sufficiently flexible to permit a degree of bending and stretching. In this way, first and second body portions 1860, 1865 can be temporarily widened or squeezed while sliding the dual-lens system 300 onto portable accessory insert 1800, but sufficiently stiff, rigid, and/or resilient to urge one or more of the features to return to its original position and thereby exert a gripping force against a portion of the dual-lens system 300. In some embodiments, the material of the portable accessory insert 1800 can also be tacky or somewhat slide resistant (e.g., being formed with co-molded flexible or resilient surfaces) to enhance the gripping of the dual-lens system 300 to the portable accessory insert 1800. In some embodiments, only those portions of the portable accessory insert 1800 which are in contact with the dual-lens system 300 are made of surfaces that are tacky or somewhat slide resistant.

FIGS. 5K-5N illustrate an embodiment of the portable accessory insert of FIG. 5F used with a mobile device, such as the mobile device described below in reference to FIG. 7. The mobile device illustrated in FIG. 7 is a mobile smart phone device, however any other mobile device can be used (e.g., one or more other mobile phones, personal digital assistants (PDAs), media players, and/or handheld gaming devices, etc.). The gap 1840 can be used as a stand for the mobile device, to hold the mobile device generally upright for improved user experience. The gap 1840 of the portable accessory insert 1800 can be shaped and sized to generally conform to the shape and size of the contours of a mobile device. At least a portion of the thickness or space of the gap 1840 can generally correspond to the thickness of the mobile device.

Figure 5A:
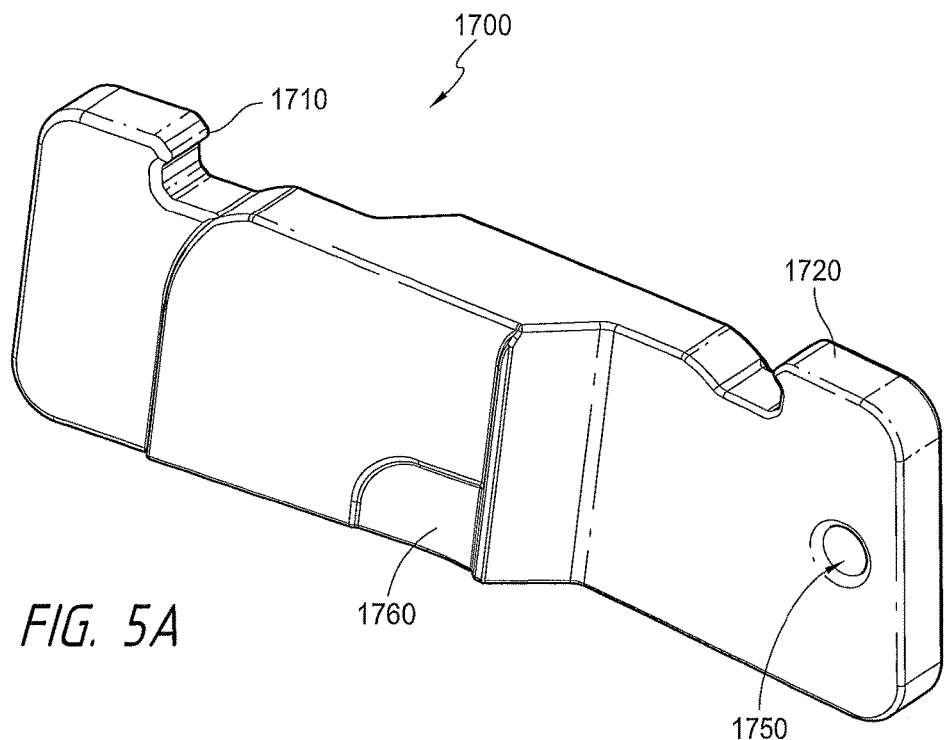
FIG. 5A is an isometric view of a portable accessory insert for an optical component system.
Figure 5B:
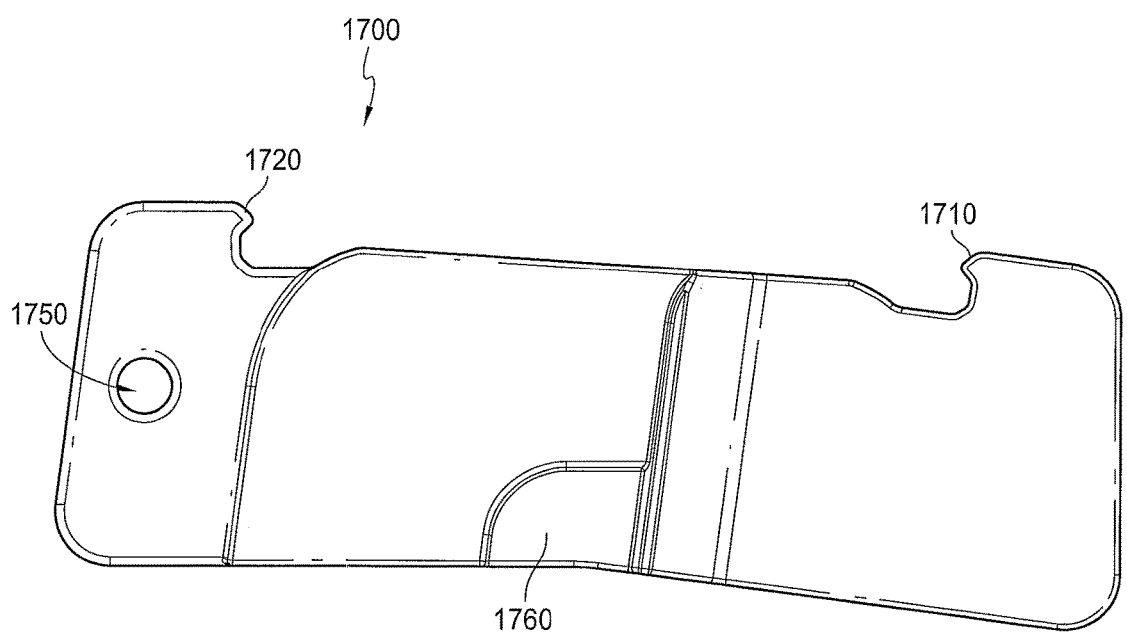
FIG. 5B is a front view of the portable accessory insert of FIG. 5A.
Figure 5C:
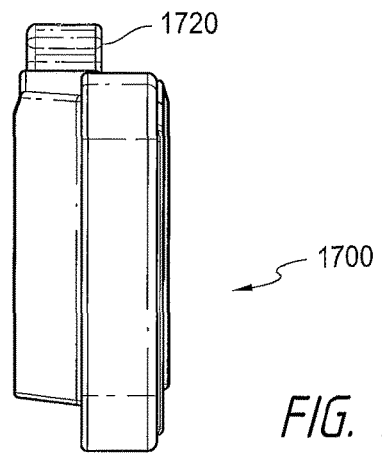
FIG. 5C is a side view of the portable accessory insert of FIG. 5A.
Figure 5D:
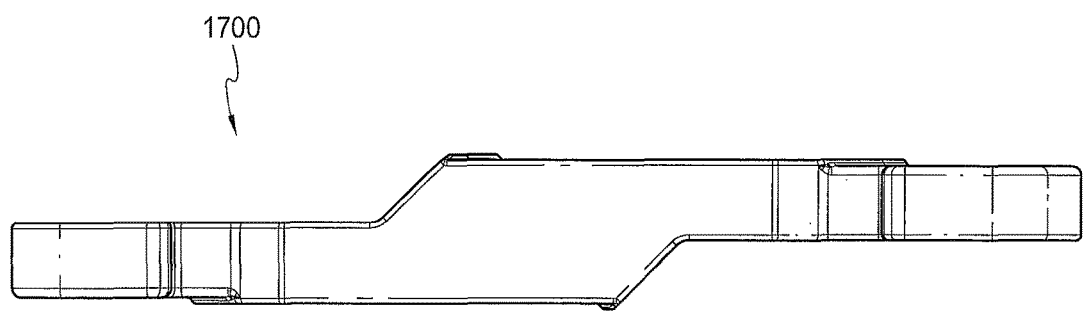
FIG. 5D is a top view of the portable accessory insert of FIG. 5A.
Figure 5E:
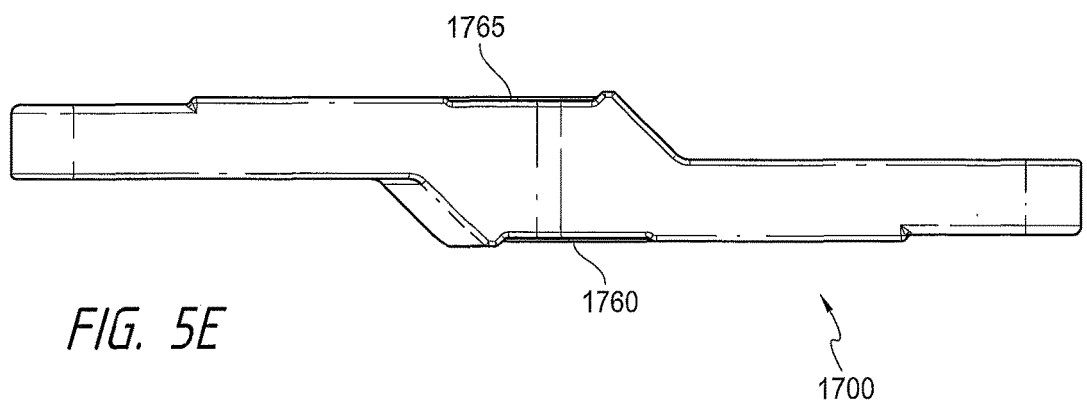
FIG. 5E is a bottom view of the portable accessory insert of FIG. 5A.
Figure 5F:
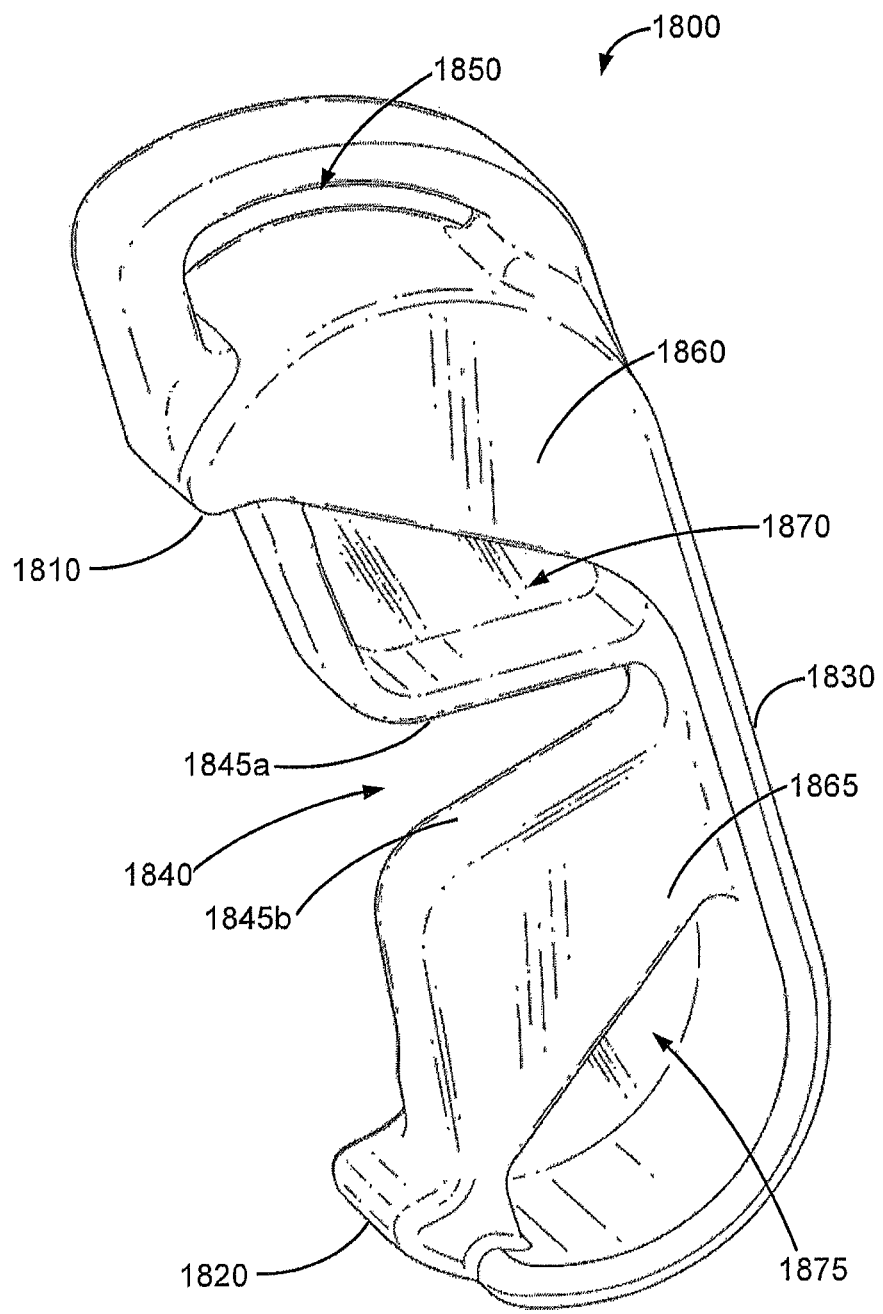
FIG. 5F is an isometric view of an embodiment of a portable accessory insert for an optical component system.
Figure 5G:
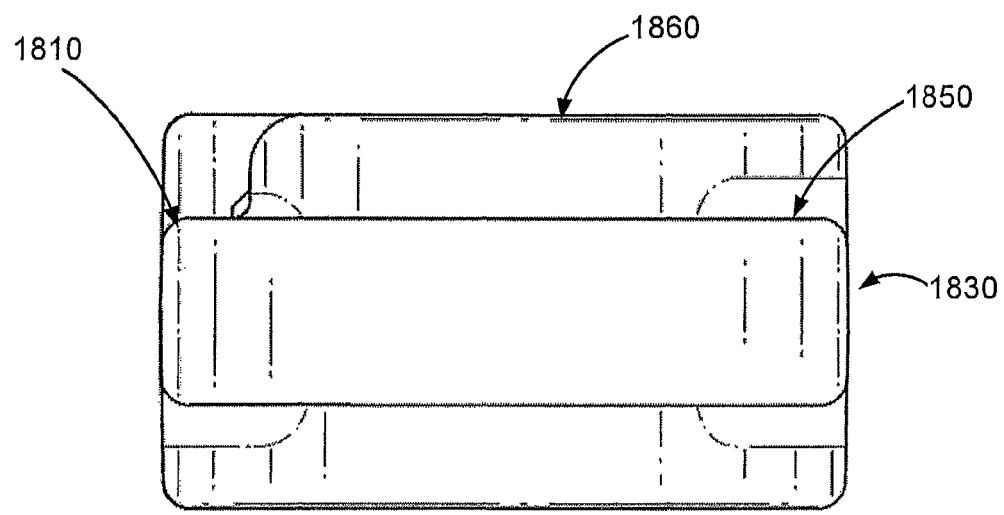
FIG. 5G is a top view of a portable accessory insert of FIG. 5F.
Figure 5H:
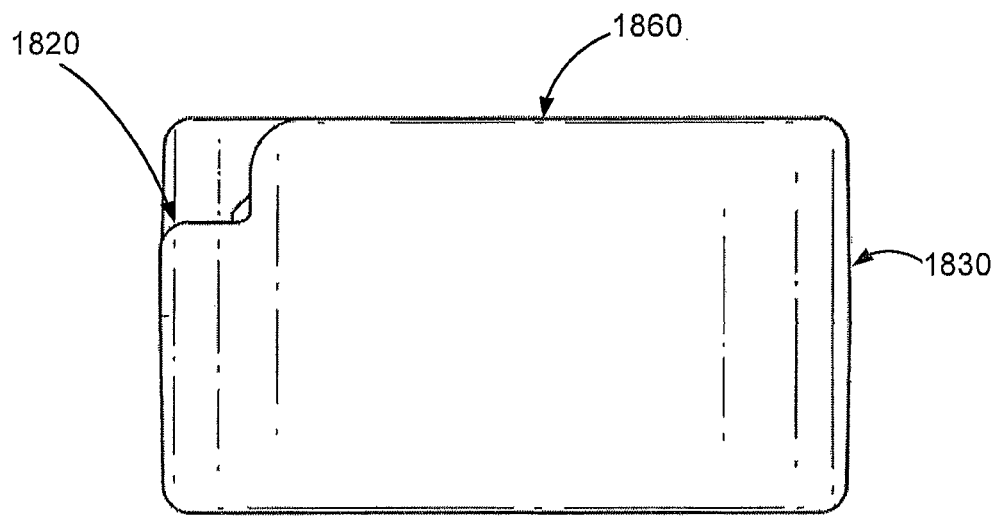
FIG. 5H is a bottom view of the portable accessory insert of FIG. 5F.
Figure 5I:
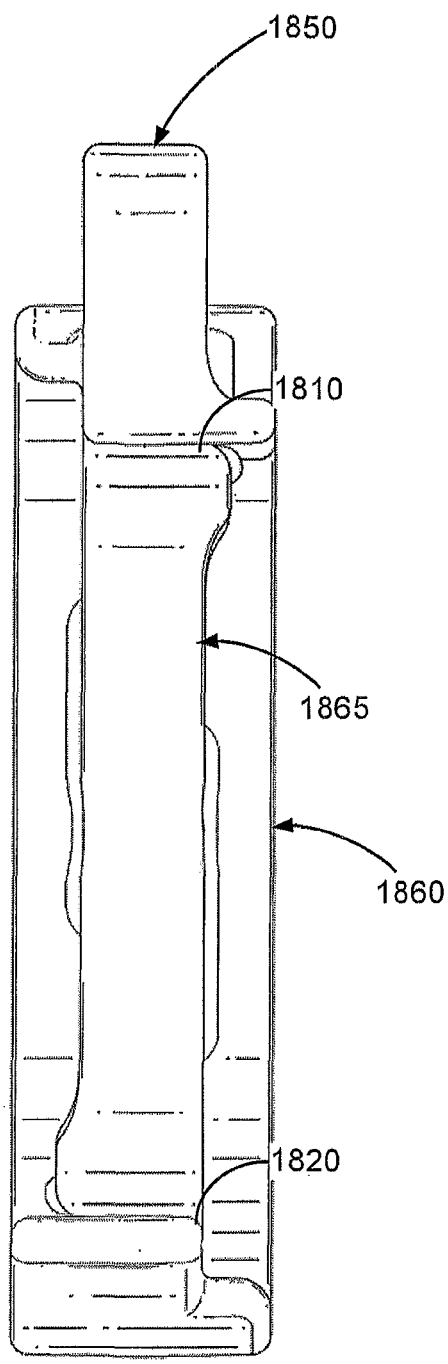
FIG. 5I is a left side view of the portable accessory insert of FIG. 5F.
Figure 5J:
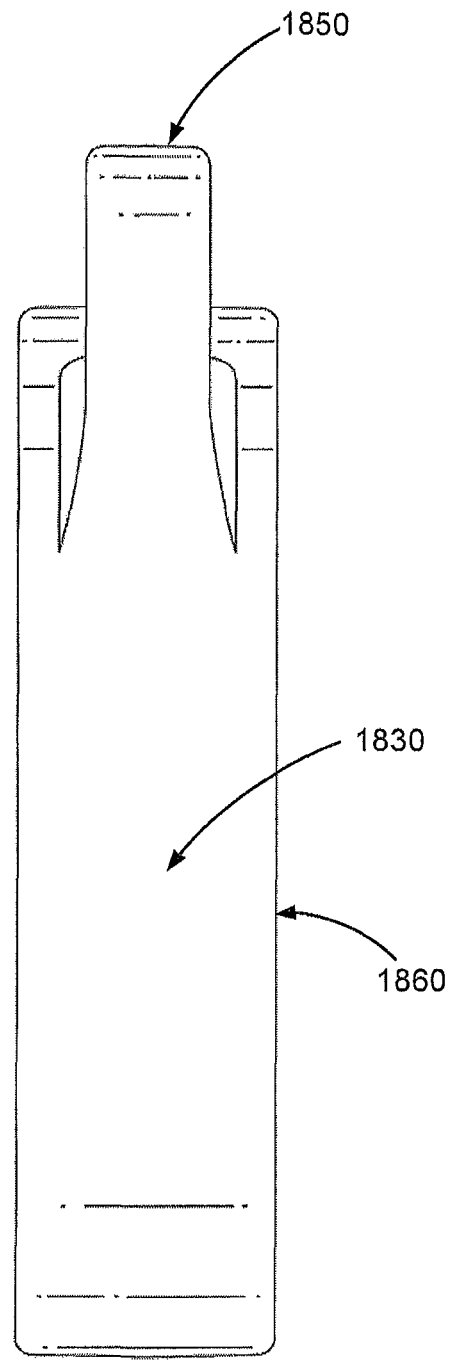
FIG. 5J is a right side view of the portable accessory insert of FIG. 5F.
Figure 5K:
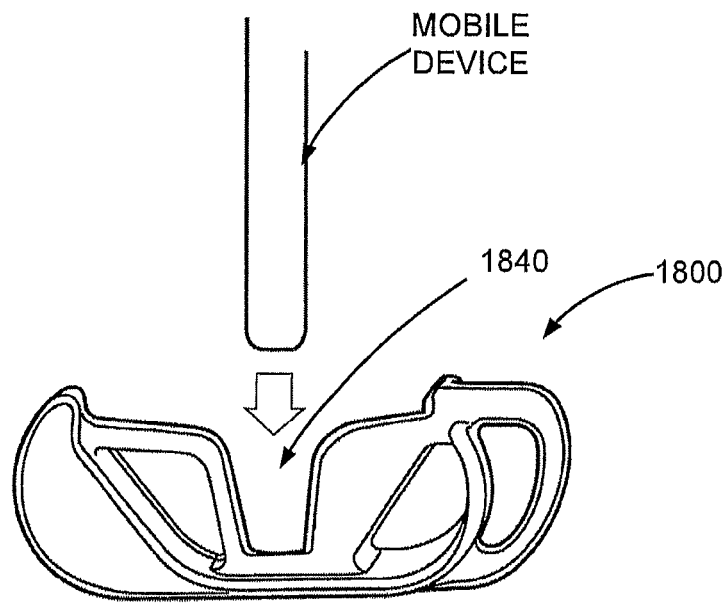
FIG. 5K illustrates the portable accessory insert of FIG. 5F used with a mobile device.
Figure 5L:
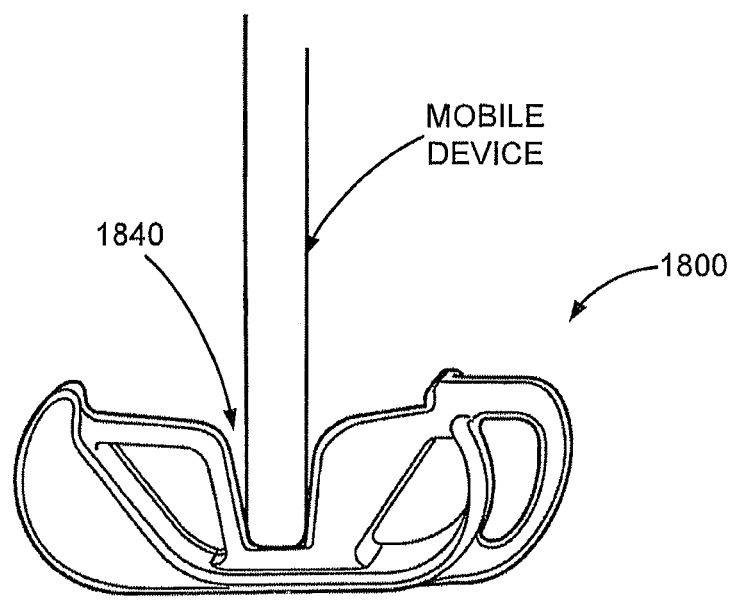
FIG. 5L illustrates the portable accessory insert of FIG. 5F used with a mobile device.

As shown in FIGS. 5K and 5L, the gap 1840 is configured to accept the insertion of at least one edge of the mobile device. For example, the first gap wall 1845*a* contacts a first surface of the mobile device, while the second gap wall 1845*b* contacts a second surface of the mobile device. In this way, portable accessory insert 1800 is configured as a stand for the mobile device whereby the gap 1840 accepts the mobile device and supports the mobile device, and bottom surface 1830 rests on a surface (e.g. a table, desk, etc.). In some embodiments, the space between first and second gap walls 1845*a*, 1845*b* may have a distance generally equal to the thickness of a mobile device. In some embodiments, the space between first and second gap walls 1845*a*, 1845*b* may be larger than the thickness of a mobile device, such that the mobile device may tilt and contact or apply pressure to one of the first or second gap walls 1845*a*, 1845*b* thereby providing an improved viewing angle and secure stand. In some embodiments, the space between first and second gap walls 1845*a*, 1845*b* may be smaller than the thickness of the mobile device. In this embodiment, when a mobile device is inserted into gap 1840, the front and back surfaces of the mobile device apply outward pressure to the first and second gap walls 1845*a*, 1845*b*, thereby providing a secure and snug fit within gap 1840.

In some embodiments, the second body portion 1865, including gap 1840, can be made of a material (e.g., a polymer or a silicone) that is sufficiently flexible to permit a degree of bending and stretching, In this way, first and second gap walls 1845*a*, 1845*b* can be temporarily widened or squeezed while sliding the mobile device into gap 1840, but remain sufficiently stiff, rigid, and/or resilient to urge one or more of the features to return to its original position and thereby exert a gripping force against the mobile device. In some embodiments, the surfaces of first and second gap walls 1845*a*, 1845*b* can also be made of tacky or somewhat slide resistant (e.g., being formed with co-molded flexible or resilient surfaces) to enhance the gripping of the mobile device to the portable accessory insert 1800. In yet other embodiment, the bottom surface 1830 can also be made of tacky or somewhat slide resistant material (e.g., having flexible or resilient surfaces co-molded)' to minimize slipping between the portable accessory insert 1800 and the resting surface.

Figure 5M:
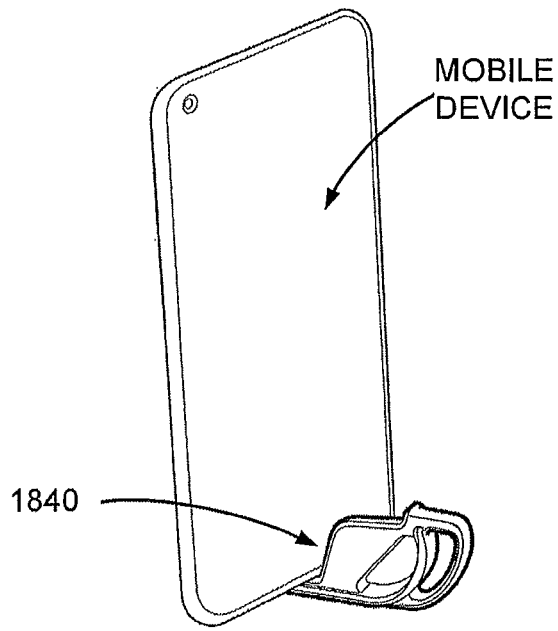
FIG. 5M illustrates the portable accessory insert of FIG. 5F used with a mobile device in a first orientation.
Figure 5N:
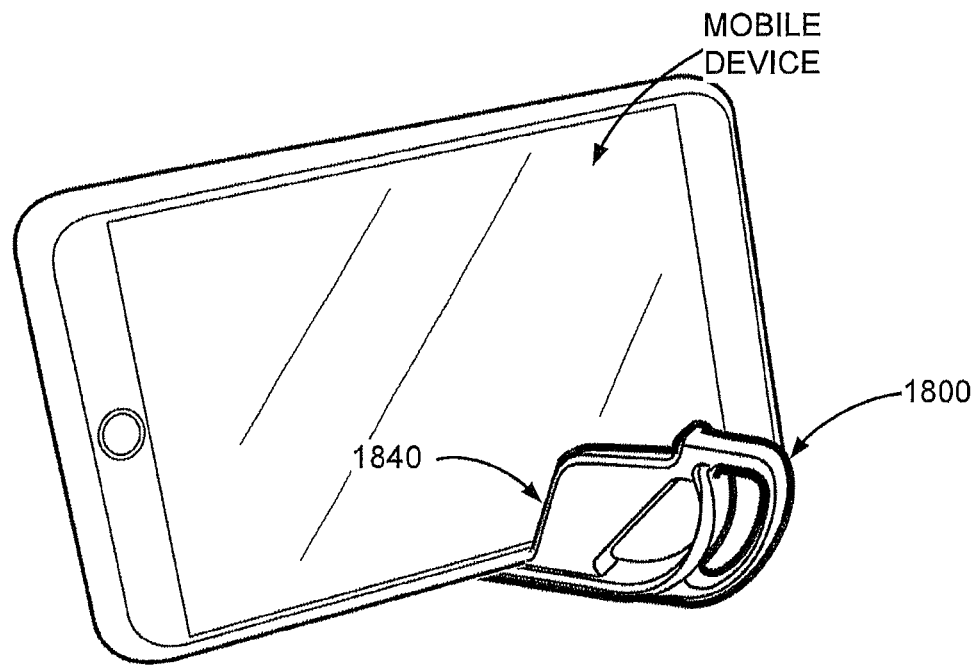
FIG. 5N illustrates the portable accessory insert of FIG. 5F used with a mobile device in a second orientation.

FIGS. 5M-5N illustrates the portable accessory insert used with a mobile device in multiple orientations. The mobile device can be pivoted, flipped, or rotated, and then reinserted into gap 1840 of the portable accessory insert 1800 in multiple positions. In this way, the portable accessory insert 1800 may be configured to act as a stand in a plurality of orientations. For example, a shorter edge of the mobile device may be inserted into gap 1840, thereby positioning the mobile device in the portable accessory insert 1800 in a portrait orientation, as shown in FIG. 5M. In some embodiments, a longer edge of the mobile device may be inserted into gap 1840, thereby positioning the mobile device in the portable accessory insert 1800 in a landscape orientation, as shown in FIG. 5N.

FIGS. 5P(i)-5S(ix) illustrate multiple views of another sample embodiment of a portable accessory insert that can be used with any lens attachment systems such as the dual-lens system described above in reference to FIGS. 1-4, or any other lens attachment system disclosed and/or illustrated herein, including any of those disclosed and/or illustrated in U.S. Pat. No. 8,279,544. In some embodiments, the portable accessory attachment or insert 4000 can be comprised of multiple portions that can move with respect to each other, such as a first and second main body mating portions 4010, 4020, raised and recessed body portions 4060, 4065, first and second body portions 4001*a*, 4001*b*, movement-enabling member 4070, accessory attachment portions 4080 and 4085, and a connection member, such as a loop 4050. The first and second body portion 4001*a*, 4001*b* may include first and second bottom surface 4030*a*, 4030*b*, respectively. Each first and second body portion 4001*a*, 4001*b* can include a first and second gap 4040*a*, 4040*b* having gap walls 4042*a*, 4043*a* corresponding to first gap 4040*a* and gap walls 4042*b*, 4043*b* corresponding to second gap 4040*b*. As described in greater detail below, the gaps 4040*a* and/or 4040*b*, via gap walls 4042*a*, 4043*a*, and 4040*b*, and/or via gap walls 4042*b* and 4043*b*, can be configured to facilitate secure and repeatable mobile device standing by insertion of a mobile device, such as the mobile device described below in reference to FIG. 7. The gaps 4040*a*, 4040*b* can be used to hold a mobile device upright for improved user experience, such as for example, more stable photo taking experience or viewing the mobile devices screen. The portable accessory insert 4000 can be include any feature, structure, material, or step (e.g., the shape and size) of the portable accessory insert 1800 described in reference to FIGS. 5F-5N or any other insert described and/or illustrated in this specification. For example, portable accessory insert 4000 may be designed to generally conform to the shape and size of the inner surface of the dual-lens system 300. The thickness of the portable accessory insert 4000 can generally correspond to the thickness of the channel of the dual-lens system 300. For example, recessed body portion 4065 can have a thickness that generally corresponds to the thickness of the channel of the dual-lens system 300. The raised body portion 4060 can be thicker than recessed body portion 4065, as shown in FIG. 5P(i)-(ix). In some embodiments, the raised body portion 4060 can be generally equal to that of recessed body portion 4065 and the channel of dual-lens system 300.

In an illustrative embodiment, the portable accessory insert 4000 can be configured to attach or mate with a lens system, such as the dual-lens system 300. In some embodiments, the first and the second main body mating portions 4010, 4020 can mate to corresponding mating portions on the lens system, such as the first and second upper wall alignment protrusions 330, 320 or otherwise facilitate coupling of the portable accessory insert 4000 to the lens system. In some embodiments, as shown in FIG. 6, the first and the second main body mating portions 4010, 4020 can be formed as a clip or an overhang, each having a hook-like shape with the tips of the hooks pointing towards the middle of the portable accessory insert 4000. In some embodiments, the first and the second main body mating portions 4010, 4020 can be a cut-in or a recess that mates to the first and second upper wall alignment protrusions 330, 320.

In some embodiments, the shape and size of the raised and recessed body portions 4060, 4065 can generally correspond to the shape and size of the sidewall alignment protrusions 310, 312, 314 and/or 316 on the dual-lens system 300. For example, in some embodiments, the raised and recessed body portions 4060, 4065 can be shaped to have variable thickness which generally corresponds to the shape of the sidewall alignment protrusions 310, 312, 314, and/or 316 as shown in FIG. 2. In some embodiments, the shape of the raised and recessed body portions can correspond to either lens mounting portions 505, 555 as shown in FIG. 1. For example, lens mounting portions 505, 555 may be configured as a recess with a shape configured to align with either recessed body portion 4065 or raised body portion 4065.

The connection member (e.g., loop 4050) can be located generally on the outermost edge of the portable accessory insert as shown in FIG. 5P(i)-(ix). The shape and size of the loop can be configured to insert a key ring, lanyard, bracelet, ring, hook, etc. through the loop to enable convenient carrying or attachment to a person or to a person's close articles, such as a purse, keychain, or a backpack, etc. Many other types of connection members may be used, such as one or more clips, connectors, carabineers, snaps, pins, clasps, etc.

As illustrated in FIG. 5P(i)-(ix), in some embodiments, a movement-enabling member 4070 can be provided on either end of the portable accessory 4000. As shown in FIG. 5P(i)-(ix), the movement-enabling member 4070 may be positioned at the same end as or within loop 4050. As in all of the embodiments of this specification, any structure, feature, material, or method described and/or illustrated anywhere in this specification can be used in addition to or instead of anything illustrated and/or described in connection with the embodiment of FIG. 5P(i)-(ix). Movement-enabling member 4070 may be a hinge region, a pivot (as shown in FIGS. 5P(i)-(ix) and 5Q(i)-(ix)), a slider, a resilient or stretching member (e.g., a spring), and/or a rotating member, etc., configured to provide movement between the first and second body portions 4001a, 4001b, as illustrated in FIGS. 5Q(i)-(ix). In some embodiments, the movement-enabling member 4070 can be moveably attached to first body portion 4001a. In some embodiments, the movement-enabling member 4070 can be attached to second body portion 4001b, while being moveably attached to first body portion 4001a. In some embodiments, the movement-enabling member 4070 can be a cylindrical element attached to second body portion 4001b, the cylindrical element having a cylindrical opening to attach to first body portion 4001a. The cylindrical element may be configured to slide or rotate about the attachment with the first body portion 4001a. The movement-enabling member 4070 may be attached to second body portion 4001b while permitting the first body portion 4001a to rotate about a pivot point with respect to the movement-enabling member 4070.

As shown in FIGS. 5Q(i)-(ix), the movement-enabling member 4070 is configured to permit a user to change the distance between the ends of portable accessory 4000 opposite of the movement-enabling member 4070. For example, by rotating or otherwise moving the first body portion 4001a with respect to the second body portion 4001b, the two body portions 4001a, 4001b open as illustrated in FIGS. 5Q(i)-(ix) where the ends of first and second body portions 4001a, 4001b opposite of the movement-enabling member 4070 are physically separated from each other, forming an angle with respect to each other. In some embodiments, the relative movement between the first and second body portions is angular, as illustrated, configured to enable a user to rotate one body portion with respect to another retainer portion by any suitable angle between about 0 degrees (e.g., generally parallel in some embodiments, as illustrated) to about 180 degrees. In some embodiments, the angle is at least about 25 degrees or at least about 30 degrees. The angle between the first and second body portions 4001a, 4001b may be changed and selected by the user. In some embodiments, the angle between the first and second body portion 4001a, 4001b is a predetermined angle based on the manufactured specifications of the movement-enabling member 4070. In some embodiment, the movement-enabling member may include multiple angles of separation between the first and second body portions 4001a, 4001b such that a user may select from the multiple positions. In some embodiments, the user can adjust the angular relationship to set it at any particular angle within a range, as desired, and the body portions 4001a, 4001b will remain in such angular relationship until the user changes the angle. In some embodiments, as illustrated in FIGS. 5Q(i)-(ix) and 5S(i)-(ix), the angle can be sufficient to permit the portable accessory insert 4000 to support a mobile device in an open configuration without tipping over.

In some embodiments, movement between these components can provide one or more advantages. For example, in some embodiments, as will be described in more detail below with reference to FIGS. 5R and 5S(i)-5S(ix), the first and second body portions 4001a, 4001b may be positioned via the movement-enabling member 4070 to an open position to securely hold a mobile device generally upright for an improved user experience during photographic use and/or viewing previously captured or recorded media. In some embodiments, the movement-enabling member 4070 permits the first and second body portions 4001a, 4001b to be moved back together (or back to an initial or closed position) during storage or transportation of the portable accessory 4000, when not in photographic use or mating with dual-lens system 300. The overall size of the portable accessory insert 4000 can be smaller in the closed position than in the open position.

In an illustrative embodiment, portable accessory insert 4000 can include grasping portions, such as tabs 4082a, 4082b, configured to facilitate the operation of movement-enabling member 4070. For example, tabs 4082a may permit a user to grasp a raised surface and provide leverage to separate body portions 4001a, 4001b via movement-enabling member 4070. Tabs 4082a, 4082b may provide a locking mechanism, whereby the tabs 4082a, 4082a may be configured in an interlocking arrangement such that portable accessory insert 4000 may be held in a closed configuration as depicted in FIGS. 5P(i)-(ix). In some embodiments, tab 4082a may be attached to body portion 4001a, while tab 4082b may be attached to body portion 4001b. A portion of tab 4082a may extend beyond the body portion 4001a, as illustrated in FIGS. 5Q(i)-(ix), and be configured to extend over, while remaining separate from, body portion 4001b. Similarly, a portion of tab 4082b may extend beyond the body portion 4001b, as illustrated in FIGS. 5Q(i)-(ix), and be configured to extend over, while remaining separate from, body portion 4001a. In some embodiments, the tabs 4082a, 4082b can be configured as an accessory attachment portion 4080, described in greater detail below, when the portable accessory insert 4000 is in a closed configuration.

In another illustrative embodiment shown in FIGS. 5Q(i)-(ix), portable accessory insert 4000 can include securing element 4090a and securing region 4090b configured to secure portable accessory insert in the closed configuration of FIGS. 5P(i)-(ix). For example, a user may operate the movement-enabling member 4070 to place the first and second body portions 4001a, 4001b in a closed configuration as shown in FIGS. 5P(i)-(ix). Upon closing the first and second body portions 4001a, 4001b, the securing region 4090b may be configured to accept the securing element 4090a such that the first and second body portions 4001a, 4001b are held together and resist slipping apart in the close configuration. In some embodiments, the securing element 4090a can be a raised surface and the securing element 4090b can be an opening or recessed surface. The securing element 4090a may generally correspond to the shape and size of securing region 4090b. In some embodiments, the securing element 4090a can snap into the securing region 4090b. In some embodiment, the securing element 4090a can mate to the respective securing region 4090b or otherwise facilitate coupling of the first body portion 4001a to the second body portion 4001b. In some embodiments, the shape of the securing region 4090b may be smaller than the shape of the securing element 4090a. When a securing element 4090a is inserted into securing region 4090b, the outer surfaces of the securing element 4090a can apply outward pressure to the securing region 4090b, thereby providing a secure and snug fit within securing region 4090a. Thus, the first and second body portions 4001a, 4001b may be held in a closed configuration via operation of the movement-enabling member 4070, the securing element 4090a, and the securing region 4090b.

All or part of the portable accessory insert 4000 can be made of a material (e.g., a polymer or a silicone) that is sufficiently flexible to permit a degree of bending and stretching. Raised and recessed body portions 4060, 4065 can be temporarily widened or squeezed while sliding the dual-lens system 300 onto portable accessory insert 4000, but sufficiently stiff, rigid, and/or resilient to urge one or more of the features to return to its original position and thereby exert a gripping force against a portion of the dual-lens system 300. In some embodiments, the material of the portable accessory insert 4000 can be tacky or somewhat slide resistant (e.g., being formed with co-molded flexible or resilient surfaces) to enhance the gripping of the dual-lens system 300 to the portable accessory insert 4000. In some embodiments, only those portions of the portable accessory insert 4000 which are in contact with the dual-lens system 300 are made of surfaces that are tacky or somewhat slide resistant.

Figure 5R:
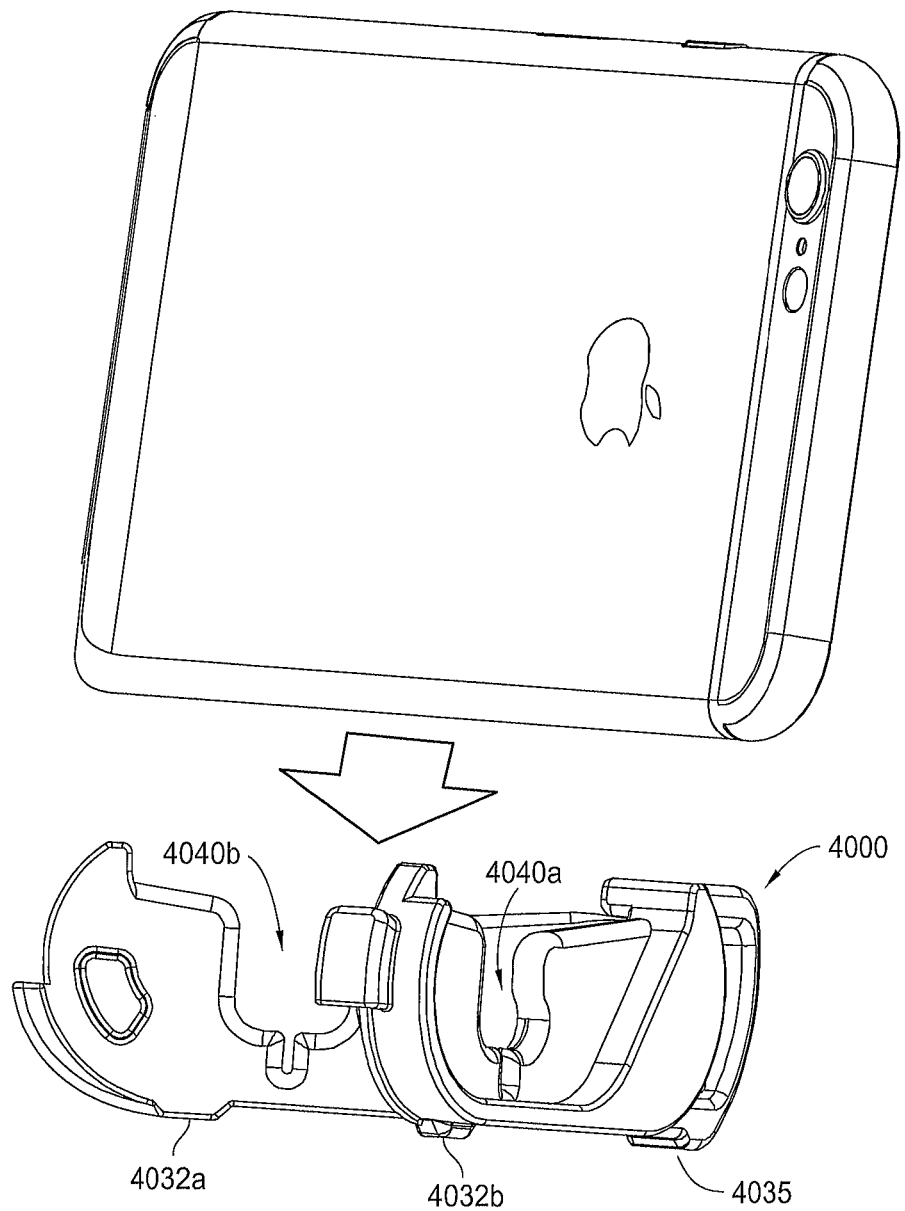
FIG. 5R illustrates the portable accessory insert of FIGS. 5P(i)-5P(ix) used with a mobile device.

FIGS. 5R and 5S(i)-5S(ix) illustrate an embodiment of the portable accessory insert of FIG. 5P(i)-(ix) used with a mobile device, such as the mobile device described below in reference to FIG. 7. The mobile device illustrated in FIG. 7 is a mobile smart phone device, however any other mobile device can be used (e.g., one or more other mobile phones, personal digital assistants (PDAs), media players, and/or handheld gaming devices, etc.). One or more gaps 4040a, 4040b, of first and second body portions 4001a, 4001b respectively, can be used as a stand for the mobile device, to hold the mobile device generally upright for improved user experience. The gaps 4040a, 4040b of the portable accessory insert 4000 can be shaped and sized to generally conform to the shape and size of the contours of a mobile device. At least a portion of the thickness or space of the gaps 4040a, 4040b can generally correspond to the thickness of the mobile device.

As shown in FIGS. 5R and 5S(i)-(ix), the gaps 4040a, 4040b are configured to accept the insertion of at least one edge of the mobile device. For example, movement-enabling member 4070 of the portable accessory insert 4000 may be operated such that first and second body portions 4001a, 4001b are in an open configuration as illustrated in FIGS. 5Q(i)-(ix). In this configuration, the portable accessory insert 4000 may operate as a stand for mobile device, whereby each body portion 4001a, 4001b may operate as a support of a mobile device stand such that the mobile device may rest within gaps 4040a, 4040b for securely holding the mobile device. In some embodiments, gap wall 4042a of gap 4040a of first body portion 4001a contacts a first surface of the mobile device, and gap wall 4043a of gap 4040a contacts a second surface of the mobile device. At the same time, gap wall 4042b of gap 4040b of first body portion 4001b contacts the first surface of the mobile device, and gap wall 4043b of gap 4040b contacts the second surface of the mobile device. Portable accessory insert 4000 is configured as a stand for the mobile device whereby the gaps 4040a, 4040b accept the mobile device and supports the mobile device. In some embodiments, the portable accessory insert 4000 may operate as a stand to hold the mobile device while in a closed configuration as depicted in FIGS. 5P(i)-(ix), and the functions of portable accessory insert 4000 in this configuration may be the same as or similar to any of those described in reference to FIGS. 5F-5N.

In some embodiments, the space between gap walls 4042a, 4043a and 4042b, 4043b may have a distance generally equal to the thickness of a mobile device. In some embodiments, the space between gap walls 4042a, 4043a and 4042b, 4043b may be larger than the thickness of a mobile device, such that the mobile device may tilt and contact or apply pressure to at least one of the gap walls 4042a, 4043a and 4042b, 4043b thereby providing an improved viewing angle (e.g., an angle at which the mobile device forms an acute angle with respect to the surface on which the portable accessory insert 4000 is resting) and a secure stand. In some embodiments, the space between gap walls 4042a, 4043a and 4042b, 4043b may be smaller than the thickness of the mobile device. When a mobile device is inserted into gaps 4040a, 4040b, the front and back surfaces of the mobile device can apply outward pressure to the gap walls 4042a, 4043a and 4042b, 4043b, thereby providing a secure and snug fit within gaps 4040a, 4040b. In some embodiments, the space between gap walls 4042a, 4043a and 4042b, 4043b may be varied throughout gaps 4040a, 4040b (as illustrated in FIGS. 5P(i)-(ix)). A portion of the space of gaps 4040a, 4040b may be smaller than the thickness of the mobile device, while another portion may be thicker than the thickness of the mobile device. The smaller portion may provide a secure and snug fit while permitting the mobile device to tilt in the thicker portion to provide an improved viewing angle.

In some embodiments, the recessed body portion 4060, including gaps 4040a, 4040b, can be made of a material (e.g., a polymer or a silicone) that is sufficiently flexible to permit a degree of bending and stretching, Gap walls 4042a, 4043a and 4042b, 4043b can be temporarily widened or squeezed while sliding the mobile device into gaps 4040a, 4040b, but remain sufficiently stiff, rigid, and/or resilient to urge one or more of the features to return to its original position and thereby exert a gripping force against the mobile device. In some embodiments, the surfaces of gap walls 4042a, 4043a and 4042b, 4043b can be made of tacky or somewhat slide resistant (e.g., being formed with co-molded flexible or resilient surfaces) to enhance the gripping of the mobile device to the portable accessory insert 4000.

In an illustrative embodiment, portable accessory insert 4000 includes bottom surface 4030 that provides a generally flat edge configured to provide a planar contact surface (or a plurality of surfaces that lie in the same plane) such that the portable accessory insert 4000 may rest in a stable manner on a supporting surface (e.g., a table, desk, etc.). In some embodiments, the bottom surface 4030 may directly contact the supporting surface to support portable accessory insert 4000 as a stand for the mobile device. In some embodiments, the bottom surface 4030 may include raised contact points 4032a, 4032b, and 4035 to enable portable accessory insert 4000 to function as a stable and secure for the mobile device on an uneven supporting surface, thereby providing independent points of contact with resting surface. In the embodiment illustrated in FIGS. 5Q(i)-5S(ix), raised contact point 4035 may be positioned under or near movement-enabling member 4070 and contacts points 4032a, 4032b may be positioned along body portions 4001a, 4001b, respectively, at a distance physically away from contact point 4035. In some embodiments, contacts points 4032a, 4032b may be generally aligned, thereby functioning as a single contact point when the portable accessory insert 4000 is in a closed configuration, as illustrated in FIGS. 5P(i)-(ix). In some embodiments, the bottom surface 4030 and/or contact points 4032a, 4032b, 4035 can be made of tacky or somewhat slide resistant material (e.g., having flexible or resilient surfaces co-molded) to minimize slipping between the portable accessory insert 4000 and the resting surface.

The mobile device may be supported by portable accessory insert 4000 in multiple orientations. The mobile device can be repeatedly pivoted, flipped, or rotated, and then reinserted into gaps 4040a, 4040b of the portable accessory insert 4000 in multiple positions. The portable accessory insert 4000 may be configured to act as a stand in a plurality of orientations. For example, in some embodiments, a longer edge of the mobile device may be inserted into gaps 4040a, 4040b, thereby positioning the mobile device in the portable accessory insert 4000 in a landscape orientation, as shown in FIGS. 5R and 5S(i)-(ix). In some embodiments, a shorter edge of the mobile device may be inserted into gaps 4040a, 4040b, thereby positioning the mobile device in the portable accessory insert 4000 in a portrait orientation.

FIGS. 5T(i)-5V(ix) illustrate multiple views of a sample embodiment of a attachable accessory that can be used with portable accessory insert such as the portable accessory insert described above in reference to FIGS. 5A-5N and 5P(i)-5S(ix).

FIGS. 5T(i)-(ix) illustrates multiple views of an attachable accessory 5000. In some embodiments, the attachable accessory 5000 can comprise an insert gap 5010, first and second attachment portions 5020, 5030, and bottom portion 5040. The first and second attachment portions 5020, 530 can include first and second locking regions 5025, 5035, respectively. As described in greater detail below, and with reference to FIGS. 5U and 5V(i)-(ix), the first and second attachment portions 5020, 5030 can be configured to facilitate secure and repeatable insertion of a portable accessory insert, such as portable accessory inserts, 1700, 1800, and 4000. In some embodiments, the attachment portions 5020, 5030 may be configured to mate with a portable accessory insert to enable convenient carrying or attachment to a person or to a person's close articles, such as attaching the attachable accessory and portable accessory insert onto a belt, purse, keychain, or a backpack, etc.

Figure 5U:
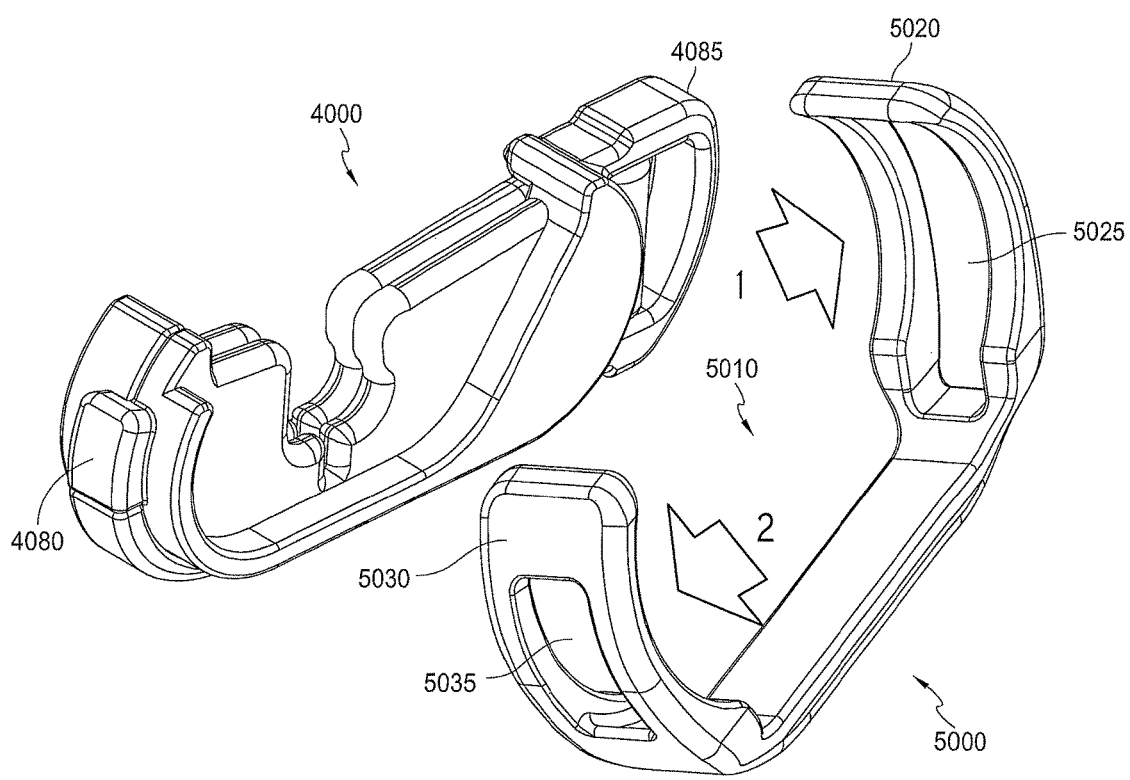
FIG. 5U illustrates the coupling of attachable accessory of FIG. 5T(i)-(ix) used with the portable accessory insert of FIG. 5P.

FIGS. 5U and 5V(i)-(ix) illustrate an embodiment of the attachable accessory of FIG. 5T(i)-(ix) used with a portable accessory insert, such as the portable accessory insert described above in reference to FIGS. 5P(i)-(ix) and 5Q(i)-(ix). While the description herein will be made with reference to portable accessory insert 4000, it will be understood that the attachable accessory 5000 may be designed for use with any number of portable accessories, for example portable accessories 1700 and 1800. The insert gap 5010 can be configured to repeatedly accept the insertion of portable accessory 4000, to hold the portable accessory 4000 to enable convenient carrying or attachment to a person or person's close articles without interfering with the insertion of the portable accessory insert between first and second sidewalls 342, 344 of the dual-lens system 300, as described below.

The attachable accessory 5000 may generally correspond to the shape and size of the outer surfaces of a portable accessory insert, as shown in FIG. 5V(i)-(ix). For example, the attachable accessory 5000 may be configured to generally conform to the curved ends of the portable accessory insert to enable alignment, sliding, and/or snapping the portable accessory insert into the attachment portions 5020, 5030.

In some embodiments, bottom portion 5040 may be generally aligned but spaced away from bottom surface 4030, thereby creating space 5045. Space 5040 may enable attachment to a person or to a person's close articles, such as attaching the attachable accessory and portable accessory insert onto a belt, purse, keychain, or a backpack, etc. In another embodiment, support portion 5040 may be a clip or other form of attachment that corresponds to a holster or other component that is attached to the person or a person's close article.

In the embodiment illustrated in FIGS. 5U and 5V(i)-(ix), a user can attach the portable accessory insert 4000 between the first and second attachment portions 5030, 5020 of the attachable accessory 5000 to its pre-set position. In some embodiments, once the portable accessory insert is placed within the attachable accessory, the first and second attachment portions 5020, 530 can snap or otherwise be secured onto the outer curved surfaces of portable accessory insert 4000. In some embodiments, the first and the second attachment portions 5020, 5030 can mate to the respective curved ends of the portable accessory insert 4000 or otherwise facilitate coupling of the portable accessory insert 4000 to the attachable accessory 5000. In some embodiments, the space between the first and second attachment portions 5020, 5030 may be smaller than the length of the portable accessory insert. When a portable accessory insert is inserted into insert gap 5010, the curved outer surfaces of the portable accessory insert apply outward pressure to the attachment portions 5020, 5030, thereby providing a secure and snug fit within insert gap 5010. In some embodiments, the first and the second attachment portions 5020, 5030 can be formed as a clip or an overhang, each having a hook-like shape with the tips of the hooks pointing towards the middle of the insert gap 5010, thereby enabling the attachable accessory 5000 to latch onto the portable accessory insert 4000, for example by latching onto first and second mating portions 4020 and 4030. In some embodiments, as shown in FIG. 5U, the first and the second attachment portions 5020, 5030 can include a cut-in or a recess, such as first and second locking regions 5025, 5035, configured to be coupled with the accessory attachment portions 4085, 4080, respectively. In some embodiments, accessory attachment portion 4085 comprises loop 4050. In some embodiments, accessory attachment portion 4080 comprises tabs 4082a, 4082b where the portable accessory insert 4000 is in a closed configuration as illustrated in FIG. 5U. In some embodiments, the accessory attachment portion 4085 may be inserted into first locking region 5025, and then accessory attachment portions 4080 may be inserted into second locking region 5025. Once the portable accessory insert and the attachable accessory 5000 are attached to one another, the bottom portion 5040 can create space 5045 between bottom portion 5040 and the bottom surface 4030 of portable accessory insert 4000. The bottom portion 5040 can be located generally on the outermost edge of the attachable accessory 5000 as shown in FIGS. 5T(i)-(ix). The shape and size of the support portion can be configured as an attachment area to a person or to a person's close articles, such as a belt purse, keychain, or a backpack, etc.

All or part of attachment accessory 5000 may be made of a material (e.g., a polymer or a silicone) that is sufficiently flexible to permit a degree of bending and stretching. Attachment portions 5020, 5030 can be temporarily widened or squeezed while sliding the portable accessory insert into attachable accessory 5000, but sufficiently stiff, rigid, and/or resilient to urge one or more features to return to its original position and thereby exert a gripping force against the outer curved surfaces of the portable accessory insert. The portable accessory insert may be slid or snapped into attachable accessory 5000, thereby providing a secure and snug fit within attachable accessory 5000. In some embodiments, the material of the attachable accessory 5000 can be tacky or somewhat slide resistant (e.g., being formed with co-molded flexible or resilient surfaces) to enhance the gripping of the portable accessory insert to the attachable accessory 5000. In some embodiments, only those portions of the attachable accessory 5000 in contact with the portable accessory insert are made of surfaces that are tacky or somewhat slide resistant. The portable accessory insert and/or portions thereof (e.g., those portions in contact with the attachable accessory 5000) can be tacky or somewhat slide resistant to enhance the gripping of the portable accessory insert by the attachable accessory 5000.

Referring to FIG. 6, a portable accessory insert used with a dual-lens system 300 is shown. A user can slide the portable accessory insert between the first and second sidewalls 342, 344 of the dual-lens system 300 to its pre-set position. Once the portable accessory insert is placed within the dual-lens system 300 to its pre-set position, the first and second sidewall mating portions 1760, 1765 in reference to FIGS. 5A-5E; 1860, 1865 in reference to FIGS. 5F-5J; or raised and recessed body portions 4060, 4065 in reference to FIGS. 5P(i)-5Q(ix) can mate with the sidewall alignment protrusions 312, 316 of the dual-lens system 300, while the first and second main body mating portions 1710, 1720; 1810, 1820; 4010, 4020 can latch onto the top surface above the first and second upper wall alignment protrusions 330, 320 of the dual-lens system 300. The portable accessory insert 1700, 1800, or 4000 can attach to the dual-lens system 300 and remain in place without any manual adjustment. Once the portable accessory insert and the dual-lens system 300 are attached to one another, a portion of the portable accessory insert having the loop 1750, 1850, and 4050 can be visible from the outermost edge of the dual-lens system, such that the loop 1750, 1850, and 4050 is accessible. The user may insert a lanyard loop or key ring to the portable accessory insert, and carry the dual-lens system 300 on his or her neck or in his or her keychain. An attachable accessory, such as the attachable accessory 5000 described in reference to FIGS. 5T(i)-5V(ix), may be attached to the portable accessory insert having been attached to a lens system, and a portion of the attachable accessory having a bottom portion 5040 can be visible from the bottom of the portable accessory insert, such that space 5045 is accessible. The user may insert a belt, strap of a bag or backpack, etc. and carry the dual-lens system 300, via the combination of the attachable accessory and portable accessory insert.

In some embodiments, the portable accessory insert 1700, 1800, or 4000 can include one or more electrical and/or mechanical features. For example, in some embodiments, the portable accessory insert can include, among others, a Bluetooth LED lens camera, a speaker, and/or a wireless activation sensor. In some embodiments, the portable accessory insert 1700, 1800, or 4000 can be a USB memory device, an extra battery for the mobile device, a mechanical utility device, such as a foldout screwdriver or knife, and/or a screen cleaning cloth with a mobile device, etc. One or more cameras of the portable accessory insert 1700, 1800, or 4000 can be configured to be coupled so as to accomplish optical communication with one or more optical components (e.g., one or more lenses) of an optical system that is configured to be removably attachable to the portable accessory insert 1700, 1800, or 4000, as illustrated. The portable accessory insert 1700, 1800, or 4000 can be configured to communicate photographic image data to a mobile electronic device, by wired or wireless connection, to enable remote viewing, processing, transmission, and/or storage of the image. In some embodiments, as illustrated, the portable accessory insert 1700, 1800, or 4000 can comprise a plurality of cameras configured to capture images in a plurality of different directions or orientations.

In some embodiments, all or part of the accessory insert 1700, 1800, or 4000 can be made of a material (e.g., a polymer or a silicone) that is sufficiently flexible to permit a degree of bending and stretching. In some embodiments, all or part of the accessory insert 1700, 1800, or 4000 can be made of a rigid material, such as a metal, an alloy, wood, or any other rigid material. The material of the accessory insert 1700, 1800, or 4000 can also be tacky or somewhat slide resistant to enhance the gripping of the dual-lens system 300 to the accessory insert 1700.

The mobile device illustrated in FIG. 7 is a mobile smart phone device 100 having onboard cameras 120, 130. Any other mobile device can be used (e.g., one or more other mobile phones, personal digital assistants PDAs, media players, and/or handheld gaming devices, etc.). In this example, a mobile device input button 110, a forward facing onboard camera lens 120 and a rear facing onboard camera lens 130 are shown. The mobile device input button can be located at, near, and/or on the top surface of the mobile device 100. The forward facing onboard camera lens 120 is positioned at, near, and/or on a corner of the mobile device where two generally orthogonal sides converge. The rear facing onboard camera lens 130 is positioned at, near, or on the top middle portion of the mobile device, on the surface opposite from where the forward facing onboard camera lens 120 is located.

Additional Embodiments

Referring to FIGS. 8A-8C, a schematic embodiment of an optical component 2000 is illustrated with multiple optical regions or lenses 2010, 2012, 2014, 2016. As illustrated, the number of optical regions or lenses can be greater than two, such as at least three or at least four. In some embodiments, the optical regions or lenses 2010, 2012, 2014, 2016 can each provide at least one different optical capability or feature that is different from the capabilities or features of the other optical regions or lenses. For example, in some versions, at least one optical region or lens can provide telephoto capability, at least one optical region or lens can provide variable or fixed polarizing capability, at least one optical region or lens can provide wide-angle capability, and/or at least one optical region or lens can provide fisheye capability, etc. Any other optical features described and/or illustrated elsewhere in this specification can be used in any of the optical regions or lenses 2010, 2012, 2014, 2016.

As illustrated, multiple optical regions or lenses can be provided on multiple sides of the optical component 2000. For example, at least two optical regions or lenses 2012, 2014 can be provided on a first side 2018 of the optical component 2000, and at least two optical regions or lenses 2010, 2016 can be provided on a second side 2020 of the optical component 2000. The second side 2020 can face in a generally opposite direction from the first side 2018. As shown, in some embodiments, the central axis or optical axis of each optical region can be spaced away from the central axis or optical axis of each other optical region.

The orientation and positioning of at least two optical regions or lenses 2012, 2014, 2016, 2018 can be configured to simultaneously provide an auxiliary or supplemental optical effect or enhancement respectively to at least two onboard cameras of a mobile electronic device (e.g., one onboard camera that faces the user and one onboard camera that faces away from the user) at the same time, while at least one or at least two other optical, regions or lenses 2012, 2014, 2016, 2018 are temporarily positioned away from, and not in optical communication with, any onboard camera. In some embodiments, as shown, at least two lenses (e.g., 2012/2014 or 2016/2018) on the same side of the can be positioned in a generally diagonal relationship with each other. In some embodiments, a plurality of lens-storing locations (not shown) can be provided on the optical component that allow one or more lenses to be temporarily attached to the optical component in a storage location until such time as a user decides to use such a lens by removing it from the storage location and placing it in an active socket or other active location that can be positioned in optical communication with an onboard camera by appropriately attaching the optical component to the mobile electronic device. For example, in some embodiments, a plurality (e.g., four, etc.) of lens sockets are provided, as shown, that can be positioned in optical communication with an onboard camera, and a plurality (e.g., at least two, or at least four, etc.) of lens-storing locations can be provided, which can allow for a single optical component to provide a collection of many different optical capabilities. For example, such an optical component can provide at least 3 or at least 4 or at least 8 or more optical capabilities, such as by using a combination of active and/or storage lens-holding locations.

In some embodiments, the optical regions or lenses can be positioned such that in multiple orientations of the optical component 2000 (or even in all orientations of the optical component 2000, as shown in the embodiment of FIGS. 8A-8C), at least two lenses are directed in a first direction and at least one or two lenses are directed in a second direction that is generally opposite from the first direction. In the illustrated example, the optical component 2000 can provide at least four different orientations and at least three or at least four (as shown) different optical capabilities for an onboard camera on a mobile electronic device, such as by rotating the optical component 2000 horizontally and/or vertically, as shown. In some embodiments, one or a plurality of the optical regions or lenses can be removably attachable to the optical component 2000, such as by a screw thread, a clip, or some other removable attachment, enabling many different types of optical regions or lenses to be interchangeably used with the optical component 2000.

In some embodiments, as shown, the optical component can comprise a retainer component 2022 that is configured to be removably attachable to a mobile electronic device. The attachment between the retainer component 2022 and the mobile electronic device can be accomplished or assisted by any one or more of the features, structures, steps, and/or materials that are described and/or illustrated in any embodiment in this specification, or in any other way. In some embodiments, the attachment between the retainer component 2022 and the mobile electronic device can be accomplished or assisted using a friction fit between one or more interior regions 2029, 2030 of the optical component 2000 and an edge or other region of the mobile electronic device.

As illustrated in FIGS. 8A-8C and FIG. 9A, the retainer component 2022 can be formed from a combination of first and second separable retainer portions 2024, 2026 which can be temporarily joined together by a connector 2028. As with all embodiments in this specification, any structure, feature, step, or material that is illustrated and/or described in any other embodiment in this specification can be used in addition to or instead of those illustrated and/or described in these figures. For example, anything illustrated and/or described in connection with dual-lens system 300 or body portion 340 can be used instead of or in addition to anything illustrated and/or described in connection with either or both of the retainer portions 2024, 2026. In some embodiments, the retainer component 2022 can be formed by a permanent attachment of initially separate retainer portions 2024, 2026. In some embodiments, the connector 2028 can attach the first and second retainer portions 2024, 2026 to each other using one or more structures and/or methods, such as one or more temporary fasteners (e.g., a snap-fit, a hook-and-loop connection, a tongue-and-groove connection, and/or a friction fit between adjacent components, etc.) Although illustrated schematically in the figures, the retainer portions 2024, 2026 can include any of the features, materials, structures, and/or shapes of the body portion 340, and can be configured to accomplish any of the benefits or advantages of the body portion 340. As illustrated, the attachment between the respective first and second retainer portions 2024, 2026 can be performed along respective upper edges of the retainer portions 2024, 2026, but any other mode or location or structure for attachment can be used. In some embodiments, the connection between the respective first and second retainer portions 2024, 2026 can be accomplished using integral or permanently attached features on the retainer portions 2024, 2026, rather than using a separate connector 2028 as shown.

As illustrated in FIGS. 8D and 9B, in some embodiments, an optical component 2100 can comprise a retainer component 2122 that is made of a unitary, non-separable body (e.g., not separable by a consumer) with a plurality of optical regions or lenses 2110, 2112, 2114, 2116. Any description or illustration of any features of separable embodiments applies equally to permanently attached or unitary devices as well.

As shown in FIGS. 10 and 11, the retainer component 2022 of the optical component 2000 can be configured to be removably coupled to a mobile electronic device, such as mobile device 100, in any manner that can temporarily attach the optical component 2000 to the mobile device in a sufficiently secure manner to enable capturing photographic images or video through one or more of the lenses 2010, 2012, 2014, 2016 that are positioned in optical communication with one or more onboard cameras of the mobile device 100 (e.g., in simultaneous optical communication with an onboard camera that is configured to face the user and an onboard camera that is configured to face away from the user), without slipping, shifting, sliding, and/or undesirably interfering with the captured image. In some embodiments, the attachment of the optical component 2000 to the mobile device 100 is achieved through a friction fit, without any dynamic mounts (e.g., without moveable screws and/or clamps, etc.). In some embodiments, the retainer component 2022 can be configured to contact the mobile device 100 along at least one edge (e.g., the upper edge 2034) and/or along at least two edges (e.g., in a corner region, along an upper edge 2034 and a side edge 2032, etc.), without extending all of the way across the upper edge and/or without extending all of the way across a vertical side edge. The distance between the respective interior-facing portions of the first and second sides 2018, 2020, or the width of the interior regions 2029, 2030, can be configured to be approximately the same size as the width of a portion (e.g., an edge or a corner 2032) of the mobile electronic device 100 to which the optical component 2000 is configured to attach, in order to achieve a secure connection between the optical component 2000 and the mobile electronic device 100.

In some embodiments, to switch or modify optical capabilities, a user can change the physical orientation of the optical component 2000, and/or remove any of the optical regions or lenses 2010, 2012, 2014, 2016 and reattach a different optical region or lens having one or more different optical capabilities. For example, as illustrated in FIG. 10, optical region or lens 2014 is positioned in optical communication with an onboard camera (not shown) that is configured to face the user of the mobile electronic device, and optical region or lens 2016 is positioned in optical communication with another onboard camera (not shown) on a generally opposite surface of the mobile electronic device that is configured to face away from the user of the mobile electronic device. If the user desires to utilize the optical capability of optical region or lens 2012 for the user-facing onboard camera, then the user can remove the optical component 2000 from the mobile electronic device 100, rotate it in a generally vertical plane such that optical region or lens 2012 is moved into the position previously occupied by optical region or lens 2014, and then reattach the optical component 2000 to the mobile electronic device 100 (e.g., by positioning a portion of the mobile electronic device 100 within the interior region 2029). At a later time, if the user desires to utilize the optical capability of optical region or lens 2012 for the onboard camera that faces away from the user, then the user can remove the optical component 2000 from the mobile electronic device 100, rotate it in a generally horizontal plane such that optical region or lens 2012 is moved into the position previously occupied by the optical region or lens 2010, and then reattach the optical component 2000 to the mobile electronic device 100. In the illustrated configuration, any of a plurality of active optical regions or lens 2010, 2012, 2014, 2016 on an optical component can be positioned in optical communication with any of a plurality of onboard cameras on a particular mobile electronic device by appropriately rotating the optical component 2000 in a vertical and/or horizontal plane.

A selected plurality of optical regions or lenses (e.g., at least two of the optical regions or lenses 2010, 2012, 2014, 2016) can be simultaneously utilized on the same mobile electronic device 100, such as in optical communication, respectively, with the onboard camera that faces the user and the onboard camera that faces away from the user, by removing and/or attaching the desired combination of optical regions or lenses 2010, 2012, 2014, 2016 to respective active receiving sockets (such as using a threaded, clip, or friction-fit attachment, etc.) in the retainer component 2022.

As illustrated in FIG. 12, in some embodiments, a movable connection can be provided between first and second retainer portions 2202, 2204 of an optical component 2200. As in all embodiments of this specification, any structure, feature, material, or method described and/or illustrated anywhere in this specification can be used in addition to or instead of anything illustrated and/or described in connection with the embodiment of FIG. 12. A movement-enabling member, such as a hinge region 2206 (as shown), a pivot, a slider, a resilient or stretching member (e.g., a spring), and/or a rotating member, etc., can provide relative movement between the first and second retainer portions 2202, 2204 before, during, and/or after attachment of the optical component 2200 to a mobile electronic device. As shown, the movement-enabling member is configured to permit a user to change the distance between one or more of the optical regions or lenses. For example, by rotating or otherwise moving the first retainer portion 2202 with respect to the second retainer portion 2204, the distance between a first optical region or lens 2212 and either or both of second and third optical regions or lenses 2214, 2216 can change. In some embodiments, the relative movement between the retainer portions is angular, as illustrated, configured to enable a user to rotate one retainer portion with respect to another retainer portion by any suitable angle between about 0 degrees (e.g., generally parallel in some embodiments, as illustrated) to about 270 degrees. In some embodiments, the angle is about 45 degrees, or greater than or equal to about 30 degrees and/or less than or equal to about 180 degrees and/or less than or equal to about 270 degrees, or greater than or equal to about 270 degrees. In some embodiments, the user can adjust the angular relationship to set it at any particular angle within a range, as desired, and the retainer portions 2202, 2204 will remain in such angular relationship until the user changes the angle.

In some embodiments, movement between these components can provide one or more advantages. For example, in some embodiments, when a particular optical region or lens 2216 is especially large (e.g., when it is wider than the retainer portion 2204 to which it is attached, as illustrated), or especially bulky, and/or asymmetrically shaped, it can be advantageous to provide a temporary increase in the amount of separation between adjacent retainer portions 2202, 2204 during photographic use to avoid capturing part of an outer portion of a large optical region or lens 2216 in an image captured through another lens 2212. In some embodiments, the movement-enabling member permits the first and second retainer portions 2202, 2204 to be moved back together (or back to an initial position) during storage or transportation of the optical component 2200, when not in photographic use.

As shown in FIGS. 13A-13D and 14A-14C, an accessory attachment or insert 2700, 2800, 2900 can be utilized with one or more optical components 2000, 2100, etc. As in all embodiments in this specification, any structure, feature, material, or method described and/or illustrated anywhere in this specification can be used in addition to or instead of anything illustrated and/or described in connection with the embodiments of these figures. For example, anything that is described and/or illustrated in connection with any other accessory attachment or insert in this specification (such as portable accessory attachment or insert 1700) can be used in addition to or instead of anything on accessory attachment or insert 2700, such as a camera, a flash, an electronic connector, a speaker, and/or a wireless communicator, etc., and/or any particular shape, contour, structure, attachment, and/or other feature, etc.

Figure 13A:
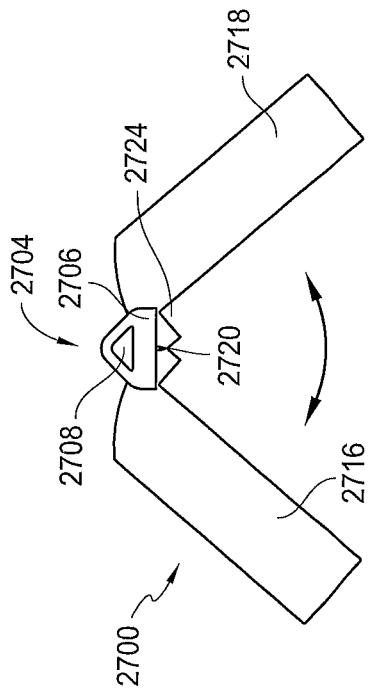
FIGS. 13A-13B are front views of an accessory attachment or insert.
Figure 13C:
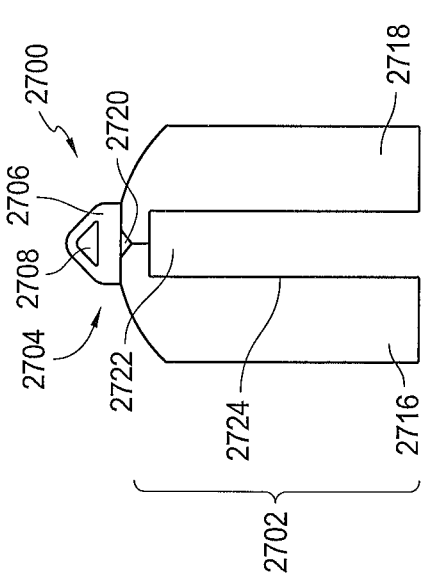
FIG. 13C is a front view of the accessory attachment or insert of FIGS. 13A-13B attached to an optical component.

As shown in FIG. 13A, an accessory attachment or insert 2700, 2800, 2900 can comprise an attachment or insert portion 2702, 2802, 2902 that is configured to attach with or be inserted into or otherwise interface with an optical component 2000, and the accessory attachment or insert 2700, 2800, 2900 can comprise a utility portion 2704, 2804, 2904 that is configured to provide a utility to a user, such as providing a region for connecting with another object, such as a carrying object (e.g., a key ring, or a belt loop, or a backpack, or a necklace, and/or a bracelet, etc.). As illustrated, the utility portion 2704, 2804, 2904 can comprise an attachment structure 2706 that is configured to attach to and/or receive another object. In some embodiments, the attachment structure 2706 can comprise an attachment recess, aperture, and/or groove 2708, 2808, 2908. In some embodiments, the accessory attachment or insert 2700, 2800, 2900 can provide a way to easily and conveniently transport and/or store the optical component 2000.

As shown, in some embodiments, the attachment or insert portion 2702 can be sized and/or shaped to attach with the optical component 2000. For example, the attachment or insert portion 2702, 2802, 2902 can comprise one or more attachment structures, such as a plurality of legs 2716, 2718, 2816, 2818, 2916, 2918, one or more of which can be configured to connect with a respective portion of the optical component 2000, such as in a respective interior region 2029, 2030 of the optical component 2000, or any other region.

Figure 13B:
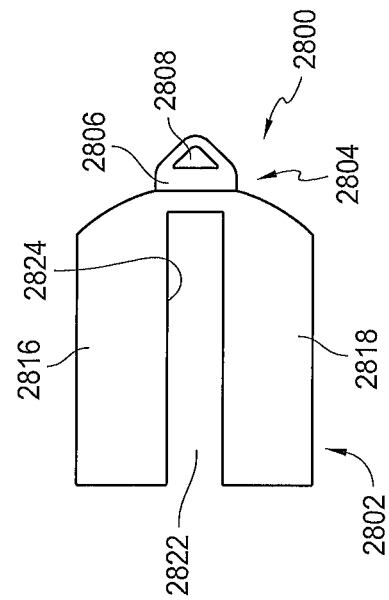
Figure 13D:
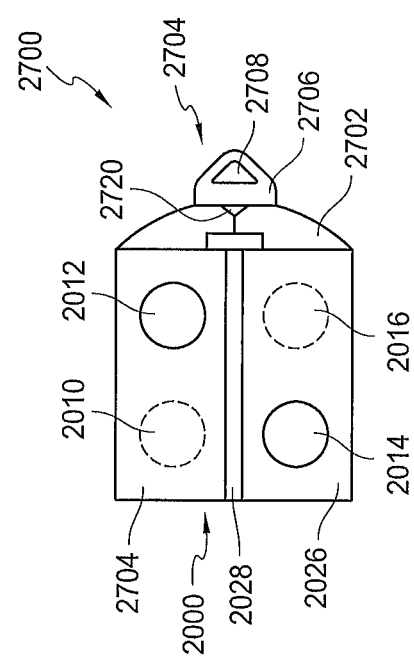
FIG. 13D is a front view of another embodiment of an accessory attachment or insert.

In some embodiments, as illustrated in FIGS. 13A-B, the accessory attachment or insert 2700 can comprise a first or closed stage in which one or more of the attachment structures or legs 2716, 2718 are in a first, attached, generally straight, and/or generally parallel position, wherein the accessory attachment or insert is configured to be attached to the optical component 2000 (see FIG. 13A), and a second or open stage in which one or more of the attachment structures or legs 2716, 2718 can be configured to move, such as by rotating, pivoting, and/or sliding into a second, detached, generally diagonal, generally non-parallel, and/or further spaced-apart position, to facilitate removal or detachment of the accessory attachment or insert from the optical component 2000. In some embodiments, as shown, a side or interior edge 2724, 2824 can be configured to contact an interior region 2029, 2030 of an optical component 2000. In some embodiments, as shown, the exterior shape of the accessory attachment or insert 2700, or some portion thereof, can generally correspond to or be generally complementary to a portion of the optical component 2000 to which the accessory attachment or insert 2700 is configured to attach (such as the interior region 2029, 2030), as with the accessory attachment or insert 1700. As illustrated, the one or more attachment structures can move around a pivot or hinge structure 2720. A space 2722, 2822, 2922 can be provided in the accessory attachment or insert 2700, 2800, 2900 that generally corresponds to the distance of separation between the respective interior regions 2029, 2030 of the optical component 2000. In some embodiments, as illustrated in FIG. 13D, the attachment structures or legs 2816, 2818 of the accessory attachment or insert 2800 are fixed relative to each other and/or relative to the utility portion 2804.

As shown in FIGS. 14A-14C, an optical component 2150 can comprise a plurality of retainer portions 2152, 2154 that are configured to attach to each other without requiring an intermediate connector. In some embodiments, as illustrated, the retainer portions 2152, 2154 also do not require any structures on the retainer portions 2152, 2154 themselves to attach to each other. Rather, the accessory attachment or insert 2900 can provide the connection between the retainer portions 2152, 2154. When the accessory attachment or insert 2900 is separated from the retainer portions 2152, 2154, then the optical component 2150 can be dismantled or disassembled, and each retainer portion 2152, 2154 can function as a separate optical component, as with any of the optical components illustrated and/or described in this specification.

As illustrated in FIG. 14C, the attachment structures or legs 2916, 2918 can be sufficiently thin so that, when the accessory attachment or insert 2900 is attached to the retainer portions 2152, 2154 to form the optical component 2150, there is still sufficient space within the interior regions 2929, 2930 to securely receive the portion of the mobile electronic device 100 to which the optical component 2150 is configured to attach.

In some embodiments, one or more surfaces or structures of the attachment structures or legs 2916, 2918, or some other portion of any retainer portion disclosed in this specification, can comprise an attachment region (such as a clip or lock or screw) or a friction-inducing region, such as a tacky, resilient, flexible, roughened, patterned, bumpy, and/or other region with a high coefficient of friction, to help secure the accessory attachment or insert 2900 to the optical component 2150. As with all features in this specification, an attachment region or high-friction region can be included in any location on any structure illustrated and/or described herein, such as in an interior region 2029, 2030 or on any other surface where it is desirable to increase friction to resist detachment.

In some embodiments, a high-friction region can be made of the same material as other regions of the optical component 2150, but it can include an irregular or uneven surface. In some embodiments, the high friction region is applied or attached to a portion of the optical component 2150, such as by painting, deposition, adhering, and/or molding (e.g., comolding or overmolding), etc. The high-friction region can require that the force of attachment and/or removal between the accessory attachment or insert 2900 and the optical component 2150 (or portions thereof, such as either or both of the retainer portions 2152, 2154) is greater than without the high-friction region, thus providing a secure attachment, resisting or impeding movement between components, and/or diminishing the risk of an accidental or unintentional decoupling of the component(s). A high-friction region can be provided in any embodiment on any retainer portion to provide a high-friction contact between the retainer portion and a portion of the mobile electronic device 100 to which the retainer portion is configured to attach.

As illustrated in FIGS. 15A-B, some embodiments of an optical component 2300, 2400 can comprise retainer portions 2024, 2026 that attach in regions or in ways other than along and between respective top edges of the retainer portions (e.g., such as illustrated in FIGS. 8A-8D, 9A-B, 10, and 11). For example, as shown in FIG. 15A, a connector 2328 (or one or more connection structures integral with the retainer portions) can be provided between respective lateral sides 2332 of the retainer portions 2024, 2026 to temporarily or permanently couple the retainer portions 2024, 2026 together. The optical component 2300 can be slid or can be rotated in a generally horizontal plane to select a particular optical region or lens 2010, 2012, 2014, 2016 to be used with a particular onboard camera on a mobile electronic device. In addition or alternatively, as with all other embodiments illustrated and/or described in this specification, the optical regions or lenses 2010, 2012, 2014, 2016 can be removably attached to the respective retainer portions 2024, 2026 to enable interchangeability of optical features or capabilities. As shown in FIG. 15B, a connector 2330 can be configured to removably attach to and extend along at least a portion of respective top edges of the respective retainer portions 2024, 2026, but without being positioned between the respective top edges of the respective retainer portions 2024, 2026. Any connector described and/or illustrated in this specification can include any feature, structure, step, or material that is described and/or illustrated in any other embodiment of this specification.

As shown in the schematic example of FIG. 16, in some embodiments, an optical component 2400 can comprise one or more retainer portions 2024, 2026 that are coupled in any suitable way with a connector 2428 that comprises one or more functional features, such as one or more electronic features, besides or in addition to a connection feature. For example, as shown, the connector 2428 can comprise one or more lighting enhancement features 2430, such as a flash; a wireless communicator such as a Bluetooth, WiFi, and/or Ant protocol communicator or transceiver; one or more auxiliary power sources, such as a battery or a power connector; one or more communication features that enable a user to more conveniently communicate with the mobile electronic device, such as one or more buttons 2436 that can be configured in either a standard or user-modifiable way to perform one or more functions, such as capturing an image or setting lighting conditions, setting the focus in a photographic image, and/or setting the timing of an image capture.

FIGS. 17-21 illustrate an example of multi-lens system or optical component 3000 configured to be removably attached to multiple (e.g., two or more) mobile devices of different sizes. The optical component 3000 may include a body portion, such as a retainer clip, and multiple optical elements, such as lenses, as described above with respect to various other embodiments of lens systems and optical components. As with all embodiments in this specification, any structure, feature, step, or material that is illustrated and/or described in any other embodiment in this specification can be used in addition to or instead of those illustrated and/or described in FIGS. 17-21, and any structure, feature, step, or material that is illustrated and/or described with respect to FIGS. 17-21 may be used in addition to or instead of those illustrated and/or described with respect to any other embodiment in this specification. For example, anything illustrated and/or described in connection with dual-lens system 300 can be used instead of or in addition to anything illustrated and/or described in connection with the optical component 3000, such as at least two different lenses or other optical elements configured to be generally aligned with at least two different onboard camera lenses on two different, generally parallel faces of a mobile device. The optical component 3000 can be removed, rotated, and reattached to the same mobile device, thereby changing which optical element is positioned in general optical alignment with each of a plurality of onboard camera lenses. Thus, users may be provided with multiple (e.g., two or more) optical elements, each providing a different optical effect, and the elements can be selectively used with each camera of the mobile device.

Figure 17:
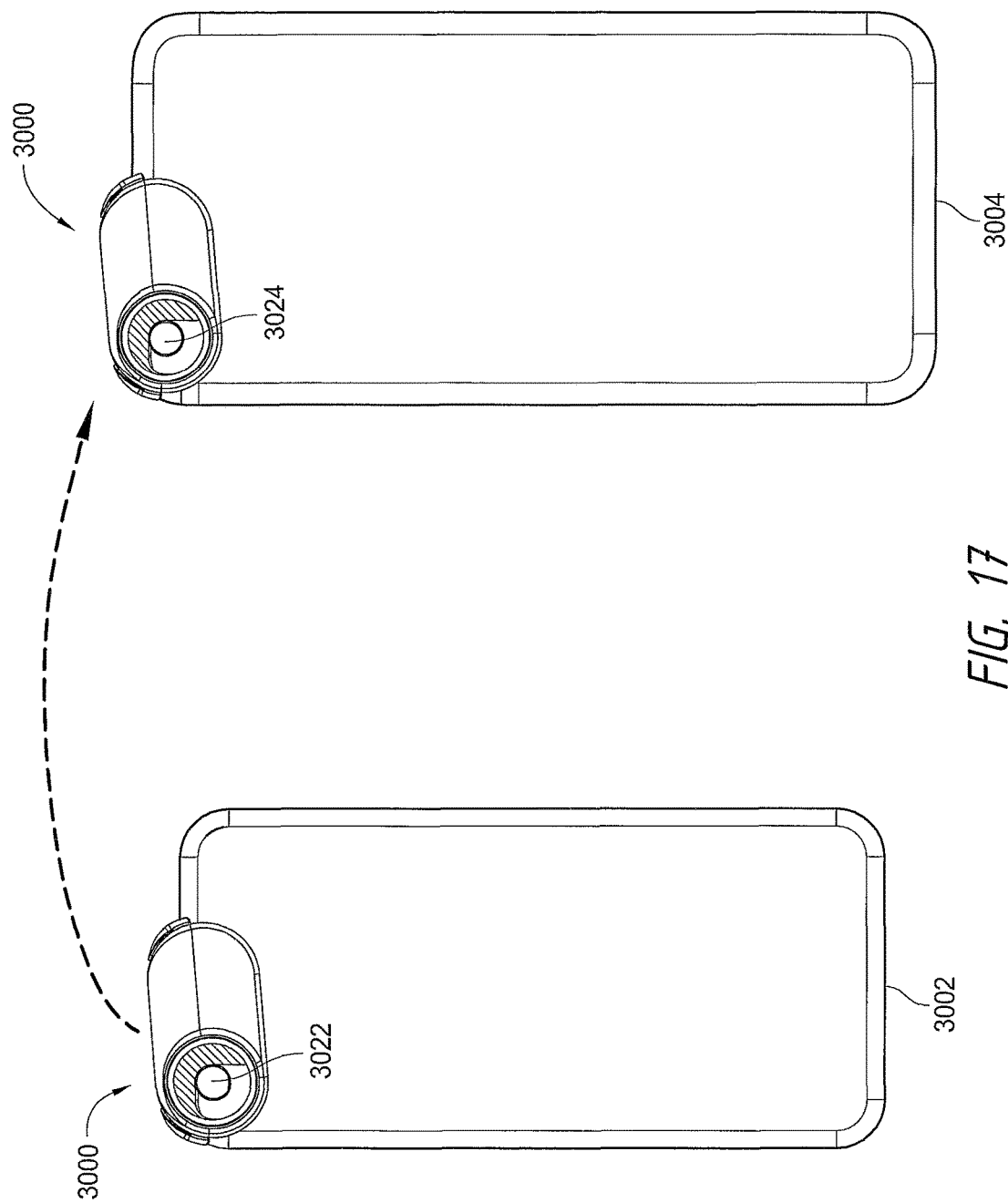
FIG. 17 is a front and rear view of another embodiment of an optical component on a mobile device.

In some embodiments, as shown in FIG. 17, the optical component 3000 can be removably attached to a first smaller mobile device 3002, such that at least two different optical elements are generally aligned with at least two different onboard camera lenses 3020, 3022 on at least two different generally parallel faces 3202, 3204 of the smaller mobile device 3002. For clarity, the optical elements have been omitted from the illustrations of the optical component 3000 so that the underlying structures of the optical component 3000 and/or components of the mobile device 3002 can be seen. In some embodiments, optical elements may be permanently or removably attached to or integrated with the optical component 3000.

Figure 18:
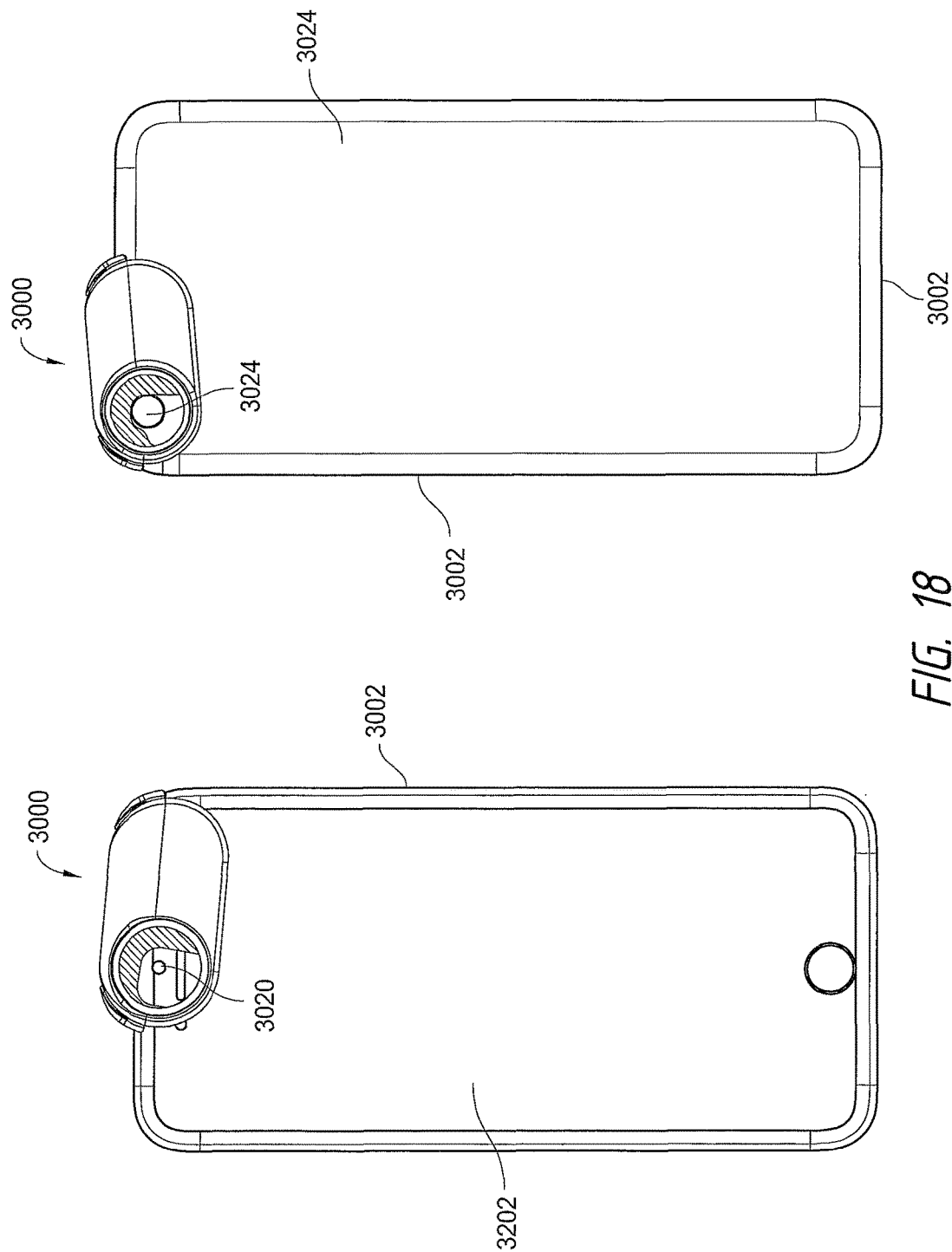
FIG. 18 is a front view of an embodiment of an optical component and two mobile devices of different sizes.

As shown in FIG. 18, a user may remove the optical component 3000 from the smaller mobile device 3002 and removably attach the same optical component 3000 to a different, larger mobile device 3004. For example, the larger mobile device 3004 may have a width between two generally parallel, lateral edges (e.g., left and right edges) that is larger than the corresponding width of the smaller mobile device 3002. As used herein, the terms "larger mobile device" and "smaller mobile device" are used according to their ordinary meanings, and may in some embodiments refer to devices that differ in individual dimensions rather than in total size, volume, etc. In some embodiments, the larger mobile device 3004 may be larger in other dimensions than the smaller mobile device 3002, such as the height between generally parallel top and bottom edges, the thickness between two generally parallel front and rear faces, etc. In some embodiments, the larger mobile device 3004 may have one or more dimensions that are smaller than or about equal to the corresponding dimensions of the smaller mobile device 3002 in addition to one or more dimensions that are larger than the corresponding dimensions of the smaller mobile device 3002. Although FIG. 18 illustrates the movement of the optical component 3000 from a smaller mobile device 3002 to a larger mobile device 3004, the optical component 3000 may also be moved from the larger mobile device 3004 to the smaller mobile device 3002.

Figure 19:
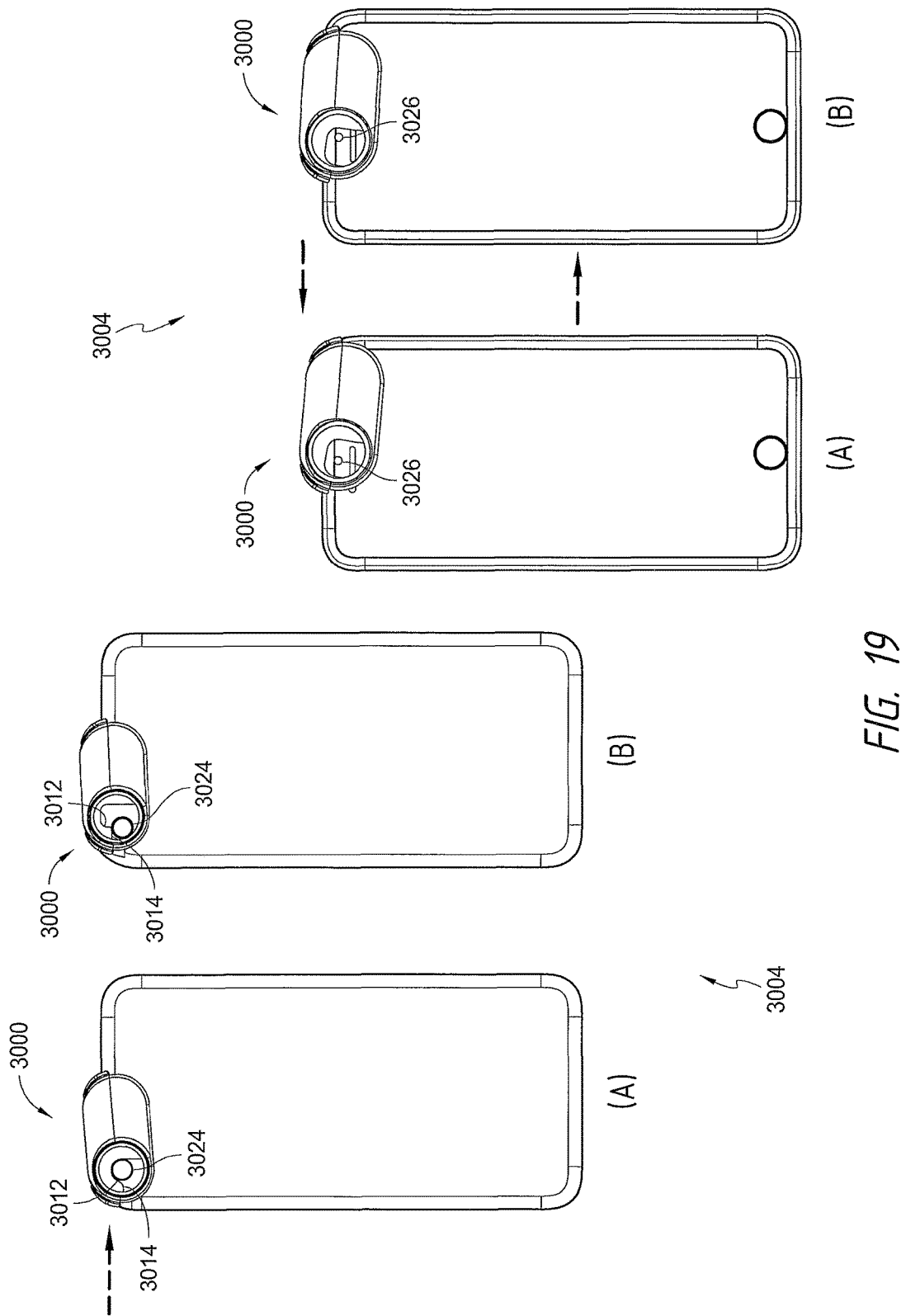
FIG. 19 is a front and rear view of an optical component in two different positions on a mobile device.

As shown in FIG. 19, the optical component 3000 may be removably attached to a larger mobile device 3004 and can generally align optical elements of the optical component 3000 with onboard camera lenses of the larger mobile device 3004. However, because the larger mobile device 3004 in this example has a larger width between generally parallel lateral edges than the smaller mobile device 3002, one or more of the onboard cameras may be located in a different position on a face of the larger mobile device 3004 with respect to the optical component 3000 than the corresponding onboard camera of the smaller mobile device 3002. For example, a user-facing camera 3026 of the larger mobile device 3004 may be located at a position that is farther from a left or right lateral edge of the larger mobile device 3004 than the position of the corresponding user-facing camera 3020 is from the corresponding left or right lateral edge of the smaller mobile device 3002. As another example, the user-facing camera 3026 of the larger mobile device 3004 may be located at a position that is displaced laterally from the rear-facing camera 3024 of the larger mobile device 3004 (e.g., the displacement may refer to the distance between generally parallel optical axes of the onboard camera lenses 3024, 3026). This distance may be larger than the distance between the optical axes of the user-facing camera 3020 and the rear-facing camera 3022 of the smaller mobile device 3002. As a result, when the optical element 3000 is removably attached to the larger mobile device 3004 in a first position (e.g., position [A] in FIG. 19), an optical element may be generally aligned with one onboard camera lens (e.g., the rear-facing camera 3024), while a second optical element may not be aligned with another onboard camera lens (e.g., the user-facing camera 3026). In order to compensate for such differences in the location of onboard camera lenses described above, the optical component 3000 may include one or more alignment structures to facilitate alignment of the optical elements of the optical component 3000 with multiple (e.g., two or more) different onboard camera lenses of the larger mobile device 3004 by providing multiple (e.g. two or more) different positions in which the optical component 3000 can be oriented (e.g., positions [A] and [B] in FIG. 19).

Figure 20:
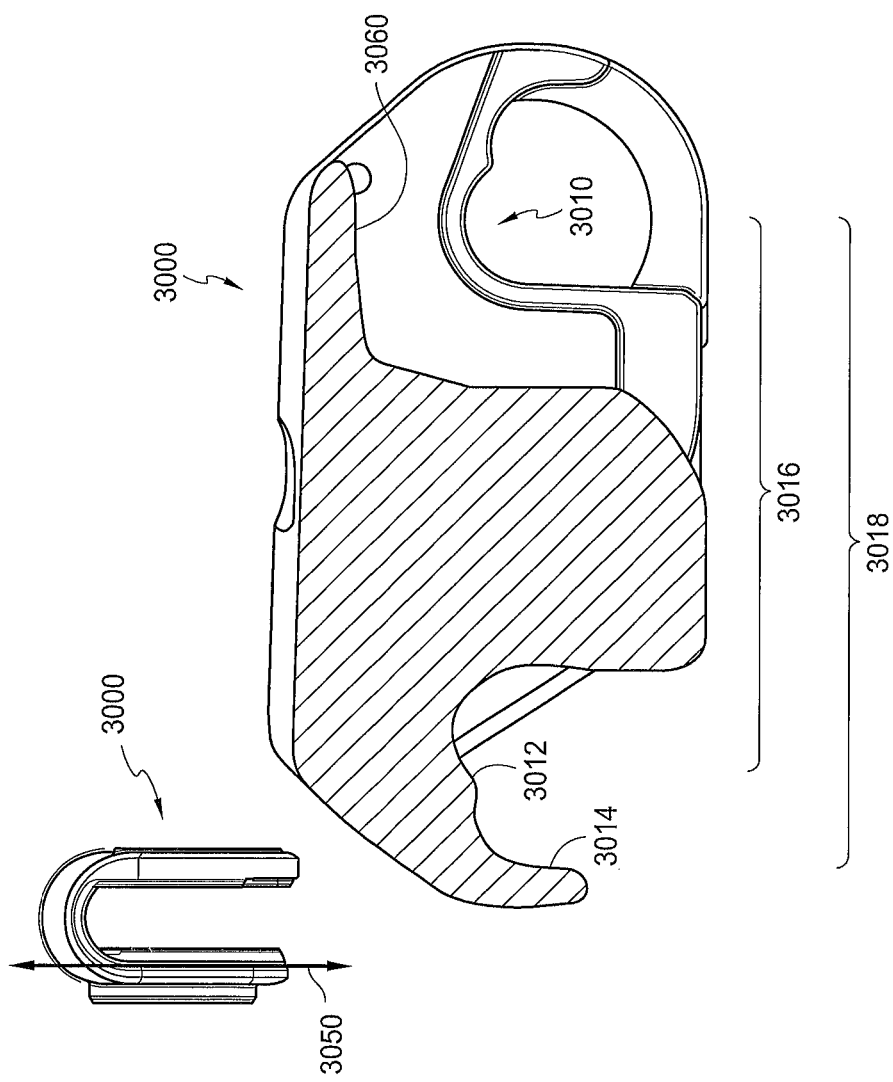
FIG. 20 is a partial cutaway front view of an embodiment of an optical component.

FIG. 20 shows a view of the optical component 3000 partially cut away along plane 3050. As shown, the optical component 3000 may include alignment structures 3012 and 3014. In each of two or more different positions, a different alignment structure may contact a portion of the mobile device on which the optical component 3000 is installed, depending upon which onboard camera (and, therefore which optical element) a user wishes to use. In some embodiments, the mobile devices 3002 and 3004 may include at least one onboard camera (or a structure that is surrounding, adjacent to, or integrated with the camera) that is raised with respect to the face on which it is located (e.g., extends away from the generally planar face in a direction generally orthogonal to the generally planar face). For example, the rear-facing cameras 3022, 3024 of the smaller and larger mobile devices 3002, 3004, respectively, may be raised or may be surrounded by a raised ring. The raised rear-facing cameras 3022, 3024 (or raised rings, etc.) may register against (e.g., contact or abut) an alignment structure 3012, 3014 of the optical component 3000 to automatically align the optical component 3000 properly on the mobile device. The optical component 3000 may include a registration point or surface 3060 that can register against (e.g., contact or abut) another portion of the mobile device onto which the optical component 3000 is attached (e.g., the top edge). The combination of registration point 3060 and one of the alignment structures 3012 or 3014 contacting the mobile device in different locations (e.g., the top edge and raised rear-facing camera, respectively) can provide repeated and automatic alignment of the optical component 3000 on a mobile device in a single attachment motion, reducing or eliminating the need for manual user adjustments to achieve proper alignment.

As shown in FIG. 20, a first alignment structure 3012 may be a first distance 3016 from a point 3010 that corresponds to the optical axis of an onboard camera lens, such as a forward-facing camera 3026 of the larger mobile device 3004. The second alignment structure 3014 may be a second, larger distance 3018 from the point 3010. The first distance 3016 may correspond to the distance between the optical axis of the front-facing camera 3020 of the smaller mobile device 3002 and a point of contact on the raised rear-facing camera 3022 (or a raised structure that surrounds or is adjacent to the rear-facing camera 3022). When a user removably attaches the optical component 3000 to the smaller mobile device 3002 such that the first alignment structure 3012 contacts the rear-facing camera 3022 and the registration point 3060 contacts the top edge of the smaller mobile device 3002, each of the cameras 3020, 3022 may simultaneously be in optical element with a corresponding optical element of the optical component 3000.

The second distance 3018 may correspond to the distance between the optical axis of the front-facing camera 3026 of the larger mobile device 3004 and a point of contact on the rear-facing camera 3024 (or a structure that surrounds or is adjacent to the rear-facing camera 3024). When a user removably attaches the optical component 3000 to the larger mobile device 3004 such that the first alignment structure 3012 contacts the rear-facing camera 3024 and the registration point 3060 contacts the top edge of the larger mobile device 3004, the user-facing camera 3026 may not be aligned with a corresponding optical element of the optical component 3000, even though the rear-facing camera 3024 may be aligned with a corresponding optical element of the optical component 3000. FIG. 19 illustrates an example of an optical component 3000 so oriented on a larger mobile device 3004 in position [A]. When the user moves (e.g., slides or pivots) the optical system 3000 such that the raised rear-facing camera 3024 (or a raised structure that surrounds or is adjacent to the rear-facing camera 3024) contacts the second alignment structure 3014 and the registration point 3060 contacts a different point along the top edge of the larger mobile device 3004, the user-facing camera 3026 may be aligned with the corresponding optical element of the optical component 3000. However, the rear-facing camera 3024 may not be aligned with a corresponding optical element of the optical component 3000. FIG. 19 illustrates an example of an optical component 3000 so oriented on a larger mobile device 3004 in position [B]. In some embodiments, as shown, one or more of the alignment structures 3012, 3014 can comprise generally circular or arcuate portions that are configured to match or correspond to or register against at least a portion of a an onboard camera that extends away from the mobile device (or a structure that extends away from the mobile device and that surrounds, is adjacent to, or is integrated with the onboard camera). A protruding portion can extend between adjacent alignment structures 3012, 3014 to create a barrier or an impediment between the respective alignment structures 3012, 3014 to assist in maintaining registration or contact or securement of a particular alignment structure 3012, 3014 and to resist sliding or removal of the optical component 3000 until a user applies a force in a particular direction to remove it. Alignment structures 3012, 3014 (and/or registration point 3060) may also be duplicated or otherwise included in a second portion of the optical component 3000, corresponding to a second optical element, to facilitate alignment of the optical component 3000 when a user removes, rotates, and re-attaches the optical component 3000 to the same mobile device, as described herein.

Figure 21:
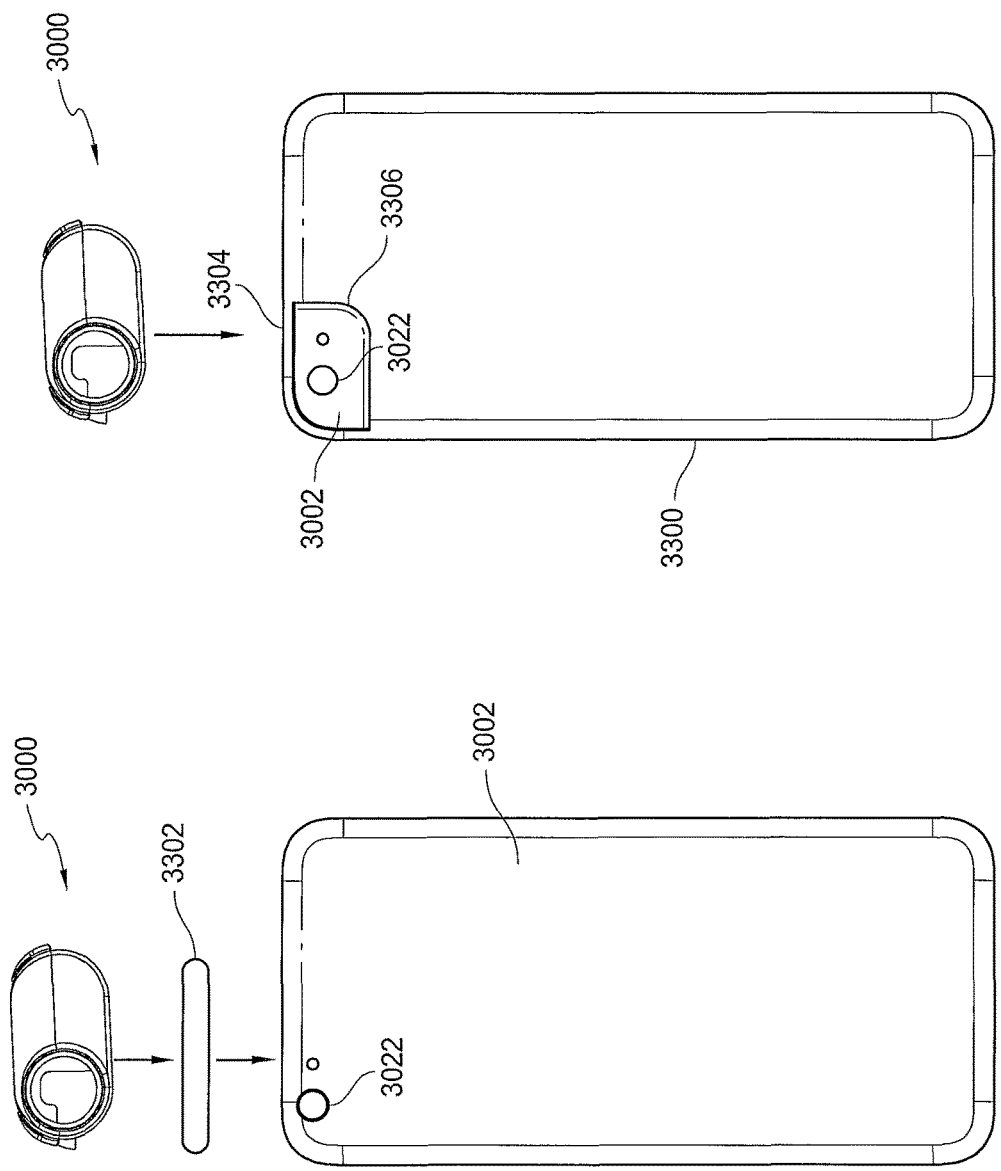
FIG. 21 is a front view of an optical component being attached to a mobile device with a case and a mobile device without a case.

FIG. 21 illustrates the optical component 3000 being attached to a mobile device 3002 without a protective case, and the same optical component 3000 being attached to a mobile device 3002 onto which a protective case 3300 has been installed. The protective case 3300 may have a component access portion 3306, such as a void or cut-out, at a location that corresponds to an onboard camera 3022 of the mobile device 3002. In addition to providing access to the onboard camera 3022 and reducing or eliminating undesired obstruction of the camera 3022 during use, the component access portion 3306 can permit attachment of the optical component 3000 onto the mobile device 3002 while the case 3300 is installed on the mobile device 3002. The case 3300 may include a support member 3304 that partially surrounds or defines the component access portion 3306, provides rigidity and stability to the case 3300, and/or protects an edge of the mobile device 3002. The optical component 3000 may be sized or shaped such that it can receive the support member 3304 and still be properly installed onto and aligned with the mobile device 3002. However, when an optical component 3000 is sized or shaped to receive such a support member 3004, the optical component 3000 may not be securely installed onto or properly aligned with the mobile device 3002 when the optical component 3000 is attached to the optical device 3002 in other contexts, such as when no protective case 3300 is installed. A removable adapter 3302 may be used to aid in securing the optical component 3000 to or aligning the optical component 3000 with the mobile device 3002 in such situations. For example, the adapter 3302 may be about the same size and/or shape as the securement member 3304, or it may otherwise be sized and/or shaped to aid in securing the optical component 3000 to or aligning the optical component 3000 with the mobile device 3002. In some embodiments, as described above, the optical component 3000 may be configured to be removably attached to mobile devices of different sizes. In addition, those devices may or may not have protective cases installed. Therefore, the different adapters may be provided to aid in securing the optical component 3000 to different mobile devices.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of any specific features and aspects of any embodiments may be combined with any specific features of any other embodiments, which still fall within the scope of the invention. Accordingly, it should be understood that various features and aspects of the disclosed embodiments can be combined with or substituted for one another in order to form varying modes of the disclosed invention.

The following is claimed:

1. A multi-lens system configured to be selectively attachable to a mobile electronic device having a user-facing onboard camera lens and an outward-facing onboard camera lens, the multi-lens system comprising:
    a retainer portion configured to removably attach to a top region of the mobile electronic device associated with the user-facing onboard camera lens and the outward-facing onboard camera lens, the retainer portion comprising an outward-facing surface and a user-facing surface;
    a first lens mounting portion on the outward-facing surface of the retainer portion;
    a second lens mounting portion on the user-facing surface of the retainer portion;
    a first lens component mounted to or configured to be mounted to the first lens mounting portion on the outward-facing surface; and
    a second lens component mounted to or configured to be mounted to the second lens mounting portion on the user-facing surface;
    wherein the first lens mounting portion is located vertically and laterally on the retainer portion so that, when the first lens component is attached to the first lens mounting portion and the retainer portion is attached to the mobile electronic device, the first lens component is generally aligned with the outward-facing onboard camera lens;
    wherein the second lens mounting portion is located vertically and laterally on the retainer portion so that, when the second lens component is attached to the second lens mounting portion and the retainer portion is attached to the mobile electronic device, the second lens component is generally aligned with the user-facing onboard camera lens; and
    wherein, when the retainer portion is removably attached to the mobile electronic device, corners of the mobile electronic device associated with the top region are exposed to permit sliding of the retainer portion along the top region.

2. The combination of the multi-lens system of claim 1 and the mobile electronic device.

3. The multi-lens system of claim 1, wherein the first and second lens components each comprise optical axes that are generally parallel to each other when mounted to the retainer portion.

4. The multi-lens system of claim 3, wherein the optical axis of the first lens component is spaced away from the optical axis of the second lens component.

5. The multi-lens system of claim 1, wherein the first or second mounting portion is configured to be slide resistant when attached to the mobile electronic device.

6. The multi-lens system of claim 1 wherein the retainer portion is configured to be attached to the mobile electronic device by a friction fit.

7. The multi-lens system of claim 1, wherein the retainer portion and mounting portions are formed as a unitary component.

8. The multi-lens system of claim 1, wherein the retainer portion can be attached to the mobile electronic device in multiple orientations to enable switching of the positions of the first and second lens components with respect to the onboard cameras.

9. A combination of two or more multi-lens systems as in claim 1.

10. The combination of claim 9, wherein the two or more multi-lens systems are removably attachable to each other.

11. The combination of claim 10, further comprising one or more auxiliary speakers, lens flash, lens mount, filters, or cold shoe.

12. A method of manufacturing a multi-lens system configured to be selectively attachable to a mobile electronic device having a top surface, opposing corners connected to the top surface, a user-facing onboard camera lens and an outward-facing onboard camera lens, the method of manufacturing the multi-lens system comprising:
    providing a retainer portion configured to removably attach to the top surface of the mobile electronic device by sliding along the top surface for engagement between the opposing corners, the retainer portion comprising an outward-facing surface and a user-facing surface,
    providing a first lens mounting portion on the outward-facing surface;
    providing a second lens mounting portion on the user-facing surface;
    providing a first lens component mounted to or configured to be mounted to the first lens mounting portion on the outward-facing surface; and
    providing a second lens component mounted to or configured to be mounted to the second lens mounting portion on the user-facing surface;
    wherein the first lens mounting portion is located on the retainer portion so that the first lens component, when mounted to the first lens mounting portion, is generally aligned with the outward-facing onboard camera lens when the retainer portion is attached to the mobile electronic device between the corners;
    wherein the second lens mounting portion is located on the retainer portion so that the second lens component, when mounted to the second lens mounting portion, is generally aligned with the user-facing onboard camera lens when the retainer portion is attached to the mobile electronic device between the corners; and
    wherein the retainer portion remains slideable along the top surface when removably attached to the mobile electronic device.

13. The method of claim 12, wherein at least the first or second lens component is a wide-angle lens.

14. The method of claim 13, wherein both the first and second lens components are wide-angle lenses.

15. A multi-lens system configured to be selectively attachable to a mobile electronic device having a top surface, opposing corners connected to the top surface, a user-facing onboard camera lens, and an outward-facing onboard camera lens, the multi-lens system comprising:

a retainer portion defining a channel configured to slide along the top surface of the mobile electronic device and removably attach the retainer portion between the opposing corners, the retainer portion comprising an outward-facing surface and a user-facing surface;

a first lens component associated with the outward-facing surface;

a second lens component associated with the user-facing surface; and wherein, the retainer portion is slideable along the top surface and into a position in which:

the first lens component is in optical communication with the outward-facing onboard camera lens; and the second lens component is in optical communication with the user-facing onboard camera lens.

16. The multi-lens system of claim 15, further comprising:

a first lens mounting portion connected to the outward-facing surface of the retainer portion; and a second lens mounting portion connected to the user-facing surface of the retainer portion.

17. The multi-lens system of claim 16, wherein:

the first lens component is mounted to or configured to be mounted to the first lens mounting portion; and the second lens component is mounted to or configured to be mounted to the second lens mounting portion.

18. The multi-lens system of claim 15, wherein the retainer portion is configured to form a friction fit with the mobile electronic device between the opposing corners.

19. The multi-lens system of claim 15, wherein:

the mobile electronic device has a device width defined by the opposing corners and top surface;

the retainer portion has a retainer portion width; and the retainer portion width is less than the device width.

20. A multi-lens system configured to be selectively attachable to a mobile electronic device having a user-facing onboard camera lens and an outward-facing onboard camera lens, the multi-lens system comprising:

a retainer portion configured to removably attach to a top region of the mobile electronic device associated with the user-facing onboard camera lens and the outward-facing onboard camera lens while opposing corners of the top region remain exposed;

a first lens component mounted to or configured to be mounted to an outward-facing surface of the retainer portion; and a second lens component mounted to or configured to be mounted to a user-facing surface of the retainer portion, wherein the retainer portion is attachable to the mobile electronic device in multiple orientations to enable switching of the positions of the first and second lens components with respect to the onboard cameras.

* * * * *